(12) United States Patent
Kurasawa et al.

(10) Patent No.: US 11,188,172 B2
(45) Date of Patent: Nov. 30, 2021

(54) DETECTION APPARATUS

(71) Applicant: Japan Display Inc., Tokyo (JP)

(72) Inventors: Hayato Kurasawa, Tokyo (JP);
Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/722,555

(22) Filed: Dec. 20, 2019

(65) Prior Publication Data

US 2020/0201510 A1    Jun. 25, 2020

(30) Foreign Application Priority Data

Dec. 25, 2018 (JP) .............................. JP2018-241807

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
CPC ... G06F 3/04166; G06F 3/0446; G06F 3/0443
See application file for complete search history.

(56) References Cited

U.S. PATENT DOCUMENTS

2015/0268758 A1* 9/2015 Lo .......................... G06F 3/0446
    345/174
2017/0285847 A1* 10/2017 Uehara ................. G06F 3/0446

FOREIGN PATENT DOCUMENTS

JP    2017188106 A    10/2017

* cited by examiner

*Primary Examiner* — Mark W Regn
(74) *Attorney, Agent, or Firm* — K&L Gates LLP

(57) ABSTRACT

According to an aspect, a detection apparatus includes: a plurality of detection electrodes; a drive signal generation circuit configured to generate a drive signal; a detection circuit configured to be coupled to the detection electrodes to detect a detection signal based on the drive signal; and a first selection circuit. A first point in time when the drive signal makes a transition from a first potential to a second potential overlaps a first period in which the first selection circuit couples a detection electrode as a first selection target among the detection electrodes to the detection circuit. A second point in time when the drive signal makes a transition from the second potential to the first potential overlaps a second period in which the first selection circuit couples a detection electrode as a second selection target, which is not included in the first selection target, to the detection circuit.

13 Claims, 25 Drawing Sheets

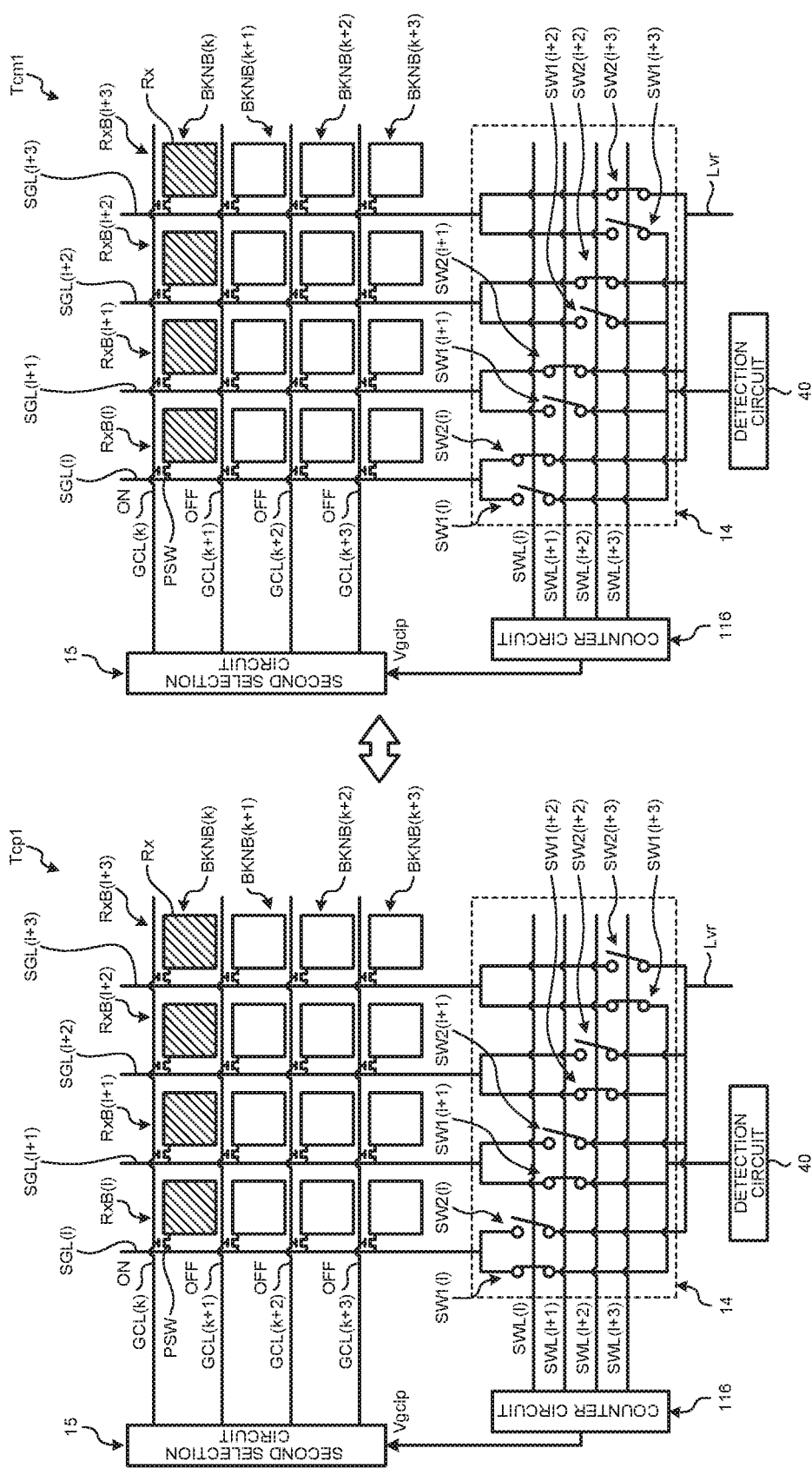

US 11,188,172 B2

DETECTION APPARATUS

CROSS-REFERENCE TO RELATED APPLICATIONS

This application claims priority from Japanese Application No. 2018-241807, filed on Dec. 25, 2018, the contents of which are incorporated by reference herein in its entirety.

BACKGROUND

1. Technical Field

The present disclosure relates to a detection apparatus.

2. Description of the Related Art

A method is known that improves accuracy in a detection apparatus that can detect an external proximity object based on a change in capacitance, by switching among a plurality of combination patterns of detection electrodes that are used for detection and detection electrodes that are not used for detection among a plurality of detection electrodes (e.g., Japanese Patent Application Laid-open Publication No. 2017-188106 (JP-A-2017-188106)).

The method described in JP-A-2017-188106 assumes that, in each detection process, signals are integrated by two combination patterns that are opposite to each other in the positional relation between the detection electrodes that are used for detection and the detection electrodes that are not used for detection among the detection electrodes. In such a method, along with an increase in the number of the combination patterns, the amount of data required for detection may increase, and an increase in various kinds of loads corresponding to detection accuracy may occur. Given these circumstances, there have been demands for a detection apparatus that can achieve both a reduction in loads and an improvement in detection accuracy.

SUMMARY

According to an aspect, a detection apparatus includes: a plurality of detection electrodes; a drive signal generation circuit configured to generate a drive signal; a detection circuit configured to be coupled to the detection electrodes to detect a detection signal based on the drive signal; and a first selection circuit configured to couple the detection electrodes to the detection circuit and uncouple the detection electrodes from the detection circuit. A first point in time when the drive signal makes a transition from a first potential to a second potential overlaps a first period in which the first selection circuit couples a detection electrode as a first selection target among the detection electrodes to the detection circuit. A second point in time when the drive signal makes a transition from the second potential to the first potential overlaps a second period in which the first selection circuit couples a detection electrode as a second selection target, which is not included in the first selection target, to the detection circuit.

BRIEF DESCRIPTION OF THE DRAWINGS

FIG. 10A is a diagram of a coupling pattern of detection electrodes by sign selection driving for a plurality of detection electrode blocks;

DETAILED DESCRIPTION

Figure 1:
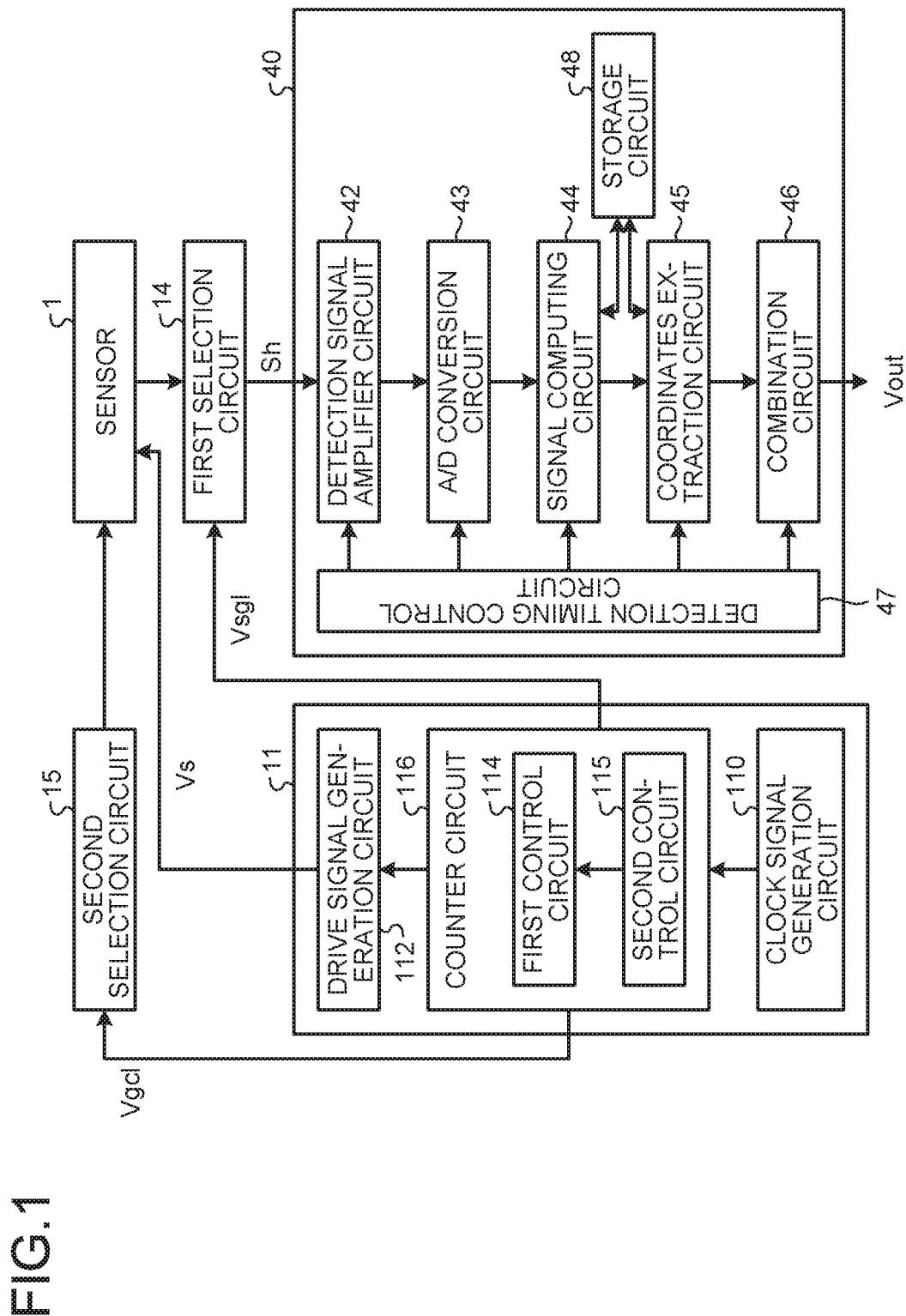
FIG. 1 is a block diagram of a configuration example of a detection apparatus according to a first embodiment.

The following describes modes (embodiments) for carrying out the present disclosure in detail with reference to the accompanying drawings. The details described in the embodiments below do not limit the present disclosure. Components described below include those easily conceivable by those skilled in the art or those substantially identical thereto. Further, the components described below can be combined as appropriate. The disclosure is only an example, and the scope of the present disclosure naturally includes appropriate changes with the gist of the disclosure maintained that can be easily thought of by those skilled in the art. To further clarify the description, widths, thicknesses, shapes, and the like of various parts are schematically illustrated in the drawings as compared with actual aspects thereof, in some cases. However, they are merely examples, and interpretation of the present disclosure is not limited thereto. In the present specification and the drawings, the same element as that illustrated in a drawing that has already been discussed is denoted by the same reference numeral through the specification and the drawings, and detailed description thereof will not be repeated in some cases where appropriate.

In this disclosure, when an element is described as being "on" another element, the element can be directly on the other element, or there can be one or more elements between the element and the other element.

First Embodiment

FIG. 1 is a block diagram of a configuration example of a fingerprint detection apparatus according to a first embodiment. As illustrated in FIG. 1, this detection apparatus 100 includes a sensor 1, a detection control circuit 11, a first selection circuit 14, a second selection circuit 15, and a detection circuit 40.

The sensor 1 includes a detection electrode Tx (a drive electrode) and a plurality of detection electrodes Rx and detects a capacitance change between the detection electrodes Rx and a recess or a protrusion on the surface of an object to be detected such as a finger Fin or a palm.

The detection control circuit 11 controls operations of the sensor 1, the first selection circuit 14, the second selection circuit 15, and the detection circuit 40. The detection control circuit 11 supplies a drive signal Vs for detection to the detection electrode Tx. In other words, the detection electrode Tx is a conductor to which the drive signal Vs is supplied.

The first selection circuit 14 couples a data line SGL as a selection target among a plurality of data lines SGL to the detection circuit 40 based on selection signals Vsgl supplied from the detection control circuit 11. With this operation, the first selection circuit 14 couples and uncouples the detection electrodes Rx coupled to the data lines SGL to and from the detection circuit 40. The first selection circuit 14 is a multiplexer, for example.

The second selection circuit 15 supplies a scan signal to scan lines GCL based on a selection signal Vgcl supplied from the detection control circuit 11 to select the detection electrodes Rx. The selected detection electrodes Rx are coupled to the first selection circuit 14 via the data lines SGL. The second selection circuit 15 is a gate driver, for example, and includes a decoder.

The detection circuit 40 detects a recess or a protrusion on the surface of a finger or the like being in contact with or proximity to the sensor 1 based on a detection signal Sh output from the first selection circuit 14 in accordance with a signal supplied from the detection control circuit 11 to detect the shape and/or fingerprint of the finger. The detection circuit 40 includes a detection signal amplifier circuit 42, an analog-to-digital (A/D) conversion circuit 43, a signal computing circuit 44, a coordinates extraction circuit 45, a combination circuit 46, a detection timing control circuit 47, and a storage circuit 48. The detection timing control circuit 47 performs control to cause the detection signal amplifier circuit 42, the A/D conversion circuit 43, the signal computing circuit 44, the coordinates extraction circuit 45, and the combination circuit 46 to operate in sync with each other based on a clock signal supplied from the detection control circuit 11.

The detection signal Sh is supplied to the detection signal amplifier circuit 42 of the detection circuit 40 from the sensor 1. The detection signal amplifier circuit 42 amplifies the detection signal Sh. The A/D conversion circuit 43 converts an analog signal output from the detection signal amplifier circuit 42 into a digital signal. The detection signal amplifier circuit 42 and the A/D conversion circuit 43 are each an analog front end (hereinafter, AFE) circuit, for example.

The signal computing circuit 44 is a logic circuit detecting the presence or absence of the contact to or proximity with the sensor 1 by the recess or protrusion of the finger based on an output signal from the A/D conversion circuit 43. The signal computing circuit 44 performs processing to extract a differential signal (an absolute value $|\Delta V|$) of the detection signals Sh by the recess or protrusion of the finger. The signal computing circuit 44 compares the absolute value $|\Delta V|$ with a certain threshold voltage (a second threshold Vth2) and, if this absolute value $|\Delta V|$ is less than the threshold voltage (the second threshold Vth2), determines that the recess of the finger is in a contact state. In contrast, if the absolute value $|\Delta V|$ is equal to or greater than the threshold voltage (the second threshold Vth2), the signal computing circuit 44 determines that the protrusion of the finger is in a contact state. Thus, the detection circuit 40 can detect the contact or proximity of the recess or protrusion of the finger.

The signal computing circuit 44 receives the detection signals Sh from the detection electrodes Rx and performs calculation based on a certain sign. The calculated detection signals Sh are temporarily stored in the storage circuit 48. Further, the signal computing circuit 44 receives the detection signals Sh stored in the storage circuit 48 to perform decoding based on the certain sign. The certain sign is stored in the storage circuit 48 in advance, for example. The detection control circuit 11 and the signal computing circuit 44 can read the certain sign stored in the storage circuit 48 at any timing. The storage circuit 48 is any of a random access memory (RAM), a read only memory (ROM), a register circuit, and the like, for example.

The coordinates extraction circuit 45 is a logic circuit that, when the contact or proximity of the recess or protrusion of the finger is detected by the signal computing circuit 44, determines its detected coordinates. The coordinates extraction circuit 45 calculates the detected coordinates based on a decoded detection signal and outputs the obtained detected coordinates to the combination circuit 46. The combination circuit 46 combines the detected coordinates output from the coordinates extraction circuit 45 together to generate two-dimensional information indicating the shape and/or fingerprint of the finger being in contact or proximity. The combination circuit 46 outputs the two-dimensional information as an output signal Vout of the detection circuit 40. Alternatively, the combination circuit 46 may generate an image based on the two-dimensional information and output the generated image information as the output signal Vout. Alternatively, the detection circuit 40 may not include the coordinates extraction circuit 45 and the combination circuit 46 and output a detection signal Sid decoded by the signal computing circuit 44 as the output signal Vout.

Figure 2:
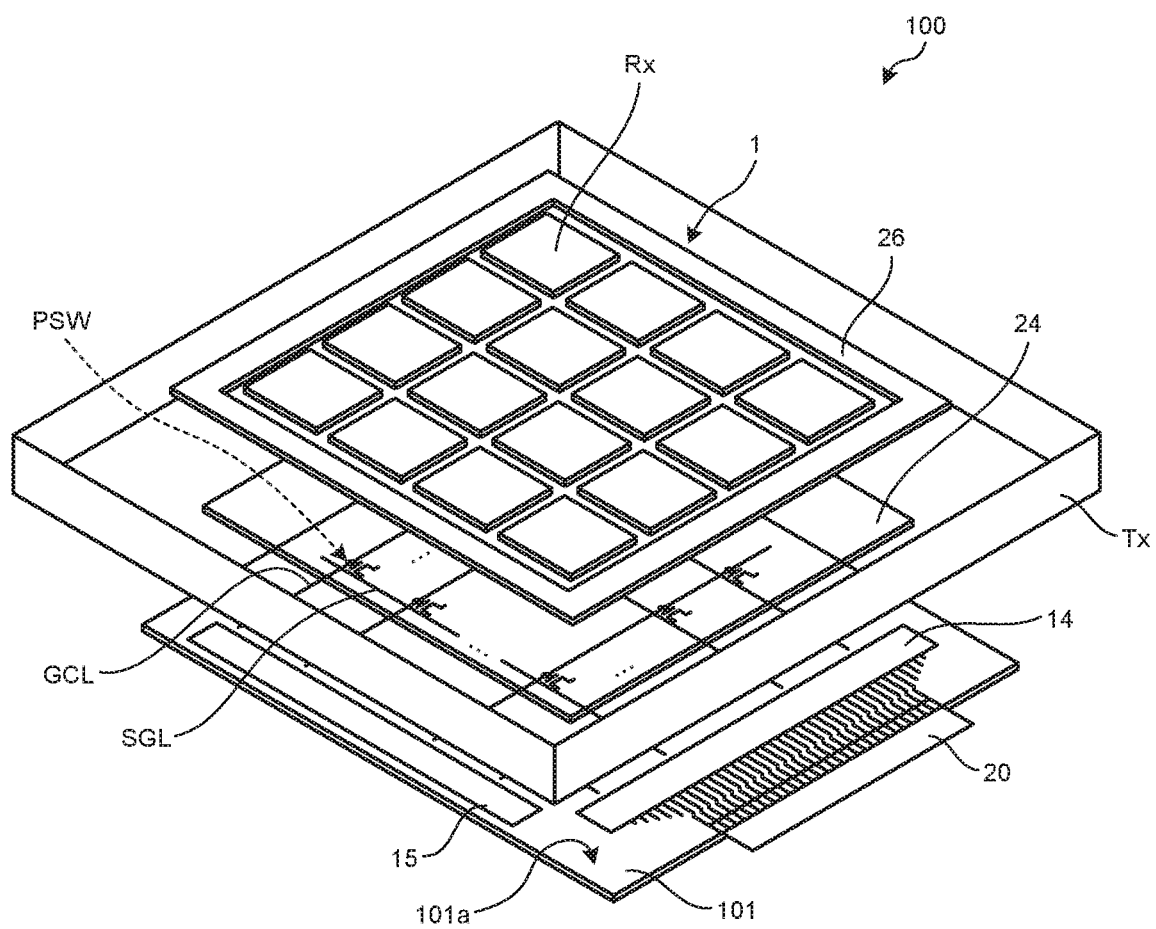
FIG. 2 is a schematic diagram of a configuration example of the detection apparatus.

FIG. 2 is a schematic diagram of a configuration example of the detection apparatus.

As illustrated in FIG. 2, the sensor 1 includes a base member 101, the detection electrodes Rx, a plurality of switch elements PSW, the scan lines GCL, the data lines SGL, and the detection electrode Tx. For the base member 101, an insulating material used; it is made of glass, for example. The sensor 1 further includes a shield layer 24. The shield layer 24 is provided on one face 101a of the base member 101. The detection electrodes Rx are provided above the shield layer 24.

The switch elements PSW are switching elements switching the coupling state between the detection electrodes Rx and the data lines SGL. The switch elements PSW, the scan lines GCL, and the data lines SGL are provided between the one face 101a of the base member 101 and the detection electrodes Rx. The switch elements PSW are each a thin film transistor, for example. The scan lines GCL are wiring lines for supplying a scan signal to the switch elements PSW. When the switch element PSW is a transistor, for example, the scan line GCL is coupled to a gate of the transistor. The data lines SGL are wiring lines electrically coupled to the detection electrodes Rx in accordance with the scan signal from the scan lines GCL. In other words, the data lines SGL are wiring lines to which the detection signals Sh are output from the detection electrodes Rx. When the switch element PSW is a transistor, for example, the data line SGL is coupled to a source of the transistor.

The first selection circuit 14 and the second selection circuit 15 are provided on the one face 101a of the base member 101. The data lines SGL are coupled to the first selection circuit 14. The scan lines GCL are coupled to the second selection circuit 15. The shield layer 24 is coupled to a fixed potential (e.g., ground potential). This hinders the potentials of the detection electrodes Rx from having an influence on the data lines SGL and the like and thus suppresses noise that would otherwise be caused. The shield layer 24 may be in a floating state, in which the potential thereof is not fixed.

Figure 3:
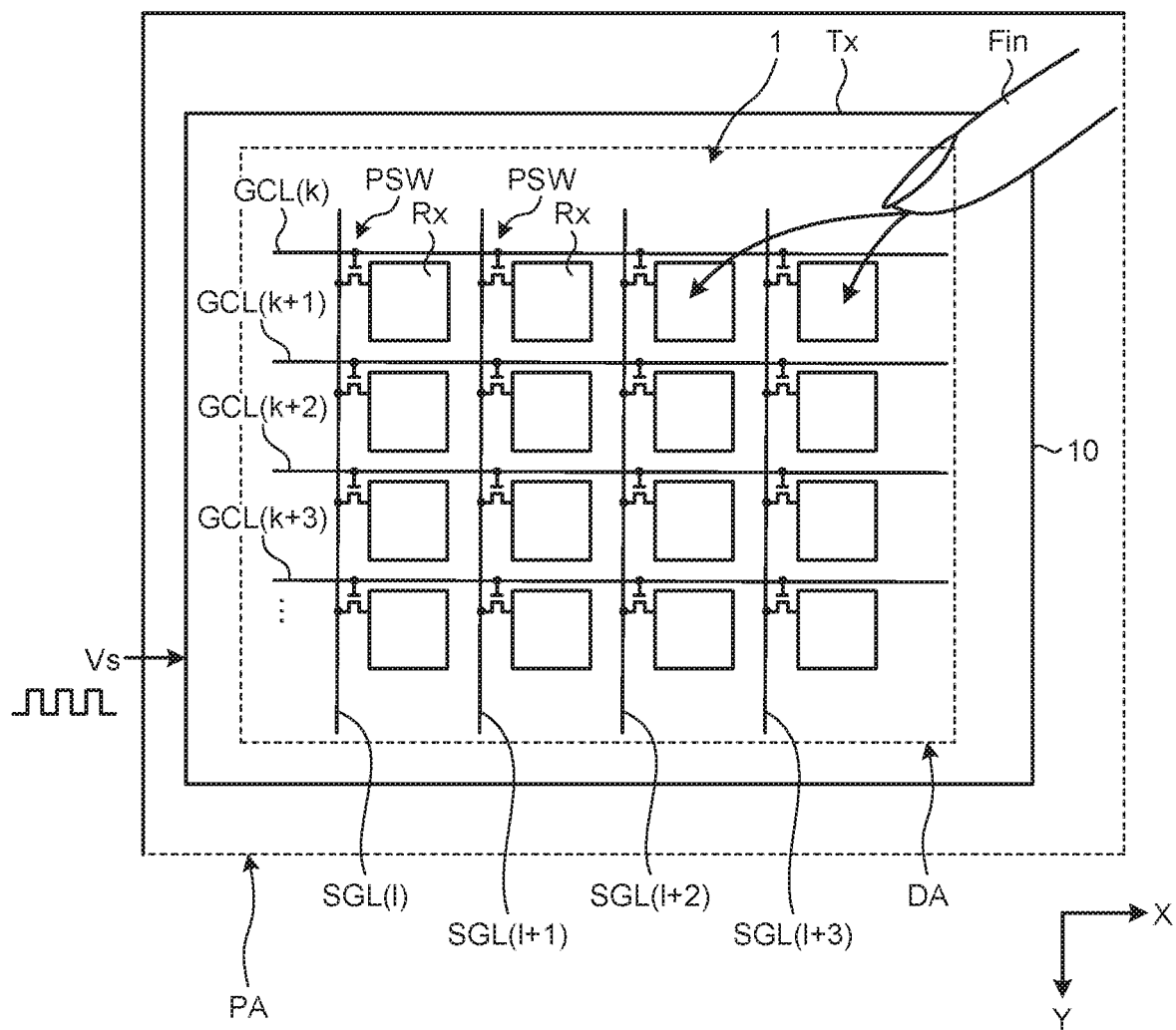
FIG. 3 is a schematic diagram of a configuration example of a sensor included in the detection apparatus.

The sensor 1 has a detection area DA and a peripheral area PA other than the detection area DA (refer to FIG. 3). The detection area DA is rectangular in shape, for example. In the detection area DA, the detection electrodes Rx and the switch elements PSW are arranged. The peripheral area PA of the sensor 1 is formed along at least one side of the detection area DA when the detection area DA is rectangular in shape. The first selection circuit 14, the second selection circuit 15, and the detection electrode Tx are arranged in the peripheral area PA of the sensor 1 and are arranged at positions adjacent to the detection electrodes Rx.

The sensor 1 further includes a conductor 26. The conductor 26 is arranged in the peripheral area PA. The conductor 26 is an electrode for detecting the approach of the object to be detected (e.g., a finger Fin) to the sensor 1. When the finger Fin approaches the conductor 26, for example, capacitance occurs between the conductor 26 and the finger Fin, and the capacitance value of the conductor 26 increases. A change in the capacitance value of the conductor 26 is detected by the detection circuit 40 coupled to the conductor 26, whereby the approach of the object to be detected (e.g., the finger Fin) to the sensor 1 can be detected.

The detection circuit 40 may stop supply of the drive signal Vs to the detection electrode Tx by the detection control circuit 11 and reception of the detection signals Sh from the detection electrodes Rx by the detection circuit 40 until the detection circuit 40 detects the approach of the finger Fin by the conductor 26, and may start the operation of the detection electrode Tx by the detection control circuit 11 and the operation of the detection electrodes Rx by the detection circuit 40 when the approach of the finger Fin is detected by the conductor 26. A mode of operating only the conductor 26 is referred to as a standby mode.

The drive signal Vs is supplied to the detection electrode Tx. The detection electrode Tx is arranged outside the detection area DA in which the detection electrodes Rx are arranged, for example. More specifically, the detection electrode Tx is arranged outside the conductor 26. That is to say, the conductor 26 is arranged between the sensor 1 and the detection electrode Tx. The detection electrodes Rx, the conductor 26, and the detection electrode Tx are arranged spaced apart from each other. The conductor 26 and the detection electrode Tx are each a rectangular ring shape surrounding the sensor 1. However, the shape and arrangement of the conductor 26 and the detection electrode Tx are not limited to this example. Each of the conductor 26 and the detection electrode Tx may be partially provided with slits or the like or include a plurality of separated conductors.

FIG. 3 is a schematic diagram of a configuration example of a sensor included in the detection apparatus. As illustrated in FIG. 3, the sensor 1 has a plurality of scan lines GCL(k), GCL(k+1), GCL(k+2), GCL(k+3), . . . and data lines SGL (l), SGL(l+1), SGL(l+2), SGL(l+3), . . . . The k and l are each an integer equal to or greater than 1. In the following description, when there is no need to separately describe the scan lines GCL(k), GCL(k+1), GCL(k+2), GCL(k+3), . . . , they will be referred to simply as a scan line GCL. When there is no need to separately describe the data lines SGL(l), SGL(l+1), SGL(l+2), SGL(l+3), . . . , they will be referred to simply as a data line SGL.

The detection electrodes Rx are arranged in an X direction (a first direction) and a Y direction (a second direction), which crosses the X direction. The scan lines GCL are wiring lines for turning on and off the switch elements PSW. The scan lines GCL are arranged in the Y direction and extend in the X direction. The data lines SGL are wiring lines for outputting the detection signals Sh. The data lines SGL are arranged in the X direction and extend in the Y direction.

The second selection circuit 15 selects a scan line GCL as a selection target (e.g., a scan line GCL(k)) from the scan lines GCL based on the selection signal Vgcl supplied from the detection control circuit 11. The second selection circuit 15 applies a certain voltage to the selected scan line GCL(k). With this operation, the detection electrodes Rx belonging to the k-th row are coupled to the first selection circuit 14 via the data lines SGL(l), SGL(l+1), . . . .

The first selection circuit 14 selects certain data lines SGL (e.g., the data lines SGL(l) and SGL(l+2)) from the data lines SGL based on the selection signals Vsgl supplied from the detection control circuit 11. The first selection circuit 14 couples the selected data lines SGL(l) and SGL(l+2) to the detection circuit 40. With this operation, the detection signals Sh are supplied to the detection circuit 40 from the detection electrode Rx on the k-th row and the l-th column and the detection electrode Rx on the k-th row and the (l+2)-th column.

As illustrated in FIG. 1, the detection control circuit 11 includes a clock signal generation circuit 110, a drive signal generation circuit 112, and a counter circuit 116. The counter circuit 116 includes a first control circuit 114 and a second control circuit 115. The first control circuit 114 supplies the selection signals Vsgl in accordance with the certain sign to the first selection circuit 14. The selection signals Vsgl includes a selection signal Vsglp corresponding to an element "1" of a square matrix Hh as the certain sign and a selection signal Vsglm corresponding to an element "−1" of the square matrix Hh. The first control circuit 114 may further include an inverting circuit, generate either one of the selection signal Vsglp and the selection signal Vsglm among the selection signals Vsgl, and generate the other thereof by inverting a high-level part and a low-level part by an inverting circuit. The selection signals Vsgl is control signals for switching switch elements SW1(l), SW1(l+1), SW1 (l+2), and SW1(l+3) of the first selection circuit 14 (refer to FIG. 10A and FIG. 10B) between on and off.

The clock signal generation circuit 110 generates a clock signal. This clock signal is supplied to the counter circuit 116 of the detection control circuit 11 and the detection timing control circuit 47 of the detection circuit 40, for example.

The counter circuit 116 measures the number of pulses of the clock signal generated by the clock signal generation circuit 110. The counter circuit 116 then, based on the measured value of the number of pulses, generates a first timing control signal for controlling the timing at which a data line SGL out of the data lines SGL is selected and supplies the generated first timing control signal to the first control circuit 114. The first control circuit 114 generates the selection signal Vsgl (e.g., a selection signal Vsglp or a selection signal Vsglm) for selecting the detection electrode Rx based on the first timing control signal supplied from the counter circuit 116 and supplies the generated selection signal Vsgl to the first selection circuit 14. The first selection circuit 14 switches the switch elements SW1 between on and off based on the selection signal Vsgl supplied from the first control circuit 114. With this operation, the certain data line SGL is selected out of the data lines SGL. The detection electrodes Rx coupled to the selected data line SGL are coupled to the detection circuit 40.

The counter circuit 116 generates a second timing control signal for controlling the timing at which a scan line GCL out of the scan lines GCL is selected based on the measured value of the number of pulses of the clock signal described above. The counter circuit 116 supplies the generated second timing control signal to the second control circuit 115. The second control circuit 115 transmits the selection signal Vgcl to the second selection circuit 15 based on the second timing control signal supplied from the counter circuit 116. The second selection circuit 15 supplies a scan signal to the scan line GCL based on the selection signal Vgcl (e.g., a gate selection signal Vgclp or a gate selection signal Vgclm) supplied from the second control circuit 115. With this operation, the scan line GCL as the selection target is selected out of the scan lines GCL. The detection electrodes Rx coupled to the selected scan line GCL are coupled to the data line SGL.

The drive signal generation circuit 112 generates the drive signal Vs for detection and outputs the drive signal Vs for detection to the detection electrode Tx. The counter circuit 116 generates a third timing control signal for controlling timing for supplying the drive signal Vs based on the measured value of the pulses of the clock signal described above. The drive signal generation circuit 112 outputs the drive signal Vs based on the third timing control signal supplied from the counter circuit 116.

Figure 4:
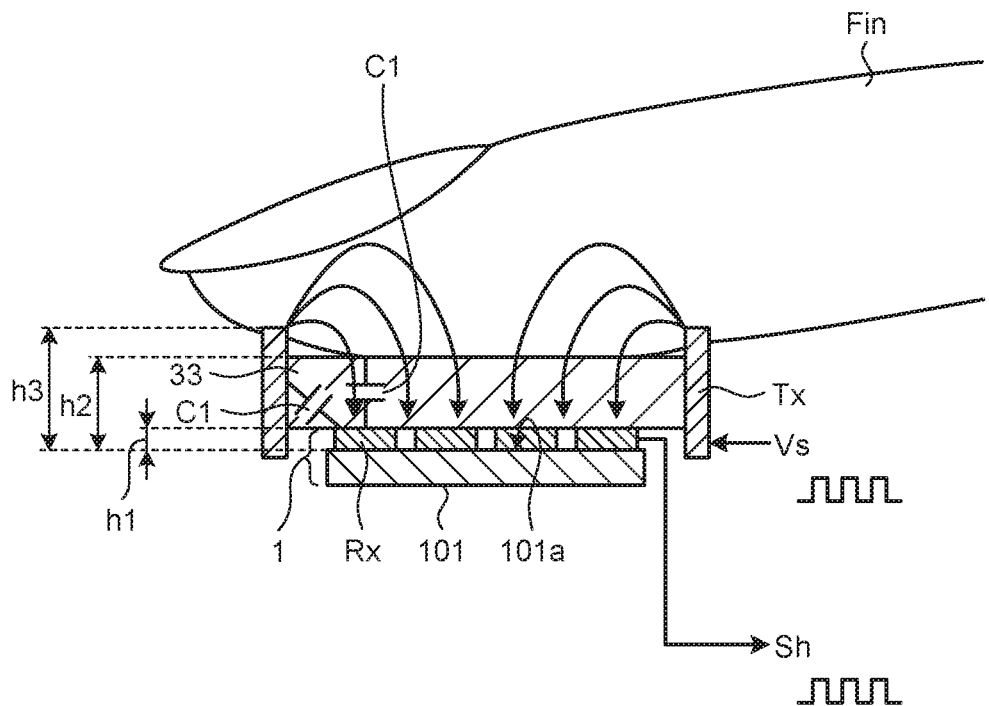
FIG. 4 is a diagram schematically illustrating how a drive signal is transmitted to detection electrodes via a finger.
Figure 5:
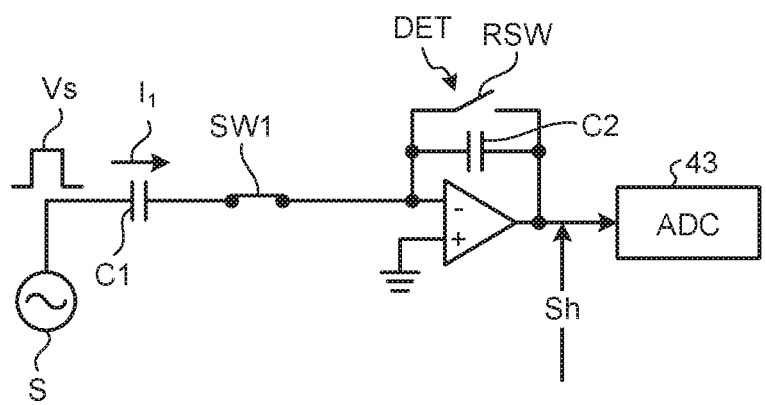
FIG. 5 is an illustrative diagram of an example of an equivalent circuit of the detection apparatus.
Figure 6:
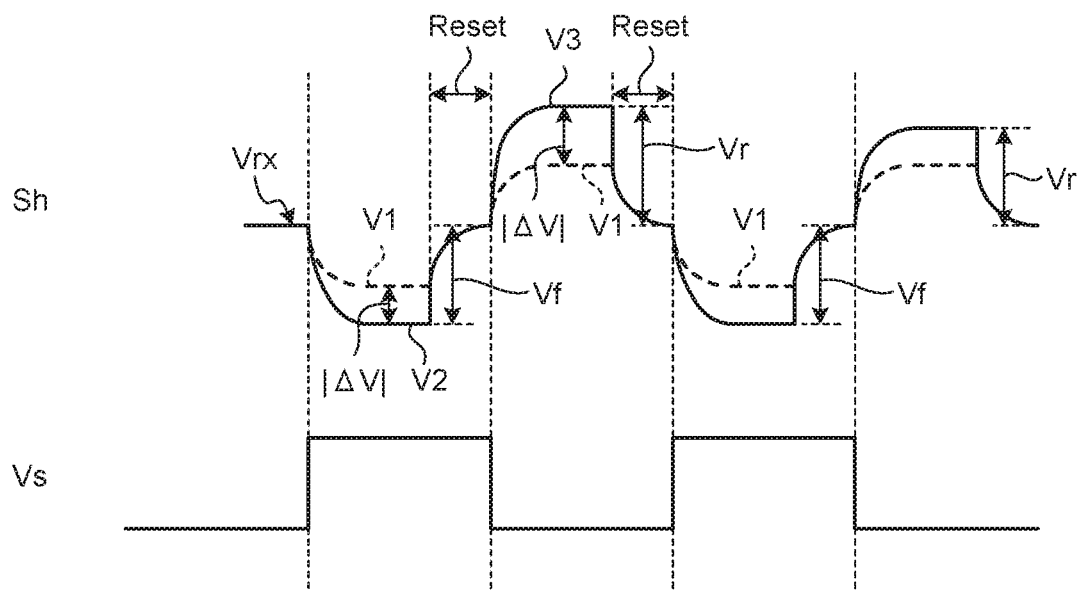
FIG. 6 is a diagram of waveforms of the drive signal and a detection signal of the detection apparatus.

The sensor 1 detects changes in the capacitance of the detection electrode Rx. The following describes a detection operation by the sensor 1 with reference to FIG. 4 to FIG. 6. FIG. 4 is a diagram schematically illustrating how a drive signal is transmitted to a detection electrode via the finger. FIG. 5 is an illustrative diagram of an example of an equivalent circuit of a detection apparatus. FIG. 6 is a diagram of waveforms of the drive signal and a detection signal of the detection apparatus.

As illustrated in FIG. 4, a capacitance element C1 is formed between the detection electrode Tx and the detection electrode Rx. As illustrated in FIG. 5, an alternating current (AC) signal source S is coupled to the detection electrode Tx. In other words, the drive signal Vs is supplied from the detection control circuit 11 to the detection electrode Tx. The detection electrode Rx is coupled to a voltage detector DET. The voltage detector DET corresponds to the detection signal amplifier circuit 42 of the detection circuit 40, for example. The voltage detector DET is an integrating circuit.

The drive signal Vs applied to the detection electrode Tx is an AC rectangular wave with a certain frequency (e.g., a frequency of the order of several kilohertz to several hundred kilohertz), for example. When the drive signal Vs is applied to the detection electrode Tx, the detection signal Sh is output from the detection electrode Rx via the voltage detector DET.

In a state in which a finger is not in contact or proximity (a noncontact state), a current corresponding to the capacitance value of the capacitance element C1 flows with charging and discharging of the capacitance element C1. The detection circuit 40 converts variations in a current I1 corresponding to the drive signal Vs into variations in voltage (a dotted line waveform V1 (refer to FIG. 6)).

In contrast, in a state in which a finger is in contact or proximity (a contact state), as illustrated in FIG. 4, the finger Fin is in contact with the detection electrode Tx. Then the drive signal Vs supplied to the detection electrode Tx from the detection control circuit 11 has an influence on the detection electrode Rx via the finger Fin and an insulating protective layer 33 (e.g., an insulating resin) protecting the sensor 1. That is to say, the finger Fin acts as part of the detection electrode Tx. Thus, in the contact state, the distance between the detection electrode Tx and the detection electrode Rx is substantially short, and the capacitance element C1 acts as a capacitance element with a capacitance value larger than a capacitance value in the noncontact state. As illustrated in FIG. 6, the detection circuit 40 converts variations in a current I2 or I3 corresponding to the drive signal Vs into variations in voltage (a solid line waveform V2 or V3). The waveform V2 corresponds to a waveform in a state in which the recess of the finger Fin is in contact, whereas the waveform V3 corresponds to a waveform in a state in which the protrusion of the finger Fin is in contact.

In this case, the waveform V2 and the waveform V3 are larger in amplitude than the waveform V1 described above. In addition, the waveform V3 is larger in amplitude than the waveform V2. With this relation, the absolute value $|\Delta V|$ of a voltage difference between the waveform V1 and the waveform V2 changes depending on the contact or proximity of the external object such as a finger Fin and a recess or protrusion of the external object. In other words, the detection circuit 40 is coupled to the detection electrodes Rx to detect the detection signals Sh based on the drive signal Vs.

In order to detect the absolute value |ΔV| of the voltage difference with high precision, the voltage detector DET more preferably performs an operation including a period Reset in which the charging and discharging of a capacitor C2 are reset by a reset switch RSW within the circuit in accordance with the frequency of the drive signal Vs.

The detection circuit 40 compares the absolute value |ΔV| with the first threshold Vth1. If the absolute value |ΔV| is less than the first threshold Vth1, the detection circuit 40 determines that a finger is in a noncontact state. In contrast, if the absolute value |ΔV| is equal to or greater than the first threshold Vth1, the detection circuit 40 determines that a finger is in a contact-or-proximity state. Further, the detection circuit 40 compares the absolute value |ΔV| with the second threshold Vth2 and, if the absolute value |ΔV| is less than the second threshold Vth2, determines that the recess of the finger Fin is in contact. In contrast, if the absolute value |ΔV| is equal to or greater than the second threshold Vth2, the detection circuit 40 determines that the protrusion of the finger Fin is in contact.

The voltage detector DET outputs, to the A/D conversion circuit 43, first signal data Vr and second signal data Vf as differential signal data of each of the waveform V1, the waveform V2, and the waveform V3 from a standard potential Vrx. The first signal data Vr is data including a plurality of positive signal values. The second signal data Vf is data including a plurality of negative signal values. Specifically, the first signal data Vr includes a plurality of signal values output during a period in which the voltage levels of the waveform V1, the waveform V2, and the waveform V3 are greater than the standard potential Vrx. The second signal data Vf includes a plurality of signal values output during a period in which the voltage levels of the waveform V1, the waveform V2, and the waveform V3 are less than the standard potential Vrx. The A/D conversion circuit 43 integrates the first signal data Vr and the second signal data Vf to convert them into one digital signal. Specifically, the A/D conversion circuit 43 converts a signal value obtained by adding the first signal data Vr and the second signal data Vf, into a digital signal.

As illustrated in FIG. 4, a substrate 10 includes the base member 101. The detection electrodes Rx are positioned on the one face 101a of the base member 101. A height h3 of the detection electrode Tx from the one face 101a is greater than a height h1 of the detection electrodes Rx from the one face 101a. The height h3 of the detection electrode Tx from the one face 101a is greater than a height h2 of the protective layer 33 from the one face 101a, for example. With this structure, when a finger Fin approaches the detection electrode Rx, it is easy for the finger Fin to be naturally in contact with the detection electrode Tx.

Figure 7:
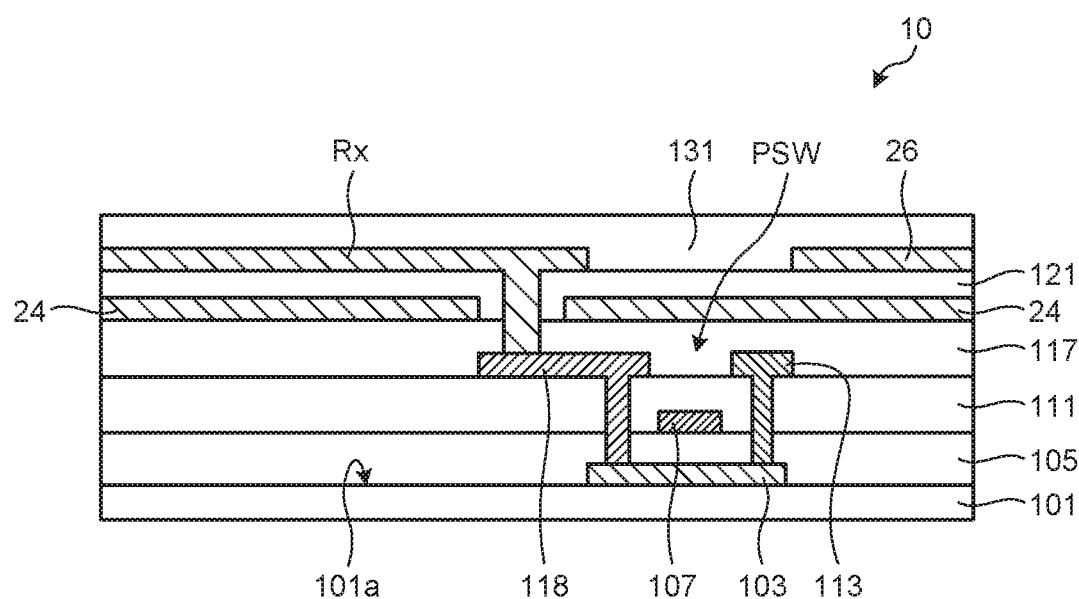
FIG. 7 is a sectional view of a configuration example of a substrate.

FIG. 7 is a sectional view of a configuration example of a substrate. FIG. 7 is a diagram of part of a section obtained by cutting FIG. 8 along an A11-A12 line. The sensor 1 is provided on a substrate 10. As illustrated in FIG. 7, the substrate 10 has the base member 101, a semiconductor layer 103, an insulating film 105, a gate electrode 107, an insulating film 111, a source electrode 113, a drain electrode 118, an insulating film 117, the shield layer 24, an insulating film 121, the detection electrode Rx, the conductor 26, and a protective film 131.

The semiconductor layer 103 is provided on the one face 101a of the base member 101. The insulating film 105 is provided on the base member 101 to cover the semiconductor layer 103.

The gate electrode 107 is provided on the insulating film 105. The insulating film 111 is provided on the insulating film 105 to cover the gate electrode 107.

Through holes bottomed by the semiconductor layer 103 are provided in the insulating film 111 and the insulating film 105. The source electrode 113 and the drain electrode 118 are provided on the insulating film 111. The source electrode 113 and the drain electrode 118 are individually coupled to the semiconductor layer 103 via the through holes provided in the insulating film 111 and the insulating film 105.

The insulating film 117 is provided on the insulating film 111 to cover the source electrode 113 and the drain electrode 118. The shield layer 24 is provided on the insulating film 117. The insulating film 121 is provided on the insulating film 117 to cover the shield layer 24. A through hole bottomed by the drain electrode 118 is provided in the insulating film 121 and the insulating film 117. The detection electrode Rx is provided on the insulating film 121. The detection electrode Rx is coupled to the drain electrode 118 via the through hole provided in the insulating film 121 and the insulating film 117. The conductor 26 is provided on the insulating film 121. The protective film 131 is provided on the insulating film 121 to cover the detection electrode Rx and the conductor 26.

The following describes examples of the materials of the respective films stacked on the base member 101. The insulating film 105, the insulating film 111, the insulating film 117, and the insulating film 121 are formed of inorganic films such as a silicon oxide film, a silicon nitride film, and a silicon oxide nitride film. Any one of the insulating film 105, the insulating film 111, the insulating film 117, and the insulating film 121 may be an organic insulting film. Any one of the insulating film 105, the insulating film 111, the insulating film 117, and the insulating film 121 is not limited to a single layer and may be a film with a multilayered structure. The insulating film 105 may be a film with a multilayered structure in which a silicon nitride film is formed on a silicon oxide film, for example. The insulating film 105, the insulating film 111, the insulating film 117, and the insulating film 121 all have a flattened upper face.

The semiconductor layer 103 is formed of any of an amorphous silicon film, a polysilicon film, and an oxide semiconductor film, for example. The gate electrode 107 is formed of aluminum (Al), copper (Cu), silver (Ag), molybdenum (Mo), or an alloy film thereof. The source electrode 113 and the drain electrode 118 are each formed of a titanium-aluminum (TiAl) film as an alloy of titanium and aluminum. The shield layer 24, the detection electrode Rx, and the conductor 26 are each formed of a conductor film that allows visible light to pass therethrough. In the following, the property that allows visible light to pass will be referred to as translucency. Examples of the conductor film with translucency include an indium tin oxide (ITO) film. The detection electrode Rx and the conductor 26 may be formed of metallic thin lines having mesh-like openings. The protective film 131 is a passivation film, for example. The protective film 131 is an insulating film, for example, and is formed of a film of an inorganic material such as a silicon nitride film or a resin film. The protective film 131 corresponds to the protective layer 33 illustrated in FIG. 4. The protective film 131 and the protective layer 33 may be different layers and may be formed of different materials.

Although the gate electrode 107 has a top gate structure, in which it is arranged above the semiconductor layer 103, but its structure is not limited thereto; the gate electrode 107 may have a bottom gate structure, in which it is arranged below the semiconductor layer 103. The detection apparatus 100 does not necessarily have the shield layer 24 and the insulating film 121.

Figure 8:
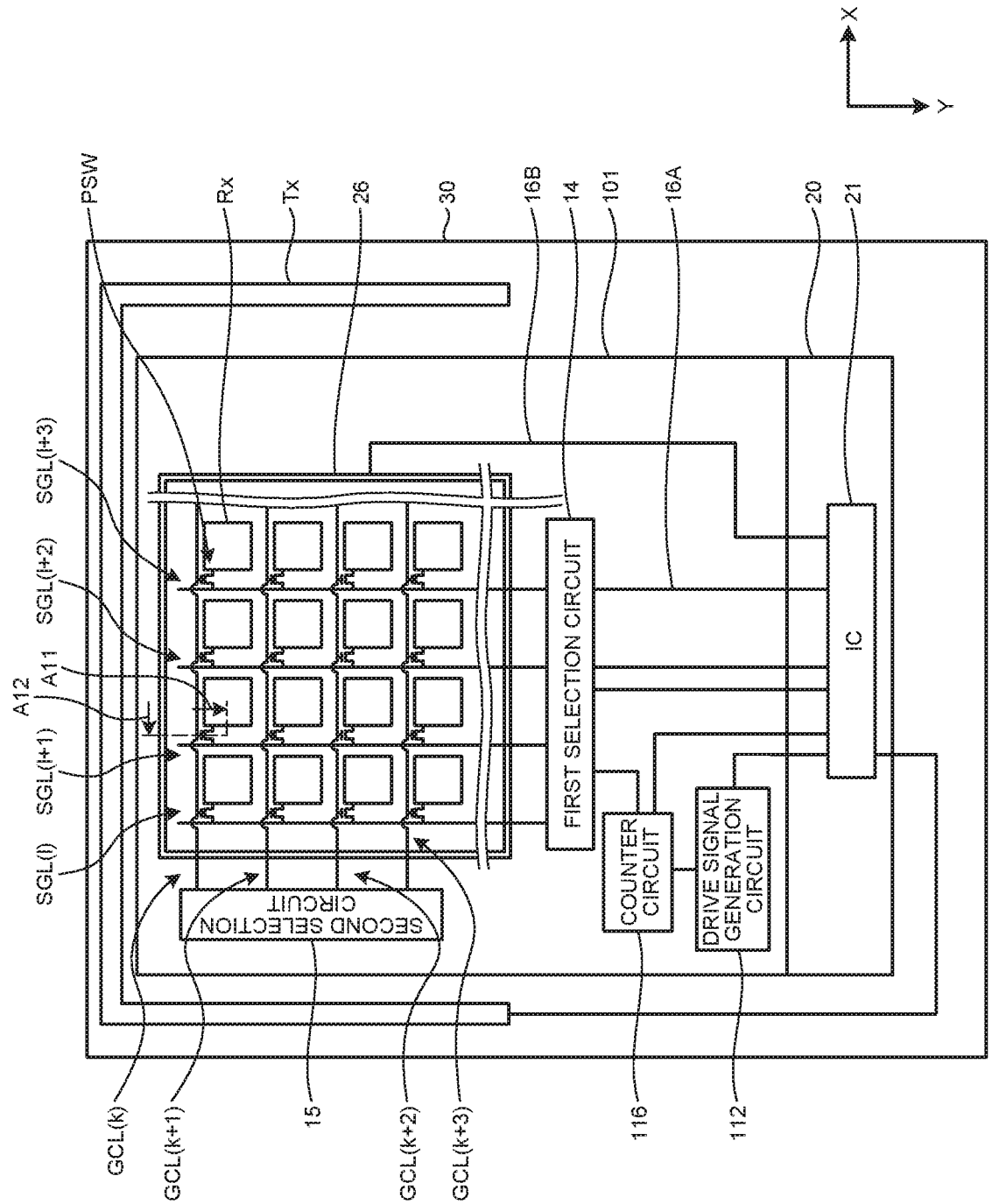
FIG. 8 is a plan view of a configuration example of the detection apparatus.

FIG. 8 is a plan view of a configuration example of the detection apparatus. As illustrated in FIG. 8, the detection apparatus 100 includes the substrate 10, a first circuit board 20, and a second circuit board 30. The substrate 10 and the first circuit board 20 are arranged on one face 30a of the second circuit board 30. The first circuit board 20 is a flexible board. The second circuit board 30 is a rigid board such as a printed circuit board (PCB), for example. The first circuit board 20 couples the substrate 10 and the second circuit board 30 to each other.

The substrate 10 is provided with the sensor 1, the first selection circuit 14, the second selection circuit 15, the drive signal generation circuit 112, and the counter circuit 116. The counter circuit 116 includes the first control circuit 114 and the second control circuit 115. The counter circuit 116 is coupled to the first selection circuit 14, the second selection circuit 15, and the drive signal generation circuit 112 via wiring. The second selection circuit 15 is arranged between the detection electrodes Rx and the detection electrode Tx. The conductor 26 is arranged between the second selection circuit 15 and the detection electrodes Rx.

The first circuit board 20 is provided with an IC 21. An output side of the first selection circuit 14 is coupled to a plurality of terminals of the IC 21 via a plurality of wiring lines 16A. The conductor 26 is coupled to one terminal of the IC 21 via a wiring line 16B. The counter circuit 116 is coupled to the IC 21 via wiring.

On the one face 30a side of the second circuit board 30, the detection electrode Tx is provided. The drive signal generation circuit 112 is coupled to the detection electrode Tx via the IC 21 and wiring on the second circuit board 30. The detection electrode Tx may be of a ring shape surrounding the sensor 1 or, as illustrated in FIG. 8, may be of a shape lacking part of the ring surrounding the sensor 1. The detection electrode Tx may be of a shape lacking one side out of four sides in a rectangular ring surrounding the sensor 1, for example. The detection electrode Tx may be a circular ring. The detection electrode Tx may be arranged such that the detection electrode Tx does not overlap, in a plan view, the data lines SGL that couple the sensor 1 to the first selection circuit 14, for example. The detection electrode Tx may be arranged so as not to overlap the wiring lines 16A that couple the first selection circuit 14 to the IC 21. With this arrangement, the drive signal Vs to be supplied to the detection electrode Tx can be inhibited from having an influence on the data lines SGL or the wiring lines 16A and thus noise, which would otherwise be caused, can be suppressed.

At least part of the components of the detection control circuit 11 and at least part of the components of the detection circuit 40 illustrated in FIG. 1 are included in the IC 21. Among the various components of the detection circuit 40 illustrated in FIG. 1, the detection signal amplifier circuit 42, the A/D conversion circuit 43, the signal computing circuit 44, the coordinates extraction circuit 45, the combination circuit 46, the detection timing control circuit 47, and the storage circuit 48 are included in the IC 21, for example. Among the various components of the detection control circuit 11 illustrated in FIG. 1, the clock signal generation circuit 110 is included in the IC 21. At least part of the components of the detection circuit 40 illustrated in FIG. 1 are formed on the substrate 10. Among the various kinds of components of the detection circuit 40 illustrated in FIG. 1, the counter circuit 116 and the drive signal generation circuit 112 are formed on the substrate 10, for example. The IC 21 may have a protective circuit as a circuit to be coupled to the drive signal generation circuit 112 and the detection electrode Tx. The protective circuit, for example, is a diode that prevents the sensor 1 from electro-static discharge (ESD), which would otherwise be conveyed to the sensor 1 from the detection electrode Tx through the IC 21.

At least part of the components of the detection control circuit 11 illustrated in FIG. 1 may be included in the second selection circuit 15. The second control circuit 115 may be included in the second selection circuit 15, for example. At least part of the components of the detection control circuit 11 or at least part of the components of the detection circuit 40 illustrated in FIG. 1 may be included in an IC provided arranged on the second circuit board 30 separately from the IC 21. The protective circuit may be provided on the second circuit board 30 and coupled to the drive signal generation circuit 112 and the detection electrode Tx not through the IC 21, for example. At least part of the components of the detection control circuit 11 or at least part of the components of the detection circuit 40 illustrated in FIG. 1 may be included in a central processing unit (CPU) arranged on an external substrate coupled to the second circuit board 30. The substrate 10 may have an integrated circuit. In this case, at least part of the components of the detection control circuit 11 or at least part of the components of the detection circuit 40 illustrated in FIG. 1 may be included in the integrated circuit of the substrate 10. Among the various kinds of components of the detection circuit 40, at least one of the detection signal amplifier circuit 42 and the A/D conversion circuit 43 may be included in the integrated circuit of the substrate 10, for example.

Figure 9:
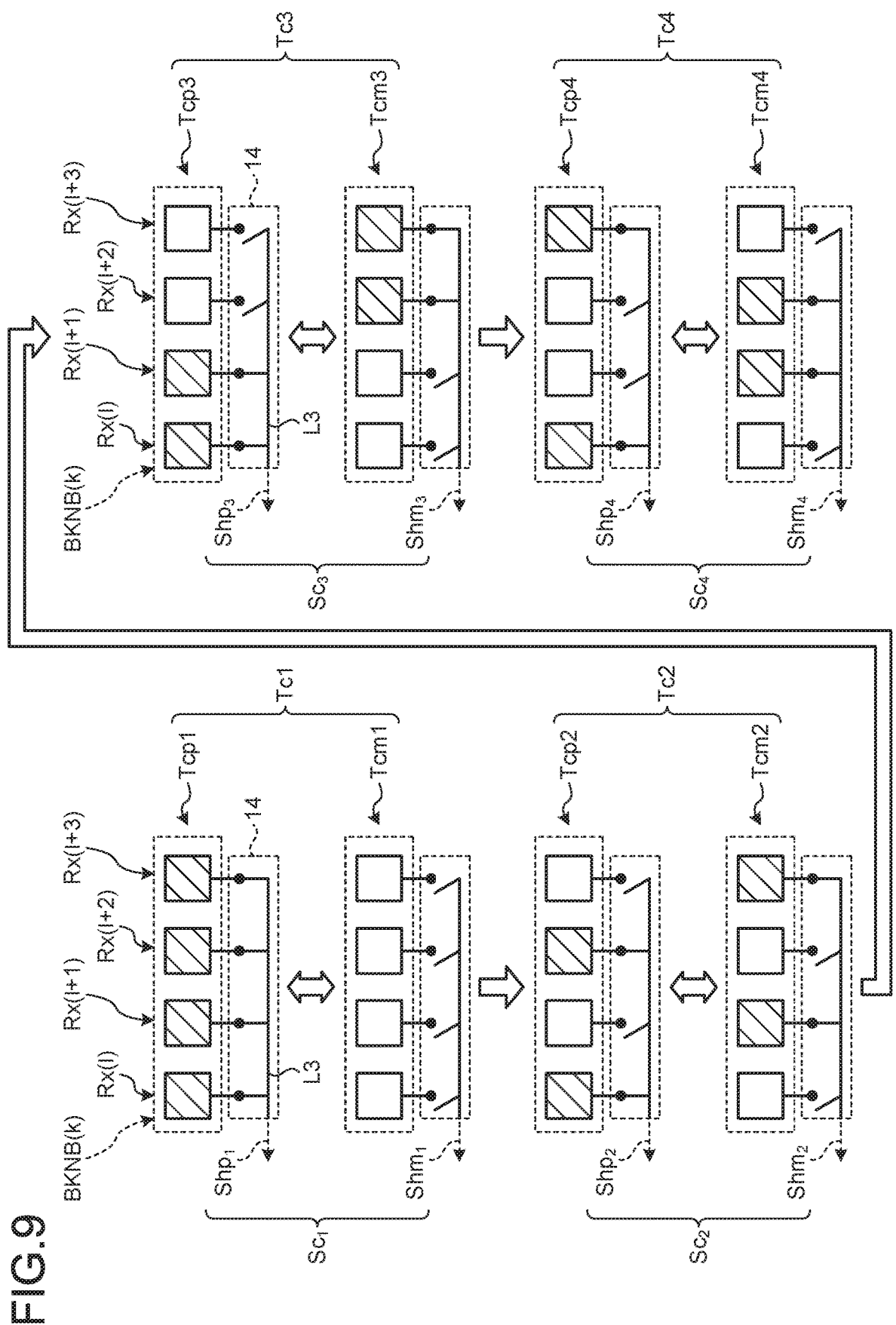
FIG. 9 is a diagram of coupling patterns of detection electrodes by sign selection driving.

The following describes a method for detecting a fingerprint by the detection apparatus 100. The detection apparatus 100 performs sign selection driving for a detection electrode block BKNB including a plurality of detection electrodes Rx to detect a fingerprint. FIG. 9 is a diagram of selection patterns of detection electrodes by the sign selection driving. As illustrated in FIG. 9, the detection apparatus 100 performs a detection operation Tc1, a detection operation Tc2, a detection operation Tc3, and a detection operation Tc4 by the operation of the first selection circuit 14. FIG. 9 illustrates coupling patterns of the detection electrodes Rx in the respective detection operations Tc. The selection pattern is a pattern of a combination of the detection electrodes Rx as first selection targets and the detection electrodes Rx as second selection targets. In other words, the coupling pattern indicates a combination of a coupled state or a non-coupled state between each of the detection electrodes Rx and the detection circuit 40 (the voltage detector DET).

The following first describes performing the sign selection driving for one detection electrode block BKNB(k). As illustrated in FIG. 9, the detection electrode block BKNB(k) includes four detection electrodes Rx arranged in the row direction (the X direction). The four detection electrodes Rx are coupled to the same scan line GCL(k) (refer to FIG. 3) via the switch elements PSW. In the detection electrode block BKNB(k), the selection signal Vsgl is supplied to the switch elements SW1 corresponding to selected detection electrodes Rx to turn on the switch elements SW1 of the first selection circuit 14. With this operation, the selected detection electrodes Rx are coupled to a common wiring line L3 via the data lines SGL, and the detection signals Sh are output to the detection circuit 40 from the wiring line L3.

When the certain sign is the square matrix Hh and a g-th element on an f-th row as any element thereof is $Hh_{fg}$, the relation between a detection signal $Sc_f$ output in an f-th detection operation Tc based on the square matrix Hh and a detection signal $Si_q$ output from a g-th detection electrode Rx included in the detection electrode block BKNB is represented by Expression (1) below. As described in Expression (1), a value obtained by integrating the detection signals $Si_g$ of the selected detection electrodes Rx is output as the detection signal $Sc_f$. That is to say, the detection signal $Sc_f$ is represented by the sum of the detection signals $Si_g$ output from the selected detection electrodes Rx. The f and g are each an integer equal to or greater than 1, for example.

$$Sc_f = \sum_{g=1}^{n} Hh_{fg} Si_g \quad (1)$$

The detection signal $Sc_f$ is determined by calculating signals output from the detection electrodes Rx selected from the detection electrode block BKNB(k) based on the certain sign. The certain sign is defined by the square matrix Hh of Expression (2) below, for example. The square matrix Hh is an Hadamard matrix and is a square matrix in which "1" or "−1" are included as elements and any different two rows form an orthogonal matrix. In the detection electrode block BKNB(k), selection of the detection electrodes Rx is performed based on the positive and negative signs of the Hadamard matrix, for example. Consequently, the phase of a signal output from the detection electrode block BKNB(k) (that is, the signals output from the selected detection electrodes Rx) is determined by the positive and negative signs of the Hadamard matrix.

$$Hh = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

An order d of the square matrix Hh is indicated by $2^{Na}$. Na is an integer equal to or greater than 1 and is 2 as described by Expression (2) in the first embodiment. The order d of the square matrix Hh is equal to or greater than a number n of the detection electrodes Rx included in the detection electrode block BKNB(k). In the first embodiment, the order d of the square matrix Hh and the number n of the detection electrodes Rx included in the detection electrode block BKNB(k) are equal to each other, which are 4 in the example illustrated in FIG. 9. The order d of the square matrix Hh indicates the number of elements in either direction of the vertical direction or the horizontal direction of the matrix, for example.

The following describes an example of the sign selection driving by dividing it into the four detection operations: the detection operation Tc1, the detection operation Tc2, the detection operation Tc3, and the detection operation Tc4 as illustrated in FIG. 9. The detection operation Tc1, the detection operation Tc2, the detection operation Tc3, and the detection operation Tc4, which are continuous, include positive sign selection operations Tcp1, Tcp2, Tcp3, and Tcp4 and negative sign selection operations Tcm1, Tcm2, Tcm3, and Tcm4. In the following description, when there is no need to separately describe the detection operation Tc1, the detection operation Tc2, the detection operation Tc3, and the detection operation Tc4, they will be referred to as a detection operation Tc. Similarly, when there is no need to separately describe the positive sign selection operations Tcp1, Tcp2, Tcp3, and Tcp4, they will be referred to simply as a positive sign selection operation Tcp. Similarly, when there is no need to separately describe the negative sign selection operations Tcm1, Tcm2, Tcm3, and Tcm4, they will be referred to simply as a negative sign selection operation Tcm.

As illustrated in FIG. 9, in the positive sign selection operation Tcp, the detection control circuit 11 (refer to FIG. 1) selects the detection electrodes Rx as the first selection targets in accordance with the selection signal Vsglp corresponding to the elements "1" of the square matrix Hh. In the negative sign selection operation Tcm, the detection control circuit 11 selects the detection electrodes Rx as the second selection targets, which are not included in the detection electrodes Rx as the first selection targets, among the detection electrodes Rx in accordance with the selection signal Vsglm corresponding to the elements "−1" of the square matrix Hh. The detection control circuit 11 supplies the selection signal Vsglp or the selection signal Vsglm to the first selection circuit 14 (refer to FIG. 1). The first selection circuit 14 turns on the switch elements SW1 based on the selection signal Vsglp in the positive sign selection operation Tcp and turns on the switch elements SW1 based on the selection signal Vsglm in the negative sign selection operation Tcm.

With this operation, in the positive sign selection operation Tcp, the detection electrodes Rx as the first selection targets are caused to be a coupled state with respect to the detection circuit 40, whereas the detection electrodes Rx as the second selection targets are caused to be a non-coupled state with respect to the detection circuit 40. The coupled state refers to a state in which the selected detection electrodes Rx are coupled to the detection circuit 40 via the data lines SGL and the first selection circuit 14 (refer to FIG. 1). The non-coupled state refers to a state in which the selected detection electrodes Rx are not coupled to the detection circuit 40. In FIG. 9, to easily distinguish the first selection targets from the second selection targets, the detection electrodes Rx as the first selection targets are hatched.

A detection signal Shp is output to the detection circuit 40 from the detection electrodes Rx via the data line SGL, the first selection circuit 14, and the wiring line L3. The detection signal Shp is a signal obtained by integrating detection signals from the detection electrodes Rx as the first selection targets selected in accordance with the selection signal Vsglp. The detection signal Shp is a positive signal value, and a plurality of detection signals Shp are integrated to form the first signal data Vr.

In the negative sign selection operation Tcm, the detection control circuit 11 selects the detection electrodes Rx as the second selection targets, which are not included in the detection electrodes Rx as the first selection targets, among the detection electrodes Rx in accordance with the selection signal Vsglm corresponding to the elements "−1" of the square matrix Hh. Specifically, the first selection circuit 14 turns on the switch elements SW1 based on the selection signal Vsglm. With this operation, the detection electrodes Rx as the second selection targets become the coupled state, whereas the detection electrodes Rx as the first selection targets become the non-coupled state. That is to say, the negative sign selection operation Tcm is an operation with a coupling pattern obtained by inverting the coupling pattern of the detection electrodes Rx of the positive sign selection operation Tcp.

A detection signal Shm is output to the detection circuit 40 from the detection electrodes Rx via the data line SGL, the first selection circuit 14, and the wiring line L3. The detection signal Shm is a signal obtained by integrating detection signals output from the detection electrodes Rx as the second selection targets selected in accordance with the selection signal Vsglm. The detection signal Shm is a negative signal value, and a plurality of detection signals Shm are integrated to form second signal data Vf.

The signal computing circuit 44 outputs the detection signal Shp or the detection signal Shm to the storage circuit 48 and temporarily stores therein the detection signal Sh.

The signal computing circuit 44 outputs a detection signal Sc based on the detection signal Shp and the detection signal Shm. When the order d of the square matrix Hh is 4, as described in Expression (3) below, four detection signals Sc ($Sc_1$, $Sc_2$, $Sc_3$, $Sc_4$) are obtained from one detection electrode block BKNB(k). In this case, the respective detection signals Sc ($Sc_1$, $Sc_2$, $Sc_3$, $Sc_4$) are obtained from four detection signals $Shp_1$, $Shp_2$, $Shp_3$, and $Shp_4$ and four detection signals $Shm_1$, $Shm_2$, $Shm_3$, and $Shm_4$. The square matrix Hhp indicates a matrix obtained by replacing the elements "−1" of the square matrix Hh with "0", whereas the square matrix Hhm indicates a matrix obtained by replacing the elements "−1" of the square matrix Hh with "1" and replacing the elements "1" thereof with "0". The matrices ShpX and ShmX indicate matrices consisting of a plurality of detection signals Shp and Shm output from the selected detection electrodes Rx, and the matrix ScX indicates a matrix consisting of a plurality of detection signals Sc calculated based on the detection signals Shp and Shm. Further, the matrix SiX indicates a matrix consisting of a plurality of detection signals Si output from the respective detection electrodes Rx.

$$ScX = \begin{pmatrix} Sc_1 \\ Sc_2 \\ Sc_3 \\ Sc_4 \end{pmatrix} = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} Si_1 \\ Si_2 \\ Si_3 \\ Si_4 \end{pmatrix} \quad (3)$$

$$= HhSiX$$

$$= \begin{pmatrix} 1 & 1 & 1 & 1 \\ 1 & 1 & 0 & 0 \\ 1 & 0 & 0 & 1 \\ 1 & 0 & 1 & 0 \end{pmatrix} \begin{pmatrix} Si_1 \\ Si_2 \\ Si_3 \\ Si_4 \end{pmatrix} - \begin{pmatrix} 0 & 0 & 0 & 0 \\ 0 & 0 & 1 & 1 \\ 0 & 1 & 1 & 0 \\ 0 & 1 & 0 & 1 \end{pmatrix} \begin{pmatrix} Si_1 \\ Si_2 \\ Si_3 \\ Si_4 \end{pmatrix}$$

$$= \begin{pmatrix} 1 & 1 & 1 & 1 \\ 1 & 1 & 0 & 0 \\ 1 & 0 & 0 & 1 \\ 1 & 0 & 1 & 0 \end{pmatrix} \begin{pmatrix} Si_1 \\ Si_2 \\ Si_3 \\ Si_4 \end{pmatrix} + \begin{pmatrix} 0 & 0 & 0 & 0 \\ 0 & 0 & 1 & 1 \\ 0 & 1 & 1 & 0 \\ 0 & 1 & 0 & 1 \end{pmatrix} \begin{pmatrix} -Si_1 \\ -Si_2 \\ -Si_3 \\ -Si_4 \end{pmatrix}$$

$$= HhpSix + Hhm(-SiX)$$

$$= ShpX + ShmX$$

$$= \begin{pmatrix} Shp_1 \\ Shp_2 \\ Shp_3 \\ Shp_4 \end{pmatrix} + \begin{pmatrix} Shm_1 \\ Shm_2 \\ Shm_3 \\ Shm_4 \end{pmatrix}$$

The following describes a method for determining the detection signals Sc ($Sc_1$, $Sc_2$, $Sc_3$, $Sc_4$) from the four detection signals $Shp_1$, $Shp_2$, $Shp_3$, and $Shp_4$ and the four detection signals $Shm_1$, $Shm_2$, $Shm_3$, and $Shm_4$ as an example. This description describes a case in which the detection signals Si are ($Si_1$, $Si_2$, $Si_3$, $Si_4$)=(1, 7, 3, 2) as an example. The detection signal $Si_1$ is a signal output from a detection electrode Rx(l). The detection signal $Si_2$ is a signal output from a detection electrode Rx(l+1). The detection signal $Si_3$ is a signal output from a detection electrode Rx(l+2). The detection signal $Si_4$ is a signal output from a detection electrode Rx(l+3). In the sensor 1, one detection signal Sh obtained by integrating the detection signals $Si_1$, $Si_2$, $Si_3$, and $Si_4$ from one detection electrode block BKNB(k) is output. The detection circuit 40 calculates individual detection signals Sid by calculations below.

As illustrated in FIG. 9, in the positive sign selection operation Tcp1 of the detection operation Tc1, the detection control circuit 11 (refer to FIG. 1) selects, as the first selection targets, four detection electrodes Rx(l), Rx(l+1), Rx(l+2), and Rx(l+3) corresponding to the elements "1" on the first row of the square matrix Hh. This brings the detection electrodes Rx(l), Rx(l+1), Rx(l+2), and Rx(l+3) into the coupled state. The detection electrodes Rx as the second selection targets are not selected. In this process, the detection control circuit 11 supplies the drive signal Vs to the detection electrode Tx, and the detection signal $Shp_1$ is output from the detection electrode block BKNB(k). The detection signal $Shp_1$ is a signal value obtained by integrating the detection signals Si output from the detection electrodes Rx as the first selection targets in the positive sign selection operation Tcp1.

The detection signal $Shp_1$ is $Shp_1=1\times1+1\times7+1\times3+1\times2=13$.

In the negative sign selection operation Tcm1, there are no elements "−1" on the first row of the square matrix Hh, and no detection electrodes Rx are selected as the second selection targets corresponding to the elements "−1". That is to say, the four detection electrodes Rx become the non-coupled state. Consequently, the detection signal $Shm_1$ is $Shm_1=0\times1+0\times7+0\times3+0\times2=0$. From the sum of the detection signal $Shp_1$ and the detection signal $Shm_1$, the detection signal $Sc_1$ is $Sc_1=Shp_1+Shm_1=13+0=13$.

Next, as illustrated in FIG. 9, in the positive sign selection operation Tcp2 of the detection operation Tc2, the detection control circuit 11 selects, as the first selection targets, the detection electrodes Rx(l) and Rx(l+2) corresponding to the elements "1" on the second row of the square matrix Hh. This brings the detection electrodes Rx(l) and Rx(l+2) into the coupled state. The detection control circuit 11 selects the detection electrodes Rx(l+1) and Rx(l+3) as the second selection targets. The detection electrodes Rx(l+1) and Rx(l+3) become the non-coupled state. In this process, the detection signal $Shp_2$ is output from the detection electrode block BKNB(k). The detection signal $Shp_2$ is a signal value obtained by integrating the detection signals Si output from the detection electrodes Rx as the first selection targets in the positive sign selection operation Tcp2.

The detection signal $Shp_2$ is a positive signal value, and a plurality of detection signals $Shp_2$ are integrated to form first signal data Vr2. The detection signal $Shp_2$ is $Shp_2=1\times1+0\times7+1\times3+0\times2=4$.

In the negative sign selection operation Tcm2 of the detection operation Tc2, the detection control circuit 11 selects, as the second selection targets, the detection electrodes Rx(l+1) and Rx(l+3) corresponding to the elements "−1" on the second row of the square matrix Hh. With this operation, the detection electrodes Rx(l+1) and Rx(l+3) become the coupled state. The detection control circuit 11 selects the detection electrodes Rx(l) and Rx(l+2) as the first selection targets. The detection electrodes Rx(l) and Rx(l+2) become the non-coupled state. In this process, the detection signal $Shm_2$ is output from the detection electrode block BKNB(k). The detection signal $Shm_2$ is a signal value obtained by integrating the detection signals Si output from the detection electrodes Rx as the second selection targets in the negative sign selection operation Tcm2.

The detection signal $Shm_2$ is a negative signal value, and a plurality of detection signals $Shm_2$ are integrated to form second signal data $Vf2$. The detection signal $Shm_2$ is $Shm_2 = 0 \times (-1) + 1 \times (-7) + 0 \times (-3) + 1 \times (-2) = -9$. For the detection signal $Sc_2$, $Sc_2 = Shp_2 + Shm_2 = 4 + (-9) = -5$ is obtained.

Next, in the positive sign selection operation Tcp3 of the detection operation Tc3, the detection control circuit 11 selects, as the first selection targets, the detection electrodes Rx(l) and Rx(l+1) corresponding to the elements "1" on the third row of the square matrix Hh. This brings the detection electrodes Rx(l) and Rx(l+1) into the coupled state. The detection control circuit 11 selects the detection electrodes Rx(l+2) and Rx(l+3) as the second selection targets. This brings the detection electrodes Rx(l+2) and Rx(l+3) into the non-coupled state. In this process, the detection control circuit 11 supplies the drive signal Vs to the detection electrode Tx, and the detection signal $Shp_3$ is output from the detection electrode block BKNB(k).

The detection signal $Shp_3$ is a positive signal value, and a plurality of detection signals $Shp_3$ are integrated to form first signal data Vr3. The detection signal $Shp_3$ is $Shp_3 = 1 \times 1 + 1 \times 7 + 0 \times 3 + 0 \times 2 = 8$.

In the negative sign selection operation Tcm3 of the detection operation Tc3, the detection control circuit 11 selects, as the second selection targets, the detection electrodes Rx(l+2) and Rx(l+3) corresponding to the elements "−1" on the third row of the square matrix Hh. With this operation, the detection electrodes Rx(l+2) and Rx(l+3) become the coupled state. The detection control circuit 11 selects the detection electrodes Rx(l) and Rx(l+1) as the first selection targets. The detection electrodes Rx(l) and Rx(l+1) become the non-coupled state. In this process, the detection signal $Shm_3$ is output from the detection electrode block BKNB(k). The detection signal $Shm_3$ is a signal value obtained by integrating the detection signals Si output from the detection electrodes Rx as the second selection targets in the negative sign selection operation Tcm3.

The detection signal $Shm_3$ is a negative signal value, and a plurality of detection signals $Shm_3$ are integrated to form second signal data Vf3. The detection signal $Shm_3$ is $Shm_3 = 0 \times (-1) + 0 \times (-7) + 1 \times (-3) + 1 \times (-2) = -5$. For the detection signal $Sc_3$, $Sc_3 = Shp_3 + Shm_3 = 8 + (-5) = 3$ is obtained.

Next, in the positive sign selection operation Tcp4 of the detection operation Tc4, the detection control circuit 11 selects, as the first selection targets, the detection electrodes Rx(l) and Rx(l+3) corresponding to the elements "1" on the fourth row of the square matrix Hh. This brings the detection electrodes Rx(l) and Rx(l+3) into the coupled state. The detection control circuit 11 selects the detection electrodes Rx(l+1) and Rx(l+2) as the second selection targets. This brings the detection electrodes Rx(l+1) and Rx(l+2) into the non-coupled state. In this process, the detection control circuit 11 supplies the drive signal Vs to the detection electrode Tx, and the detection signal $Shp_4$ is output from the detection electrode block BKNB(k).

The detection signal $Shp_4$ is a positive signal value, and a plurality of detection signals $Shp_4$ are integrated to form first signal data Vr4. The detection signal $Shp_4$ is $Shp_4 = 1 \times 1 + 0 \times 7 + 0 \times 3 + 1 \times 2 = 3$.

In the negative sign selection operation Tcm4, the detection control circuit 11 selects, as the second selection targets, the detection electrodes Rx(l+1) and Rx(l+2) corresponding to the elements "−1" on the fourth row of the square matrix Hh. With this operation, the detection electrodes Rx(l+1) and Rx(l+2) become the coupled state. The detection control circuit 11 selects the detection electrodes Rx(l) and Rx(l+3) as the first selection targets. The detection electrodes Rx(l) and Rx(l+3) become the non-coupled state. In this process, the detection signal $Shm_4$ is output from the detection electrode block BKNB(k). The detection signal $Shm_4$ is a signal value obtained by integrating the detection signals Si output from the detection electrodes Rx as the second selection targets in the negative sign selection operation Tcm4.

The detection signal $Shm_4$ is a negative signal value, and a plurality of detection signals $Shm_4$ are integrated to form second signal data Vf4. The detection signal $Shm_4$ is $Shm_4 = 0 \times (-1) + 1 \times (-7) + 1 \times (-3) + 0 \times (-2) = -10$. For the detection signal $Sc_4$, $Sc_4 = Shp_4 + Shm_4 = 3 + (-10) = -7$ is obtained.

The signal computing circuit 44 successively outputs the four detection signals Sc $(Sc_1, Sc_2, Sc_3, Sc_4) = (13, -5, 3, -7)$ to the storage circuit 48.

The signal computing circuit 44 decodes the four detection signals Sc $(Sc_1, Sc_2, Sc_3, Sc_4) = (13, -5, 3, -7)$ by Expression (4) below. The signal computing circuit 44 calculates decoded detection signals $(Si_1 d, Si_2 d, Si_3 d, Si_4 d) = (4, 28, 12, 8)$ based on Expression (4). The matrix Sid indicates a matrix consisting of a plurality of detection signals Sid decoded from the detection signals Sc.

$$\begin{pmatrix} Si_1 d \\ Si_2 d \\ Si_3 d \\ Si_4 d \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Sc_1 \\ Sc_2 \\ Sc_3 \\ Sc_4 \end{pmatrix} \quad (4)$$

The decoded detection signal $Si_1 d$ is assigned to the detection electrode Rx(l). The decoded detection signal $Si_2 d$ is assigned to the detection electrode Rx(l+1). The decoded detection signal $Si_3 d$ is assigned to the detection electrode Rx(l+2). The decoded detection signal $Si_4 d$ is assigned to the detection electrode Rx(l+3). When the recess or protrusion of a finger is in contact or proximity, the value of the decoded detection signals $Si_1 d$, $Si_2 d$, $Si_3 d$, and $Si_4 d$ of the detection electrode Rx corresponding to the contact or proximity position changes.

In the sign selection driving described above, the signal computing circuit 44 performs the decoding processing using Expression (4) for the detection signals Si: $(Si_1, Si_2, Si_3, Si_4) = (1, 7, 3, 2)$, and thus the decoded detection signals Sid: $(Si_1 d, Si_2 d, Si_3 d, Si_4 d) = (4, 28, 12, 8)$, can be obtained. As can be seen from a comparison between the detection signals Si $(Si_1, Si_2, Si_3, Si_4) = (1, 7, 3, 2)$ and the decoded detection signals Sid $(Si_1 d, Si_2 d, Si_3 d, Si_4 d) = (4, 28, 12, 8)$, the decoded detection signals Sid are the order d of the square matrix Hh times the detections signals Si in signal intensity. That is to say, in the first embodiment, the signal intensity can be obtained four times as great as that obtained by time division multiplexing without increasing the voltage of the drive signal Vs. Consequently, even when noise comes in from the outside, the noise immunity of the detection apparatus 100 can be improved by increasing the signal intensity.

In the first embodiment, the detection control circuit 11 switches between the coupled state and the non-coupled state for the detection electrodes Rx as the first selection targets based on the certain sign and the detection electrodes Rx as the second selection targets, which are not included in the first selection targets. The detection circuit 40 performs decoding processing for the detection signals output from the detection electrodes Rx for each selection pattern of different detection electrodes Rx.

Figure 10B:
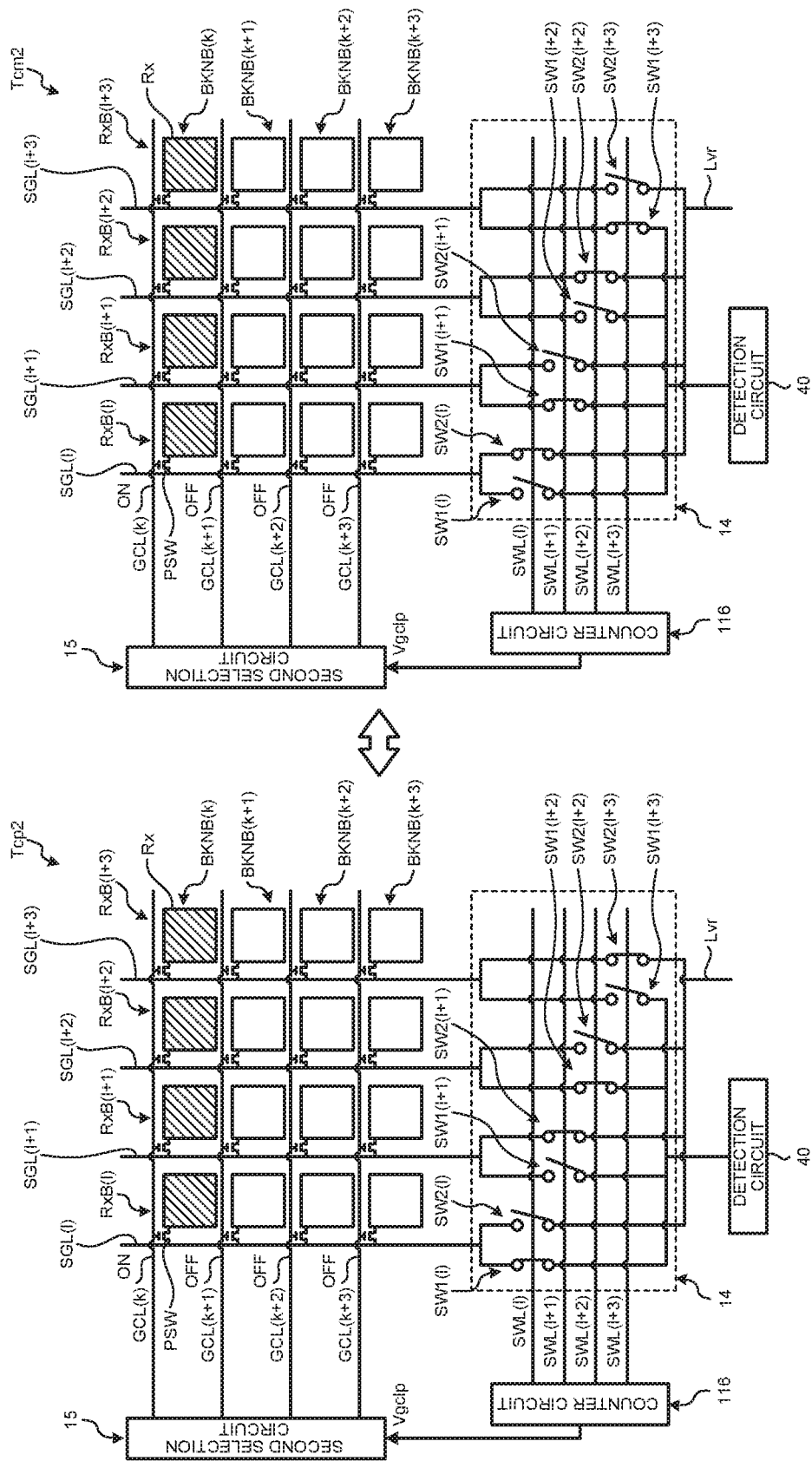
FIG. 10B is a diagram of a coupling pattern of detection electrodes by the sign selection driving for the detection electrode blocks.
Figure 11:
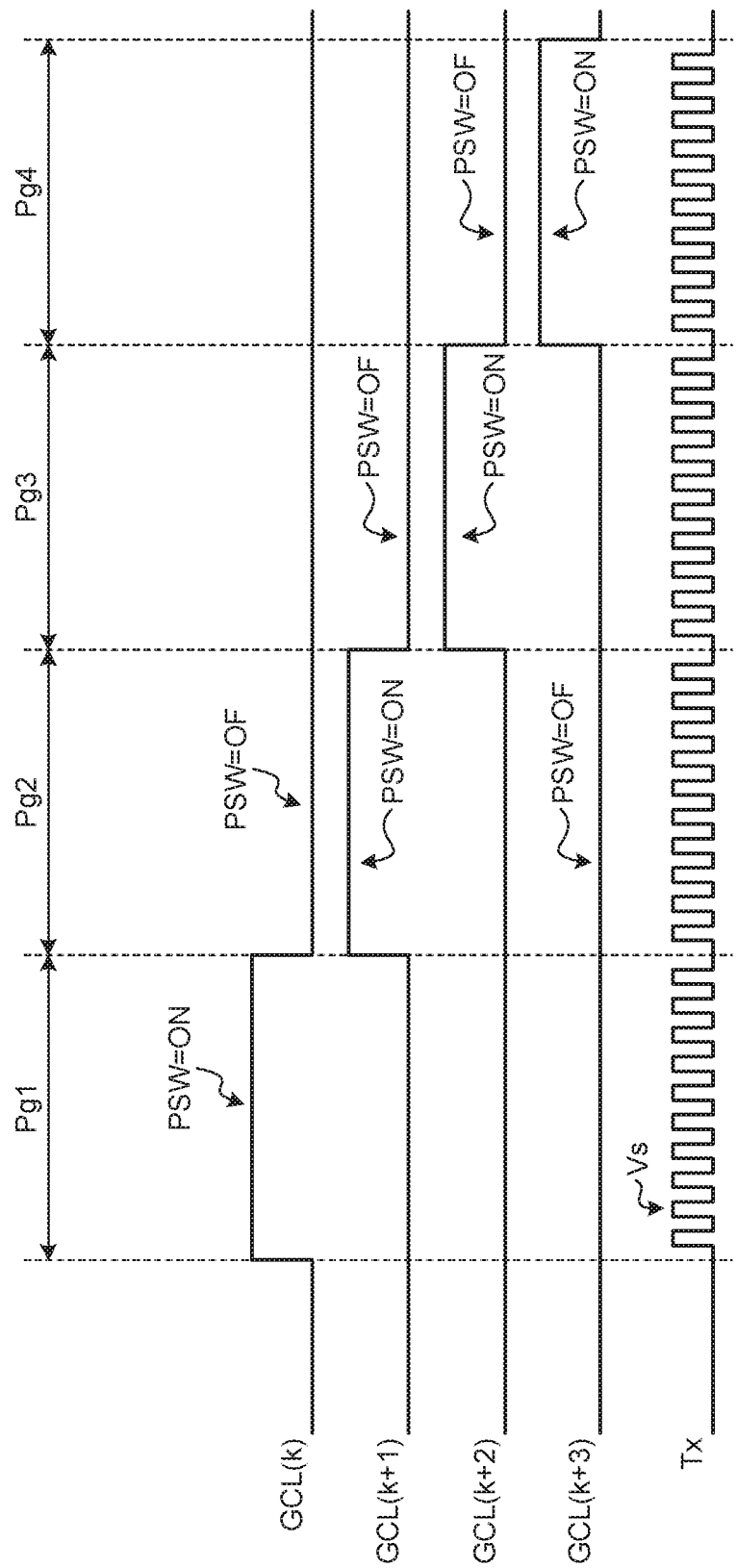
FIG. 11 is a timing waveform diagram of an operation example of the detection apparatus according to the first embodiment.

FIG. 10A and FIG. 10B are diagrams of a coupling pattern of detection electrodes by the sign selection driving for a plurality of detection electrode blocks. FIG. 11 is a timing waveform diagram of an operation example of the detection apparatus according to the first embodiment.

Described with reference to FIG. 10A is a case in which the positive sign selection operation Tcp1 and the negative sign selection operation Tcm1 of the detection operation Tc1 are performed. Described with reference to FIG. 10B is a case in which the positive sign selection operation Tcp2 and the negative sign selection operation Tcm2 of the detection operation Tc2 are performed. As illustrated in FIG. 10A and FIG. 10B, the wiring line L3 and a standard potential supply wiring line Lvr are configured to be coupled to a plurality of data lines SGL. The switch elements SW1 switch between coupling and uncoupling the data lines SGL and the wiring line L3. Switch elements SW2 switch between coupling and uncoupling the data lines SGL and the standard potential supply wiring line Lvr.

The second control circuit 115 supplies the selection signal Vgcl selecting the scan line GCL(k). The second selection circuit 15 supplies a scan signal for turning on the switch elements PSW coupled to the selected scan line GCL(k), based on the selection signal Vgcl. In other words, the second selection circuit 15 selects, as third selection targets, the detection electrodes Rx coupled to the scan line GCL(k) via the switch elements PSW. In the first embodiment, the scan signal for turning on the switch elements PSW is a scan signal with a high-level voltage. The detection electrode block BKNB(k) corresponding to the scan line GCL(k) is caused to be selectable as a selection target of the first selection circuit 14. From the respective detection electrodes Rx of the detection electrode block BKNB(k), detection signals can be output via the data lines SGL(l), SGL(l+1), SGL(l+2), and SGL(l+3).

To the scan lines GCL(k+1), GCL(k+2), and GCL(k+3), a scan signal for turning off the switch elements PSW is supplied from the second selection circuit 15. In other words, the second selection circuit 15 selects, as fourth selection targets, the detection electrodes Rx coupled to the scan lines GCL(k+1), GCL(k+2), and GCL(k+3) via the switch elements PSW. The detection electrodes Rx as the fourth selection targets are the detection electrodes Rx other than the detection electrodes Rx as the third selection targets. In the first embodiment, the scan signal for turning off the switch elements PSW is a scan signal with a low-level voltage. The respective detection electrodes Rx of the detection electrode blocks BKNB(k+1), BKNB(k+2), and BKNB(k+3) are not selected as the selection targets of the first selection circuit 14.

With the detection electrode block BKNB(k) selected by the second selection circuit 15, the positive sign selection operation Tcp1 and the negative sign selection operation Tcm1 of the detection operation Tc1 and the positive sign selection operation Tcp2 and the negative sign selection operation Tcm2 of the detection operation Tc2 described above are performed. In the positive sign selection operation Tcp1, for example, the first selection circuit 14 couples a plurality of data lines SGL coupled to the detection electrodes Rx as the first selection targets to the detection circuit 40 via the switch elements SW1. The first selection circuit 14 couples a plurality of data lines SGL coupled to the detection electrodes Rx as the second selection targets to the standard potential supply wiring line Lvr via the switch elements SW2. With this operation, the standard potential Vrx is supplied to the detection electrodes Rx as the second selection targets. In the negative sign selection operation Tcm1, the first selection circuit 14 couples the data lines SGL coupled to the detection electrodes Rx as the second selection targets to the detection circuit 40. The first selection circuit 14 couples the data lines SGL coupled to the detection electrodes Rx as the first selection targets to the standard potential supply wiring line Lvr via the switch elements SW2. With this operation, the standard potential Vrx is supplied to the detection electrodes Rx as the first selection targets.

By a plurality of positive sign selection operations Tcp and a plurality of negative sign selection operations Tcm, the detection signal Shp and the detection signal Shm are output from the detection electrodes Rx of the detection electrode block BKNB(k) via the detection circuit 40. With this operation, the position of a finger or the like being in contact or proximity in the X direction in an area overlapping each of the detection electrodes Rx of the detection electrode block BKNB(k) is detected.

As illustrated in FIG. 11, the second selection circuit 15 successively supplies a scan signal with a high-level voltage to the scan lines GCL(k), GCL(k+1), GCL(k+2), and GCL(k+3) as selection targets by the selection signal Vgcl for each of gate drive periods Pg1, Pg2, Pg3, and Pg4. The second selection circuit 15 supplies a scan signal with a low-level voltage to the scan lines GCL that are not selected as the selection targets in each of the gate drive periods Pg1, Pg2, Pg3, and Pg4. In each of the gate drive periods Pg1, Pg2, Pg3, and Pg4, the detection operation Tc1 to the detection operation Tc4 described above are performed by the first selection circuit 14. With this operation, the detection signal Shp and the detection signal Shm can be detected from the detection electrodes Rx arranged in the X direction and the Y direction.

Across the gate drive periods Pg1, Pg2, Pg3, and Pg4, the detection control circuit 11 supplies the drive signal Vs to the detection electrode Tx. The drive signal Vs repeats on and off in a period shorter than the gate drive periods Pg1, Pg2, Pg3, and Pg4. In other words, the pulse width of the drive signal Vs is less than the pulse width of the scan signal.

Figure 12:
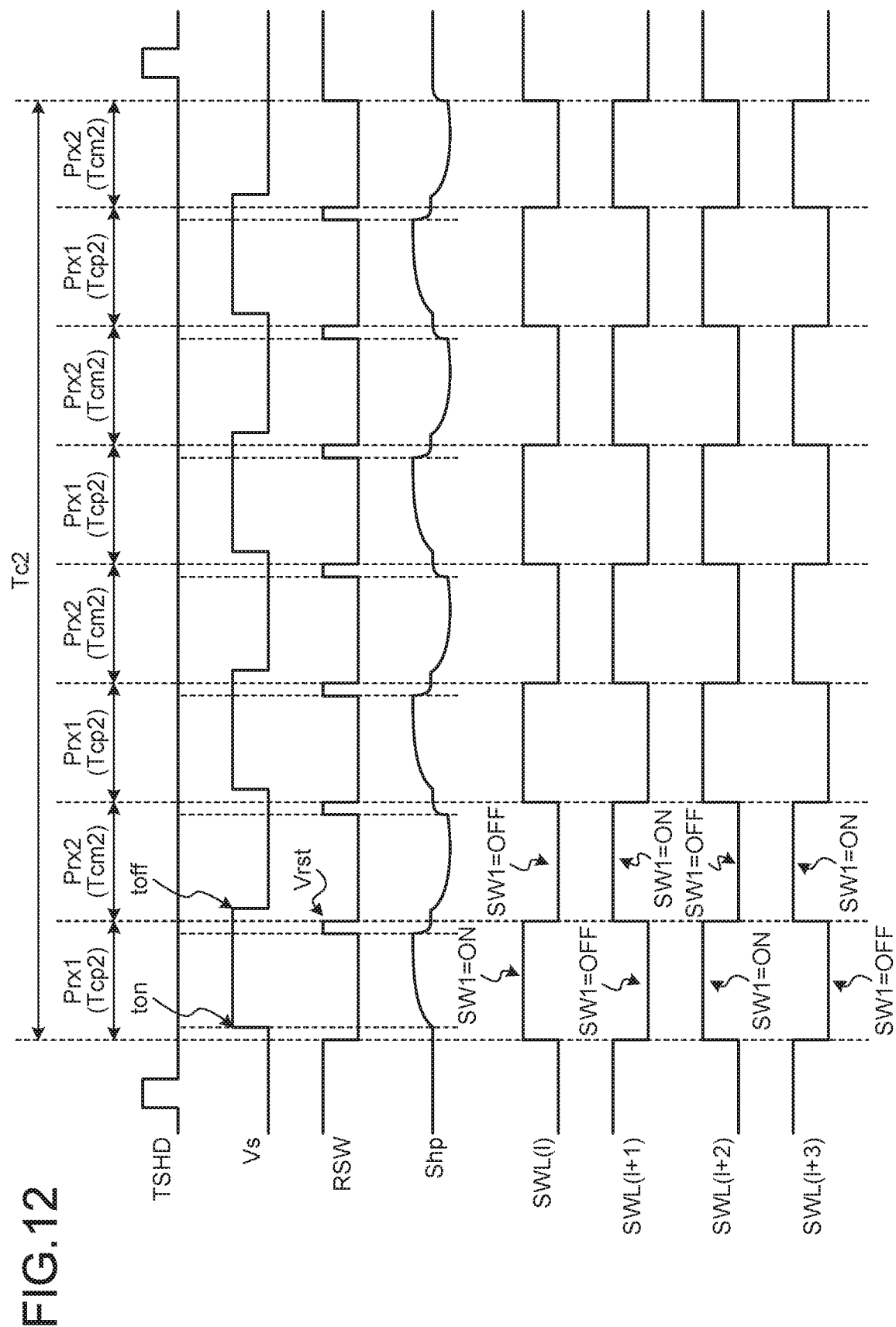
FIG. 12 is a timing waveform diagram of an operation example of a first selection circuit according to the first embodiment.

FIG. 12 is a timing waveform diagram of an operation example of the first selection circuit according to the first embodiment. FIG. 12 illustrates relations between the drive signal Vs, a reset signal Vrst, the detection signal Sh, and operations of the respective switch elements SW1 in the detection operation Tc2.

Based on a control signal TSHD supplied from the detection control circuit 11, the positive sign selection operation Tcp2 and the negative sign selection operation Tcm2 of the detection operation Tc2 start. The positive sign selection operation Tcp2 and the negative sign selection operation Tcm2 are performed repeatedly a plurality of times. That is to say, a switch control signal based on the selection signal Vsglp and the selection signal Vsglm is repeatedly supplied to the switch elements SW1.

A period during which the position sign selection operation Tcp is performed, that is, a period during which the first selection circuit 14 couples the detection electrodes Rx as the first selection targets among a plurality of detection electrodes Rx to the detection circuit 40 is defined as a first period Prx1. A period during which the negative sign selection operation Tcm is performed, that is, a period during which the first selection circuit 14 couples the detection electrodes Rx as the second selection targets, which are not included in the first selection targets, to the detection circuit 40 is defined as a second period Prx2. The first selection circuit 14 causes the detection electrodes Rx as the second selection targets among the detection electrodes Rx to be uncoupled from and the detection circuit 40 in the first period Prx1 and causes the detection electrodes Rx as the first selection targets among the detection electrodes Rx to be uncoupled from the detection circuit 40 in the second period Prx2.

More specifically, the first period Prx1 is a period from a point in time when a switch control signal to be supplied to the switch elements SW1($l$) and SW1($l$+2) coupled to the detection electrodes Rx as the first selection targets rises to a point in time when the switch control signal falls. The second period Prx2 is a period from a point in time when a switch control signal to be supplied to the switch elements SW1($l$+1) and SW1($l$+3) coupled to the detection electrodes Rx as the second selection targets rises to a point in time when the switch control signal falls. The first selection circuit 14 performs the first period Prx1 and the second period Prx2 alternately a plurality of times, or four times each, for example.

The reset signal Vrst is a signal for controlling the reset switch RSW (refer to FIG. 5) of the voltage detector DET. In a period during which the reset signal Vrst is a high-level voltage, the reset switch RSW is turned on, and the capacitor C2 is reset. With this operation, the potential of the output signal of the voltage detector DET becomes the same as that of the standard potential Vrx, and the detection operation of the detection circuit 40 is reset. At a point in time when the reset signal Vrst is turned off, the switch control signal based on the selection signal Vsglp and the selection signal Vsglm to be supplied to the switch elements SW1 is switched. That is to say, at a point in time when the reset signal Vrst makes a transition from a fourth potential (a high-level voltage) to a third potential (a low-level voltage), the first selection circuit 14 switches from the first period Prx1 to the second period Prx2 or switches from the second period Prx2 to the first period Prx1.

As an example, in the switch element SW1($l$), at a point in time when the reset signal Vrst makes a transition from the fourth potential (the high-level voltage) to the third potential (the low-level voltage), a transition is made from the switch control signal based on the selection signal Vsglp to the switch control signal based on the selection signal Vsglm, and the period is switched from the first period Prx1 to the second period Prx2. Next, at a point in time when the reset signal Vrst makes a transition from the fourth potential (the high-level voltage) to the third potential (the low-level voltage), a transition is made from the switch control signal based on the selection signal Vsglm to the switch control signal based on the selection signal Vsglp, and the period is switched from the second period Prx2 to the first period Prx1. Thus, at a point in time when the reset signal Vrst makes a transition from the fourth potential (the high-level voltage) to the third potential (the low-level voltage), the first selection circuit 14 alternately switches between a coupled state in which the detection electrodes Rx as the first selection targets and the detection circuit 40 are coupled (the first period Prx1) and a coupled state in which the detection electrodes Rx as the second selection targets and the detection circuit 40 are coupled (the second period Prx2).

After a lapse of a certain period from the point in time when the reset signal Vrst is turned off, the drive signal Vs is switched between on and off. That is to say, a first point in time ton when the drive signal Vs makes a transition from a first potential (a low-level voltage) to a second potential (a high-level voltage) overlaps the first period Prx1. A second point in time toff when the drive signal Vs makes a transition from the second potential (the high-level potential) to the first potential (the low-level potential) overlaps the second period Prx2.

Thus, the first selection circuit 14 switches the point in time when the switch control signal corresponding to the selection signal Vsglp and the switch control signal corresponding to the selection signal Vsglm are supplied, in accordance with the first point in time ton and the second point in time toff of the drive signal Vs. With this operation, in the positive sign selection operation Tcp2, the detection signal $Shp_2$ having a positive signal value is output from the detection electrodes Rx as the first selection targets. In the negative sign selection operation Tcm2, the detection signal $Shm_2$ having a negative signal value is output from the detection electrodes Rx as the second selection targets.

In the present embodiment, in a plurality of first periods Prx1 and a plurality of second periods Prx2, the detection signals $Shp_2$ and the detection signals $Shm_2$ are detected, respectively. A signal obtained by integrating a plurality of detection signals $Shp_2$ and a plurality of detection signals $Shm_2$ is output to the A/D conversion circuit 43. The A/D conversion circuit 43 converts the detection signal $Sc_2$ obtained by integrating the detection signals $Shp_2$ and the detection signals $Shm_2$ into a piece of digital data and outputs the digital data to the signal computing circuit 44.

Specifically, in FIG. 12, the positive sign selection operation Tcp2 and the negative sign selection operation Tcm2 are performed four times each. In this case, the A/D conversion circuit 43 adds four detection signals $Shp_2$ and four detection signals $Shm_2$ to output one digital signal as the detection signal $Sc_2$.

Consequently, compared with a case in which data output is performed in each of the positive sign selection operation Tcp2 and the negative sign selection operation Tcm2, the amount of data handled by the signal computing circuit 44 reduces by half, and a load of data processing can be reduced. In addition, the detection signal $Shm_2$ has a negative signal value, and the processing to invert signal polarity by the signal computing circuit 44 can be omitted.

The number of performing the positive sign selection operation Tcp and the negative sign selection operation Tcm included in the same detection operation Tc may be three times or less or five times or more each. Although FIG. 12 illustrates a timing waveform diagram in the detection operation Tc2, in the other detection operation Tc1, detection operation Tc3, and detection operation Tc4 as well, the positive sign selection operation Tcp and the negative sign selection operation Tcm are switched in accordance with the first point in time ton and the second point in time toff of the drive signal Vs.

Figure 13:
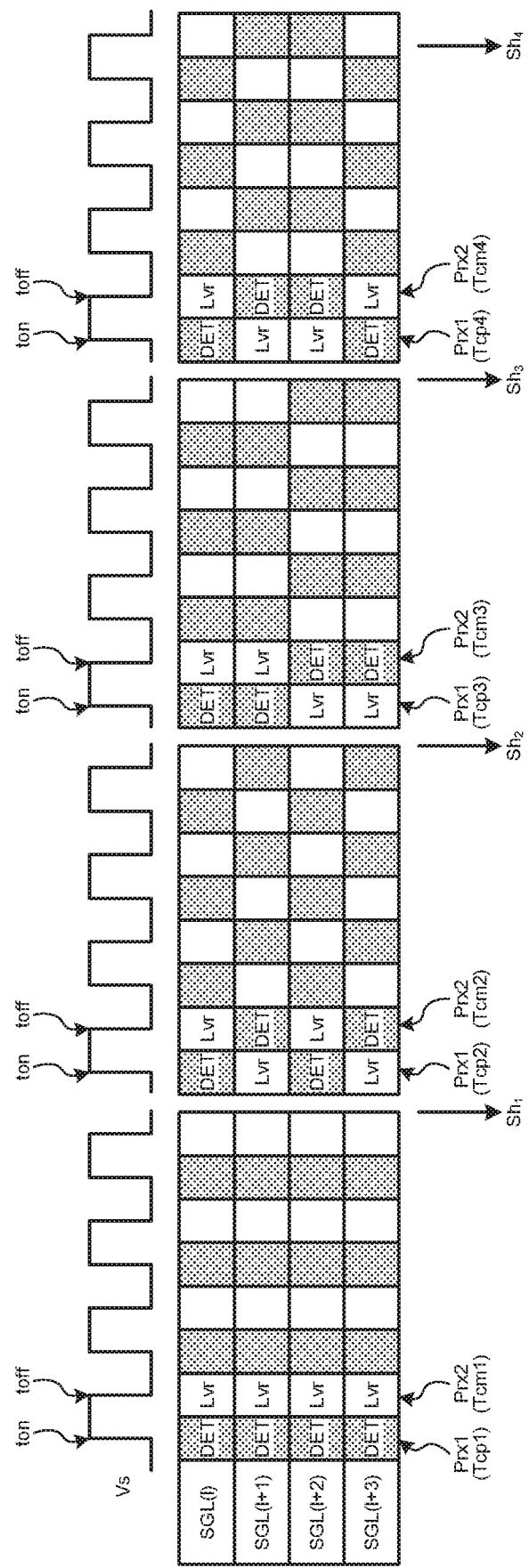
FIG. 13 is an illustrative diagram for illustrating an operation example of the first selection circuit for a plurality of coupling patterns.

FIG. 13 is an illustrative diagram for illustrating an operation example of the first selection circuit for a plurality of coupling patterns.

In FIG. 13, when the detection electrodes Rx coupled to the data lines SGL($l$), SGL($l$+1), SGL($l$+2), and SGL($l$+3) are in the coupled state, that is, when the detection electrodes Rx are coupled to the detection circuit 40 (the voltage detector DET), they are hatched. When the detection electrodes Rx are in the non-coupled state, that is, when the detection electrodes Rx are coupled to the standard potential supply wiring line Lvr, they are not hatched. The respective coupling patterns of the detection operation Tc1 to the detection operation Tc4 are similar to those in FIG. 9, and a detailed description will be omitted.

In the detection operation Tc1, the first point in time ton of the drive signal Vs overlaps the first period Prx1 (the positive sign selection operation Tcp1). The second point in time toff of the drive signal Vs overlaps the second period Prx2 (the negative sign selection operation Tcm1). With this overlapping, in the positive sign selection operation Tcp1, the detection signals $Shp_1$ each having a positive signal value are output from the detection electrodes Rx as the first selection targets. In the negative sign selection operation Tcm1, all the detection electrodes Rx are in the non-coupled state, and the detection signals $Shm_1$ as zero are output. The detection signal $Sc_1$ obtained by integrating a plurality of detection signals $Shp_1$ and a plurality of detection signals $Shm_1$ is output as one digital signal.

In the detection operation Tc2 to the detection operation Tc4, the first point in time ton of the drive signal Vs overlaps the first period Prx1 (the positive sign selection operations Tcp2, Tcp3, and Tcp4). The second point in time toff of the drive signal Vs overlaps the second period Prx2 (the negative sign selection operations Tcm2, Tcm3, and Tcm4). With this overlapping, in the positive sign selection operations Tcp2, Tcp3, and Tcp4, the detection signals $Shp_2$, $Shp_3$, and $Shp_4$ having positive signal values are output, respectively, from the detection electrodes Rx as the first selection targets. In the negative sign selection operations Tcm2, Tcm3, and Tcm4, the detection signals $Shm_2$, $Shm_3$, and $Shm_4$ having negative signal values are output, respectively. Thus, the first selection circuit 14 performs the coupling of the first period Prx1 and the coupling of the second period Prx2 alternately a plurality of times for each selection pattern of a plurality of detection operations Tc (the detection operation Tc1 to the detection operation Tc4).

With this operation, in the detection operation Tc2, the detection signal $Sc_2$ obtained by integrating a plurality of detection signals $Shp_2$ and a plurality of detection signals $Shm_2$ is output as one digital signal. In the detection operation Tc3, the detection signal $Sc_3$ obtained by integrating a plurality of detection signals $Shp_3$ and a plurality of detection signals $Shm_3$ is output as one digital signal. In the detection operation Tc4, the detection signal $Sc_4$ obtained by integrating a plurality of detection signals $Shp_4$ and a plurality of detection signals $Shm_4$ is output as one digital signal.

The signal computing circuit 44 decodes the four detection signals Sc ($Sc_1$, $Sc_2$, $Sc_3$, $Sc_4$) to obtain the decoded detection signals Sid ($Si_1d$, $Si_2d$, $Si_3d$, $Si_4d$).

Although the first embodiment describes a case in which the number n of the detection electrodes Rx included in the detection electrode block BKNB(l) is four, the number n thereof is not limited thereto; the number n of the detection electrodes Rx may be two, three, or five or more. In this case, the order d of the square matrix Hh is also changed in accordance with the number n of the detection electrodes Rx.

The first embodiment describes detecting the shape and/or fingerprint of a finger Fin by the detection apparatus 100. However, the object to be detected by the detection apparatus 100 is not limited to the finger Fin. The detection apparatus 100 may have a palm, not the finger Fin, as the object to be detected. The object to be detected by the detection apparatus 100 may be an external object having a fine recess or a protrusion that changes capacitance depending on the distance from the detection electrodes Rx. The detection apparatus 100 may detect both the finger Fin and the palm as objects to be detected. The detection apparatus can detect a capacitance change caused by the recess or protrusion of the palm to detect the shape and/or palm print of the palm.

Second Embodiment

The first embodiment describes an operation example when time division multiplexing (hereinafter, TDM) is used for the fingerprint detection in the Y direction. More specifically, the first embodiment describes the driving in which the second selection circuit 15 selects the detection electrodes Rx arranged in the Y direction one by one in a time division manner via the scan lines GCL coupled by the switch elements PSW. A second embodiment will describe an operation example when the sign selection driving is used for fingerprint detection in the X direction and the Y direction.

Figure 14A:
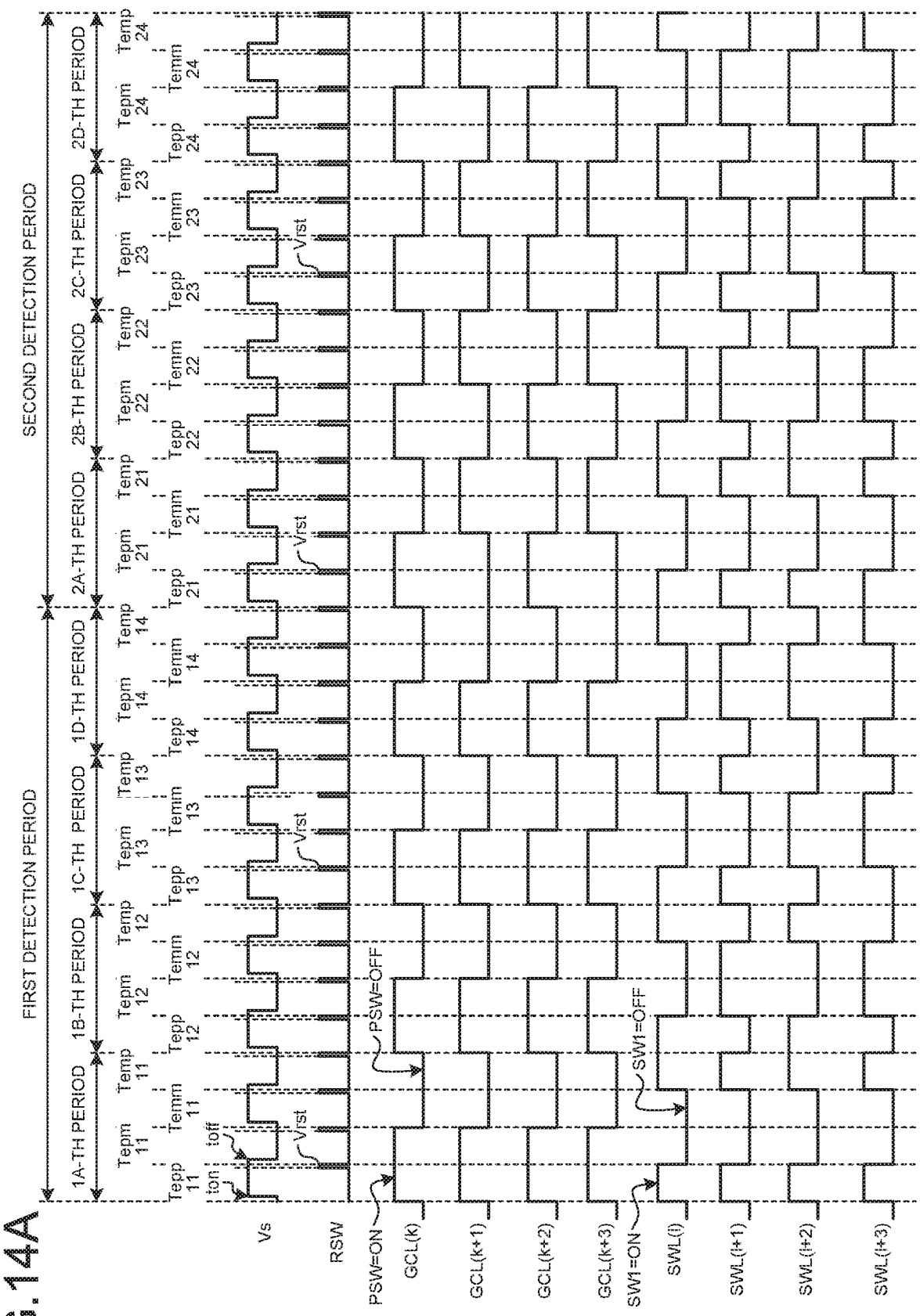
FIG. 14A is a timing waveform diagram of an operation example in a first detection period and a second detection period of a detection apparatus according to a second embodiment.
Figure 14B:
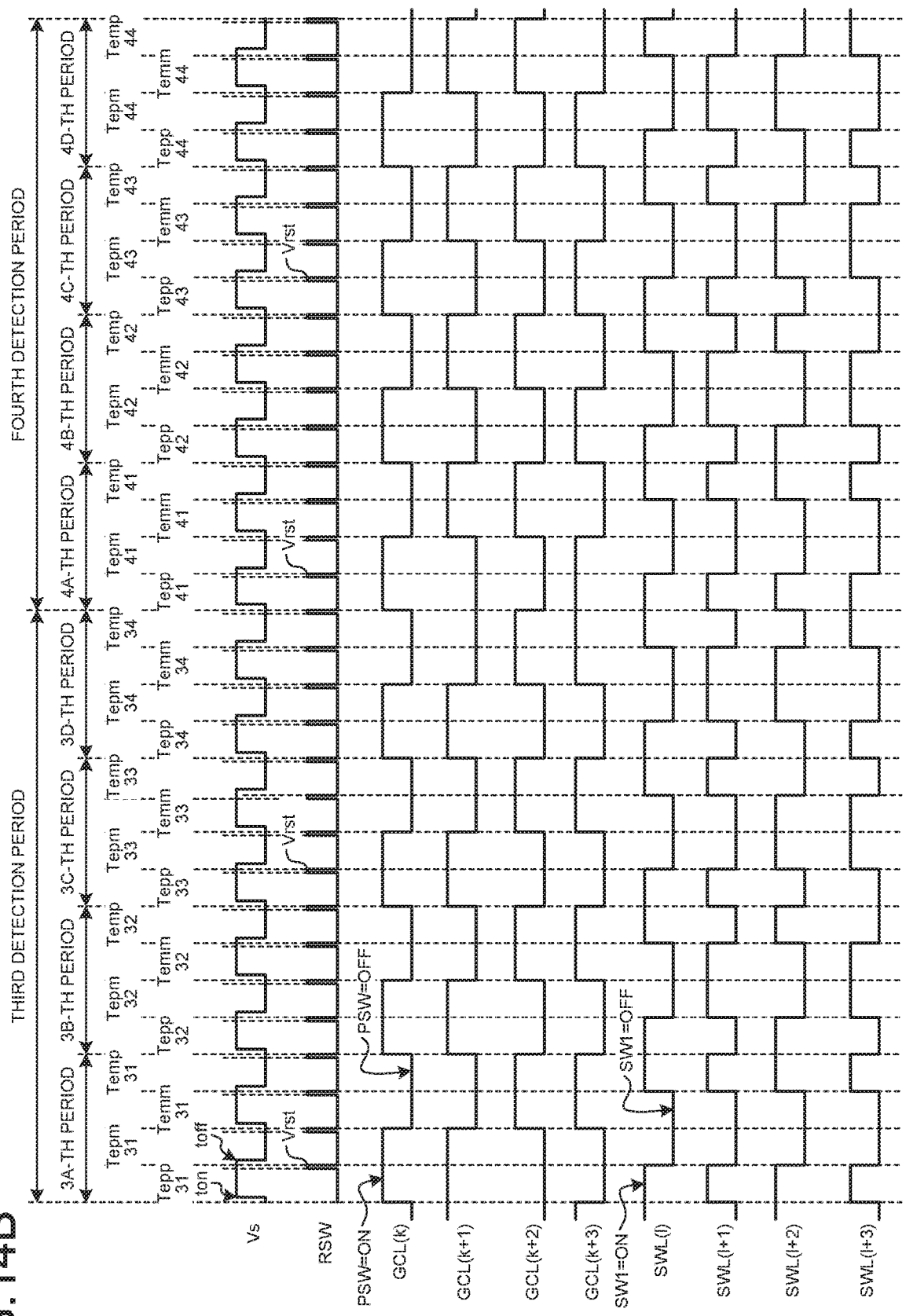
FIG. 14B is a timing waveform diagram of an operation example in a third detection period and a fourth detection period of the detection apparatus according to the second embodiment.

FIGS. 14A and 14B are timing waveform diagrams of operation examples of a detection apparatus according to the second embodiment. FIG. 14A is a timing waveform diagram of an operation example in a first detection period and a second detection period of the detection apparatus according to the second embodiment. FIG. 14B is a timing waveform diagram of an operation example in a third detection period and a fourth detection period of the detection apparatus according to the second embodiment. FIGS. 15A to 15D are diagrams for illustrating an example of coupling patterns of detection electrodes selected as selection targets in a detection operation in a 1A-th period according to the second embodiment. FIGS. 16A to 16D are illustrative diagrams for illustrating an example of coupling patterns of detection electrodes selected as selection targets in a detection operation in a 1B-th period. FIGS. 17A to 17D are illustrative diagrams for illustrating an example of coupling patterns of detection electrodes as selection targets in a detection operation in a 1C-th period. FIGS. 18A to 18D are illustrative diagrams for illustrating an example of coupling patterns of detection electrodes as selection targets in a detection operation in a 1D-th period. FIGS. 19A to 19D are illustrative diagrams for illustrating an example of coupling patterns of detection electrodes as selection targets in a detection operation in a 2A-th period. FIGS. 20A to 20D are illustrative diagrams for illustrating an example of coupling patterns of detection electrodes as selection targets in a detection operation in a 3A-th period. FIGS. 21A to 21D are illustrative diagrams for illustrating an example of coupling patterns of detection electrodes as selection targets in a detection operation in a 4A-th period.

In the second embodiment, the second control circuit 115 and the second selection circuit 15 perform the sign selection driving in the Y direction based on a certain sign. The certain sign used in the sign selection driving in the Y direction is an Hadamard matrix and is a square matrix Hv with an order of r. The order r of the square matrix Hv is indicated by $2^{Nb}$. Nb is an integer equal to or greater than 1 and is 2 as described by Expression (5) in the second embodiment. The order r of the square matrix Hv is equal to or greater than a number u of the detection electrodes Rx arranged in the Y direction included in the detection electrode block R×B selected by the second selection circuit 15.

$$Hv = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (5)$$

As illustrated in FIGS. 14A and 14B, in the second embodiment, the first selection circuit 14 performs the sign selection driving in the X direction based on the square matrix Hh, whereas the second selection circuit 15 performs the sign selection driving in the Y direction based on the square matrix Hv. In this case, in the first period Prx1 illustrated in FIG. 12, a detection operation Tepp is performed in which the first selection circuit 14 performs a positive sign selection operation based on the elements "1" of each column of the square matrix Hh and the second selection circuit 15 performs a positive sign selection operation based on the elements "1" of each row of the square matrix Hv. In the first period Prx1 illustrated in FIG. 12, a detection operation Temm is performed in which the first selection circuit 14 performs a negative sign selection operation based on the elements "−1" on each column of the square matrix Hh and the second selection circuit 15 performs a negative sign selection operation based on the elements "−1" on each row of the square matrix Hv. In the second period Prx2 illustrated in FIG. 12, a detection operation Temp is performed in which the first selection circuit 14 performs a positive sign selection operation based on the elements "1" of each column of the square matrix Hh and the second selection circuit 15 performs a negative sign selection operation based on the elements "−1" on each row of the square matrix Hv. In the second period Prx2 illustrated in FIG. 12, a detection operation Tepm is performed in which the first selection circuit 14 performs a negative sign selection operation based on the elements "−1" on each column of the square matrix Hh and the second selection circuit 15 performs a positive sign selection operation based on the elements "1" of each row of the square matrix Hv. By doing so, a detection signal Shpp and a detection signal Shmm having positive signal values can be acquired from the detection operation Tepp and the detection operation Temm, whereas a detection signal Shpm and a detection signal Shmp having negative signal values can be acquired from the detection operation Tepm and the detection operation Temp. Consequently, a detection signal Sc can be acquired from the detection signal Shpp, the detection signal Shmm, the detection signal Shpm, and the detection signal Shmp by Expression (6). The square matrix Hvp indicates a matrix obtained by replacing the elements "−1" of the square matrix Hv with "0", whereas the matrix Hvm indicates a matrix obtained by replacing the elements "−1" of the square matrix Hv with "1" and replacing the elements "1" thereof with "0".

$$ScX = \begin{pmatrix} Sc_{11} & Sc_{21} & Sc_{31} & Sc_{41} \\ Sc_{12} & Sc_{22} & Sc_{32} & Sc_{42} \\ Sc_{13} & Sc_{23} & Sc_{33} & Sc_{43} \\ Sc_{14} & Sc_{24} & Sc_{34} & Sc_{44} \end{pmatrix} \quad (6)$$

$$= \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} Si_{11} & Si_{21} & Si_{31} & Si_{41} \\ Si_{12} & Si_{22} & Si_{32} & Si_{42} \\ Si_{13} & Si_{23} & Si_{33} & Si_{43} \\ Si_{14} & Si_{24} & Si_{34} & Si_{44} \end{pmatrix} \begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

$$= Hv(SiX)Hh$$

$$= \{Hvp(SiX) - Hvm(SiX)\}(Hhp - Hhm)$$

$$= Hvp(SiX)Hhp - Hvp(SiX)Hhm -$$

$$Hvm(SiX)Hhp + Hvm(SiX)Hhm$$

$$= Hvp(SiX)Hhp + Hvp(-SiX)Hhm +$$

$$Hvm(-SiX)Hhp + Hvm(SiX)Hhm$$

-continued
$$= \begin{pmatrix} Shpp_{11} + Shpm_{11} + Shmp_{11} + Shmm_{11} \\ Shpp_{21} + Shpm_{21} + Shmp_{21} + Shmm_{21} \\ Shpp_{12} + Shpm_{12} + Shmp_{12} + Shmm_{12} \\ Shpp_{22} + Shpm_{22} + Shmp_{22} + Shmm_{22} \\ Shpp_{13} + Shpm_{13} + Shmp_{13} + Shmm_{13} \\ Shpp_{23} + Shpm_{23} + Shmp_{23} + Shmm_{23} \\ Shpp_{14} + Shpm_{14} + Shmp_{14} + Shmm_{14} \\ Shpp_{24} + Shpm_{24} + Shmp_{24} + Shmm_{24} \\ Shpp_{31} + Shpm_{31} + Shmp_{31} + Shmm_{31} \\ Shpp_{41} + Shpm_{41} + Shmp_{41} + Shmm_{41} \\ Shpp_{32} + Shpm_{32} + Shmp_{32} + Shmm_{32} \\ Shpp_{42} + Shpm_{42} + Shmp_{42} + Shmm_{42} \\ Shpp_{33} + Shpm_{33} + Shmp_{33} + Shmm_{33} \\ Shpp_{43} + Shpm_{43} + Shmp_{43} + Shmm_{43} \\ Shpp_{34} + Shpm_{34} + Shmp_{34} + Shmm_{34} \\ Shpp_{44} + Shpm_{44} + Shmp_{44} + Shmm_{44} \end{pmatrix}$$

The detection circuit 40 decodes the detection signal Sc based on Expression (7) to obtain a decoded detection signal Sidr. More specifically, in the second embodiment, 16 decoded detection signals Sidr ($Si_{11}dr$, $Si_{12}dr$, $Si_{13}dr$, $Si_{14}dr$, $Si_{21}dr$, $Si_{22}dr$, $Si_{23}dr$, $Si_{24}dr$, $Si_{31}dr$, $Si_{32}dr$, $Si_{33}dr$, $Si_{34}dr$, $Si_{41}dr$, $Si_{42}dr$, $Si_{43}dr$, and $Si_{44}dr$) are acquired. These decoded detection signals Sidr are associated with the detection electrodes Rx included in the k-th row to the (k+3)-th row and the l-th column to the (l+3)-th column. The detection signal $Si_{11}dr$ is associated with the detection electrode Rx on the k-th row and the l-th column, whereas the detection signal $Si_{44}dr$ is associated with the detection electrode Rx on the (k+3)-th row and the (l+3)-th column, for example. These decoded detection signals Sidr correspond to values obtained by multiplying the detection signals Si from the respective detection electrodes Rx by the order r of the square matrix Hv and the order d of the square matrix Hh. Consequently, in the second embodiment, 16-fold signal values can be acquired. The matrix dr(Si)X indicates a matrix consisting of a plurality of detection signals Sidr decoded from a plurality of detection signals Sc.

$$dr(Si)X = Hv(ScX)Hh \quad (7)$$

$$= \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} Sc_{11} & Sc_{21} & Sc_{31} & Sc_{41} \\ Sc_{12} & Sc_{22} & Sc_{32} & Sc_{42} \\ Sc_{13} & Sc_{23} & Sc_{33} & Sc_{43} \\ Sc_{14} & Sc_{24} & Sc_{34} & Sc_{44} \end{pmatrix}$$

$$\begin{pmatrix} 1 & 1 & 1 & 1 \\ 1 & 1 & -1 & -1 \\ 1 & -1 & -1 & 1 \\ 1 & -1 & 1 & -1 \end{pmatrix}$$

Figure 15A:
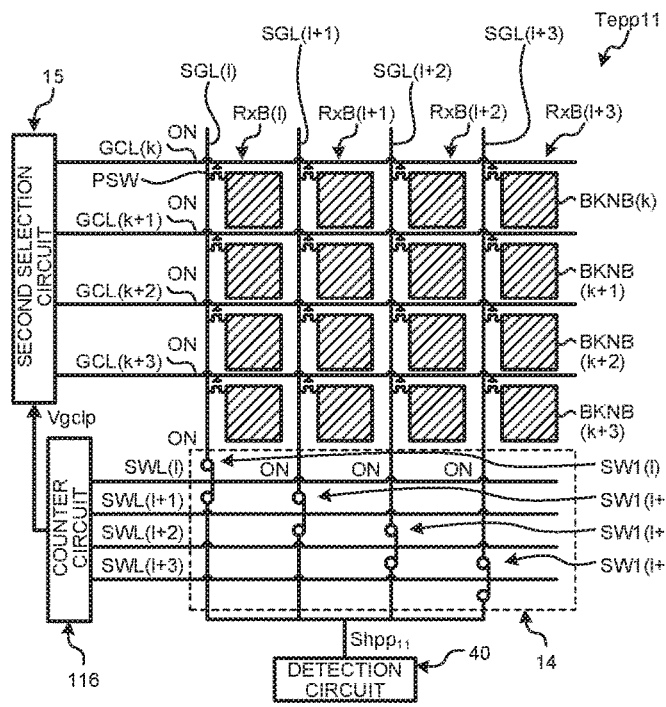
FIGS. 15A to 15D are illustrative diagrams for illustrating an example of coupling patterns of detection electrodes selected as selection targets in a detection operation in a 1A-th period according to the second embodiment.
Figure 15B:
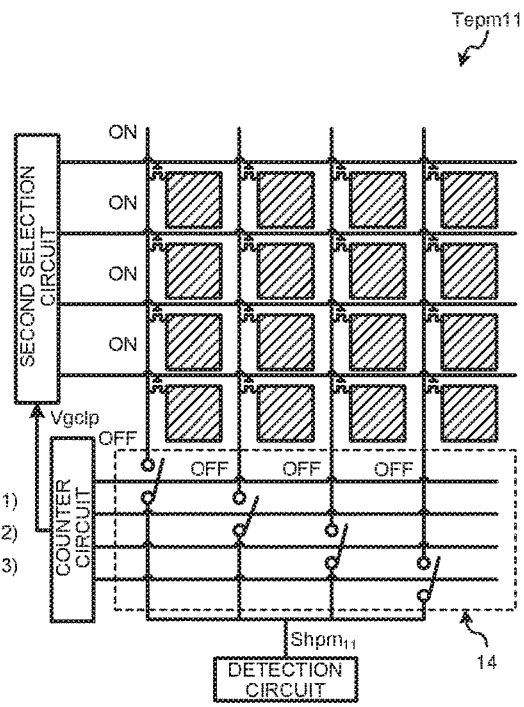
Figure 15C:
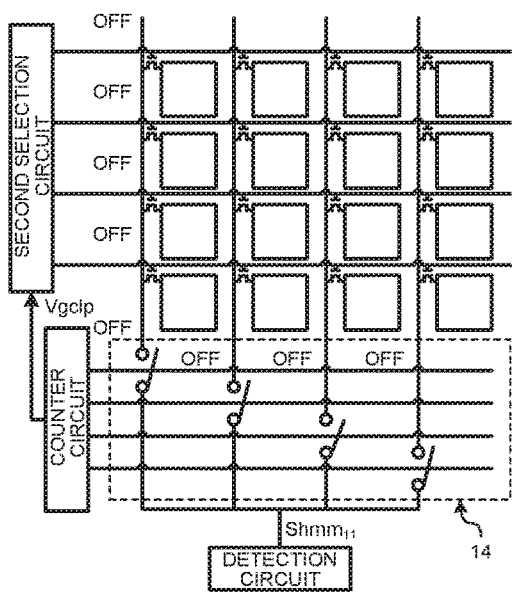
Figure 15D:
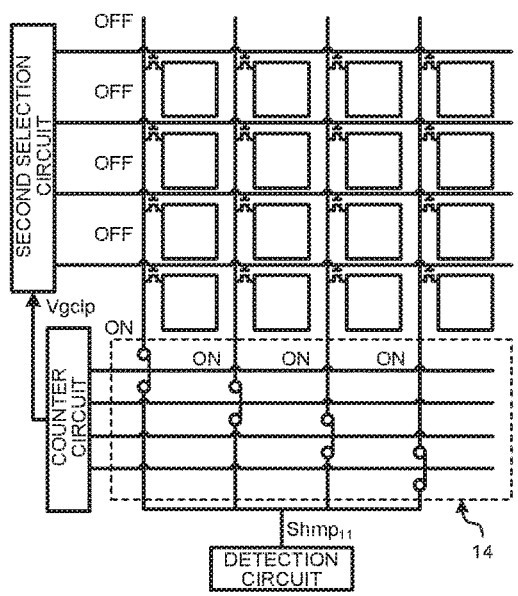

FIG. 15A illustrates a detection operation Tepp11 in the 1A-th period, whereas FIG. 15B illustrates a detection operation Tepm11 in the 1A-th period. FIG. 15C illustrates a detection operation Temm11 in the 1A-th period, whereas FIG. 15D illustrates a detection operation Temp11 in the 1A-th period. In FIG. 15A and FIG. 15B, the sign selection driving in the Y direction selects, as the third selection targets of the square matrix Hv, the detection electrodes Rx belonging to the detection electrode blocks BKNB(k), BKNB(k+1), BKNB(k+2), and BKNB(k+3) in accordance with the elements "1" on the first row of the square matrix Hv described in Expression (5). In FIG. 15C and FIG. 15D, the first row of the square matrix Hv described in Expression (5) does not include any elements "−1", and the sign selection driving in the Y direction does not select any of the detection electrode blocks BKNB(k), BKNB(k+1), BKNB(k+2), and BKNB(k+3). In other words, in the sign selection driving in the Y direction, no detection electrodes Rx are selected as the fourth selection targets. The coupling pattern in the Y direction in the detection operation Tepp and the detection operation Tepm (the third selection targets) is an inverted pattern of the coupling pattern in the Y direction in the detection operation Temm and the detection operation Temp (the fourth selection targets).

The detection electrodes Rx of the detection electrode block BKNB(k) is the detection electrodes Rx coupled to the scan line GCL(k). The detection electrodes Rx of the detection electrode block BKNB(k+1) is the detection electrodes Rx coupled to the scan line GCL(k+1). The detection electrodes Rx of the detection electrode block BKNB(k+2) is the detection electrodes Rx coupled to the scan line GCL(k+2). The detection electrodes Rx of the detection electrode block BKNB(k+3) is the detection electrodes Rx coupled to the scan line GCL(k+3). The second selection circuit 15 supplies a scan signal based on the gate selection signal Vgclp to the scan line GCL corresponding to "1" of the square matrix Hv in the detection operation Tepp and the detection operation Tepm. With this operation, a scan line GCL as the third selection target of the square matrix Hv among the scan lines GCL is selected. Consequently, the detection electrodes Rx coupled to the scan line GCL as the third selection targets are selected.

The first selection circuit 14 performs the positive sign selection operation and the negative sign selection operation alternately a plurality of times in the sign selection driving in the X direction. In the detection operation Tepp11 and the detection operation Temp11, the detection electrodes Rx belonging to the detection electrode blocks RxB(l), RxB(l+1), RxB(l+2), and RxB(l+3) are selected as the detection electrodes Rx as the first selection targets of the square matrix Hh in accordance with the elements "1" on the first column of the square matrix Hh and are coupled to the detection circuit 40 via the second selection circuit 15. In the detection operation Temp11 and the detection operation Temm11, there are no elements "−1" on the first column of the square matrix Hh, and no detection electrodes Rx are selected as the second selection targets of the square matrix Hh corresponding to the elements "−1".

Consequently, a detection signal $Shpp_{11}$ is output in the detection operation Tepp11, a detection signal $Shpm_{11}$ is output in the detection operation Tepm11, a detection signal $Shmm_{11}$ is output in the detection operation Temm11, and a detection signal $Shmp_{11}$ is output in the detection operation Temp11. The detection operation Tepp11 and the detection operation Temm11 correspond to the first period Prx1 illustrated in FIG. 12, and the detection signal $Shpp_{11}$ and the detection signal $Shmm_{11}$ show positive signal values. The detection operation Tepm11 and the detection operation Temp11 correspond to the second period Prx2 illustrated in FIG. 12, and the detection signal $Shpm_{11}$ and the detection signal $Shmp_{11}$ show negative signal values. Consequently, these detection signals are added together to calculate a detection signal $Sc_{11}$. The detection signal $Shpm_{11}$, the detection signal $Shmp_{11}$, and the detection signal $Shmm_{11}$ are zero because no detection electrodes Rx are selected as the second selection targets or the fourth selection targets in the negative sign selection operation in the X direction or the Y direction.

Figure 16A:
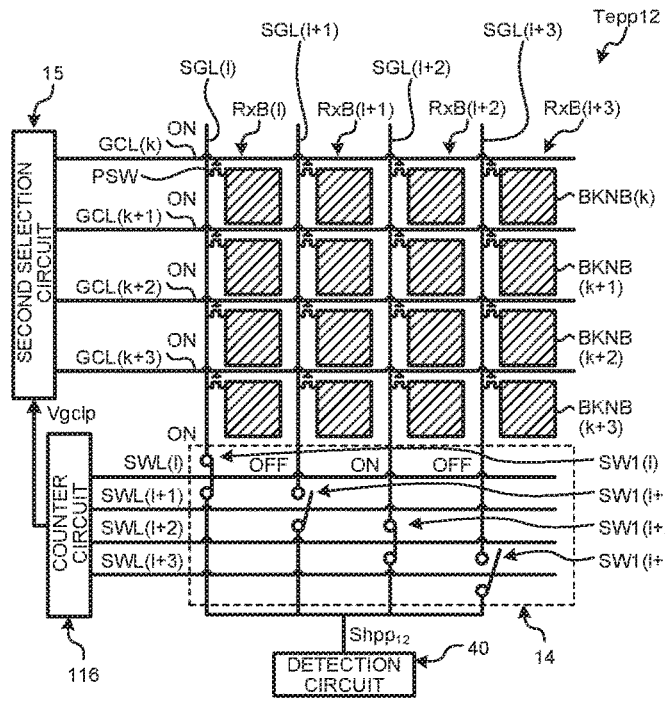
FIGS. 16A to 16D are illustrative diagrams for illustrating an example of coupling patterns of detection electrodes selected as selection targets in a detection operation in a 1B-th period.
Figure 16B:
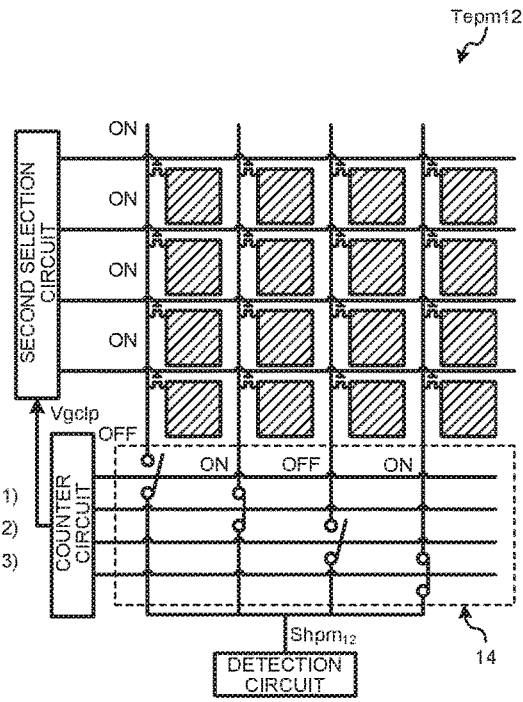
Figure 16C:
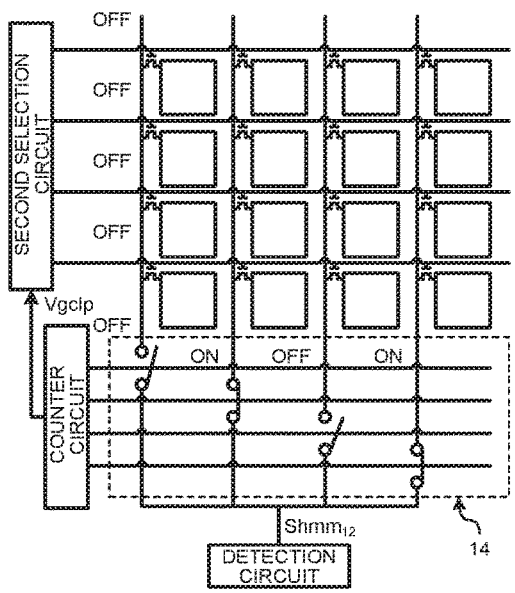
Figure 16D:
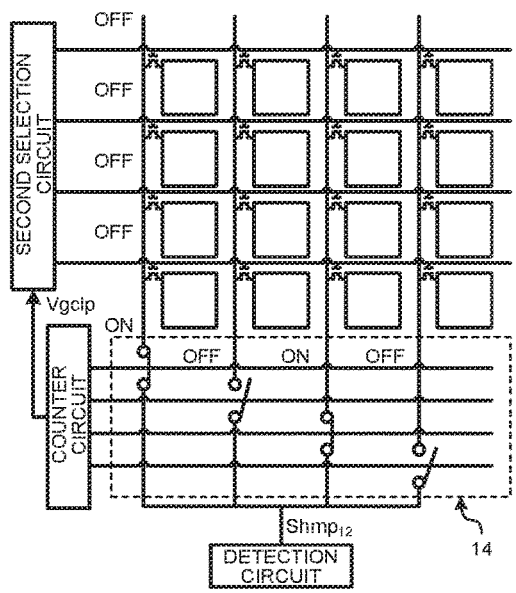

FIG. 16A illustrates a detection operation Tepp12 in the 1B-th period, whereas FIG. 16B illustrates a detection operation Tepm12 in the 1B-th period. FIG. 16C illustrates a detection operation Temm12 in the 1B-th period, whereas FIG. 16D illustrates a detection operation Temp12 in the 1B-th period. The sign selection operation in the Y direction in the 1B-th period is selection similar to the sign selection operation in the Y direction in the 1A-th period. In the detection operation Tepp12 and the detection operation Tepm12, the detection electrodes Rx included in the detection electrode block BKNB corresponding to the elements "1" on the first row of the square matrix Hv are selected as the third selection targets, whereas in the detection operation Temp12 and the detection operation Temm12, the detection electrodes Rx included in the detection electrode block BKNB corresponding to the elements "−1" on the first row of the square matrix Hv are selected as the fourth selection targets.

The sign selection driving in the X direction in the 1B-th period selects, as the first selection targets of the square matrix Hh, the detection electrodes Rx of the detection electrode blocks RxB(l) and RxB(l+2) in accordance with the elements "1" on the second column of the square matrix Hh as illustrated in FIG. 16A and FIG. 16D, and selects, as the second selection targets of the square matrix Hh, the detection electrodes Rx of the detection electrode blocks RxB(l+1) and RxB(l+3) in accordance with the elements "−1" on the second column of the square matrix Hh as illustrated in FIG. 16B and FIG. 16C. In the sign selection driving in the X direction, the positive sign selection operation and the negative sign selection operation of the square matrix Hh are performed repeatedly a plurality of times.

Consequently, a detection signal $Shpp_{12}$ is output in the detection operation Tepp12, a detection signal $Shpm_{12}$ is output in the detection operation Tepm12, a detection signal $Shmm_{12}$ is output in the detection operation Temm12, and a detection signal $Shmp_{12}$ is output in the detection operation Temp12. The detection operation Tepp12 and the detection operation Temm12 correspond to the first period Prx1 illustrated in FIG. 12, and the detection signal $Shpp_{12}$ and the detection signal $Shmm_{12}$ show positive signal values. The detection operation Tepm12 and the detection operation Temp12 correspond to the second period Prx2 illustrated in FIG. 12, and the detection signal $Shpm_{12}$ and the detection signal $Shmp_{12}$ show negative signal values. Consequently, these detection signals are added together to calculate a detection signal $Sc_{12}$. The detection signal $Shmp_{12}$ and the detection signal $Shmm_{12}$ are zero because no detection electrodes Rx are selected as the fourth selection targets in the negative sign selection operation in the Y direction.

Figure 17A:
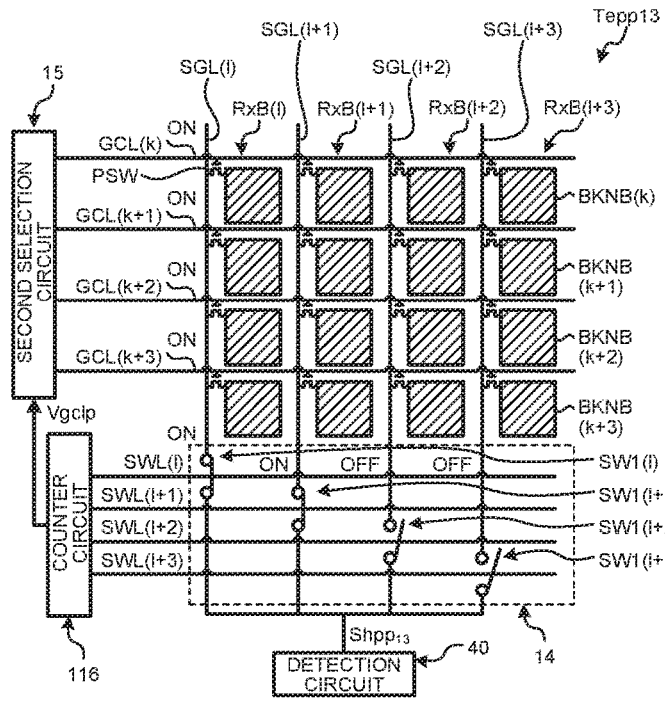
FIGS. 17A to 17D are illustrative diagrams for illustrating an example of coupling patterns of detection electrodes as selection targets in a detection operation in a 1C-th period.
Figure 17B:
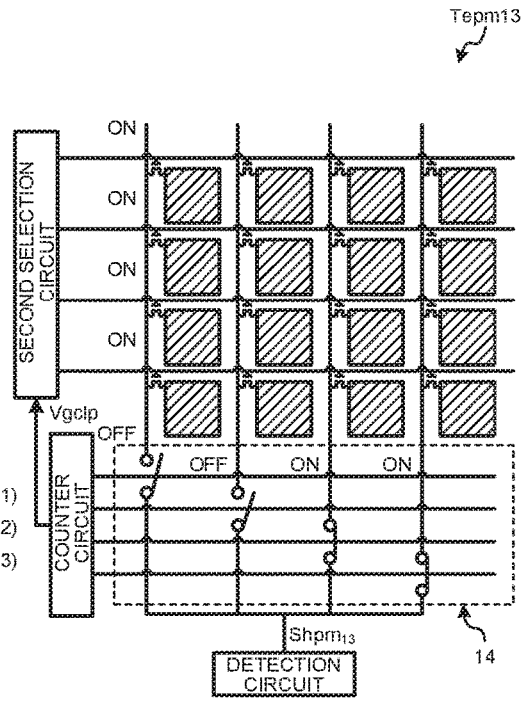
Figure 17C:
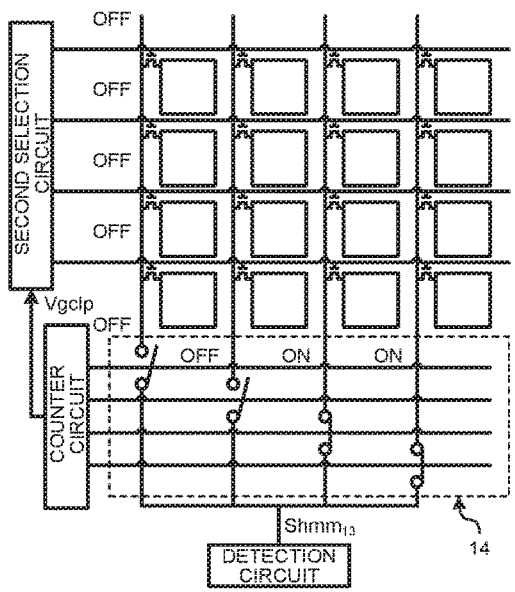
Figure 17D:
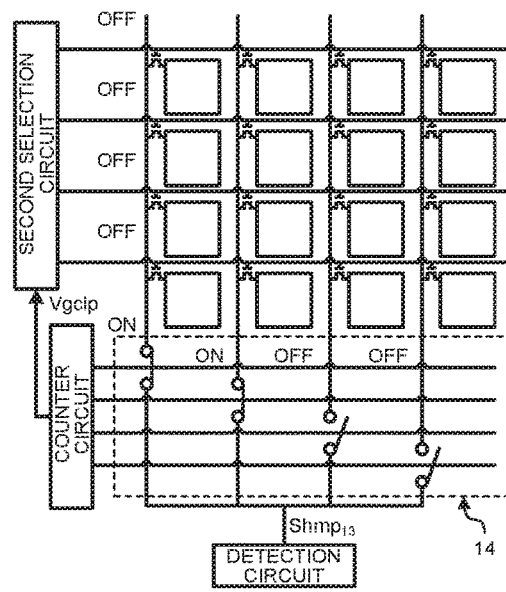

FIG. 17A illustrates a detection operation Tepp13 in the 1C-th period, whereas FIG. 17B illustrates a detection operation Tepm13 in the 1C-th period. FIG. 17C illustrates a detection operation Temm13 in the 1C-th period, whereas FIG. 17D illustrates a detection operation Temp13 in the 1C-th period. The sign selection operation in the Y direction in the 1C-th period is selection similar to the sign selection operation in the Y direction in the 1A-th period. In the detection operation Tepp13 and the detection operation Tepm13, the detection electrodes Rx included in the detection electrode block BKNB corresponding to the elements "1" on the first row of the square matrix Hv are selected as the third selection targets, whereas in the detection operation Temp13 and the detection operation Temm13, the detection electrodes Rx included in the detection electrode block BKNB corresponding to the elements "−1" on the first row of the square matrix Hv are selected as the fourth selection targets.

The sign selection driving in the X direction in the 1C-th period selects, as the first selection targets of the square matrix Hh, the detection electrodes Rx of the detection electrode blocks R×B(l) and R×B(l+1) in accordance with the elements "1" on the third column of the square matrix Hh as illustrated in FIG. 17A and FIG. 17D, and selects, as the second selection targets of the square matrix Hh, the detection electrodes Rx of the detection electrode blocks R×B(l+2) and R×B(l+3) in accordance with the elements "−1" on the third column of the square matrix Hh in FIG. 17B and FIG. 17C.

Consequently, a detection signal $Shpp_{13}$ is output in the detection operation Tepp13, a detection signal $Shpm_{13}$ is output in the detection operation Tepm13, a detection signal $Shmm_{13}$ is output in the detection operation Temm13, and a detection signal $Shmp_{13}$ is output in the detection operation Temp13. The detection operation Tepp13 and the detection operation Temm13 correspond to the first period Prx1 illustrated in FIG. 12, and the detection signal $Shpp_{13}$ and the detection signal $Shmm_{13}$ show positive signal values. The detection operation Tepm13 and the detection operation Temp13 correspond to the second period Prx2 illustrated in FIG. 12, and the detection signal $Shpm_{13}$ and the detection signal $Shmp_{13}$ show negative signal values. Consequently, these detection signals are added together to calculate a detection signal $Sc_{13}$. The detection signal $Shmp_{13}$ and the detection signal $Shmm_{13}$ are zero because no detection electrodes Rx are selected as the fourth selection targets in the negative sign selection operation in the Y direction.

Figure 18A:
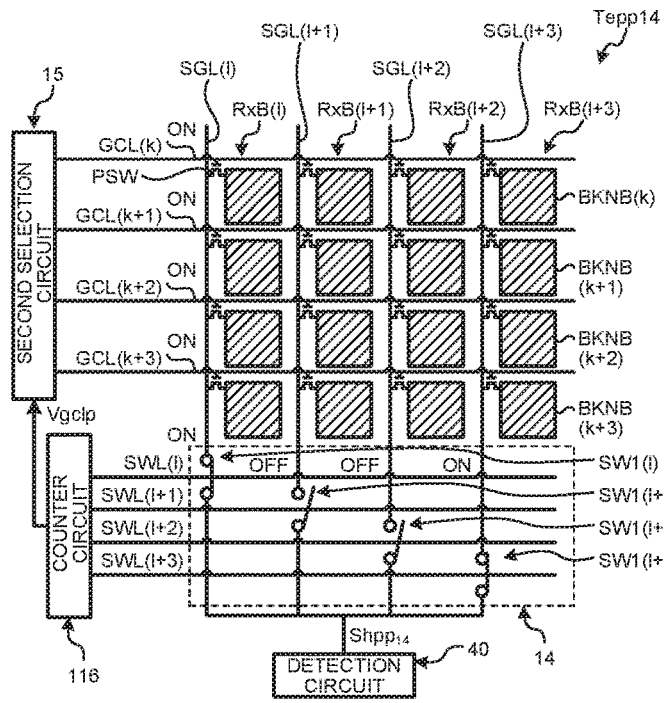
FIGS. 18A to 18D are illustrative diagrams for illustrating an example of coupling patterns of detection electrodes as selection targets in a detection operation in a 1D-th period.
Figure 18B:
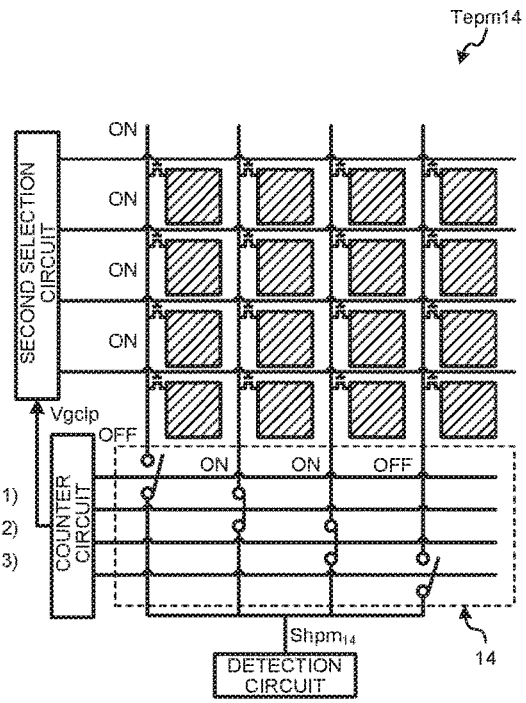
Figure 18C:
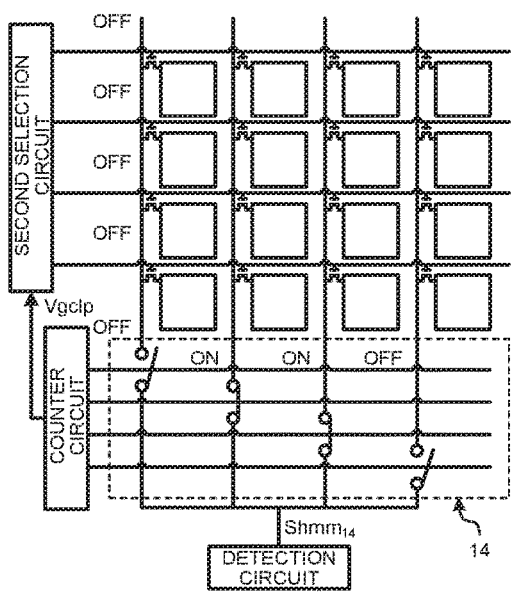
Figure 18D:
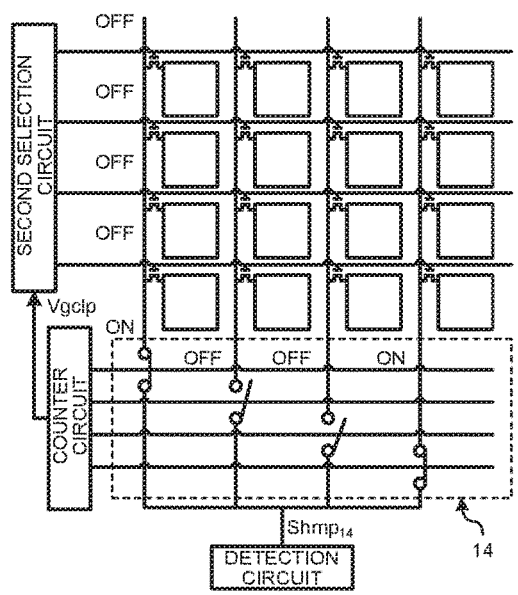

FIG. 18A illustrates a detection operation Tepp14 in the 1D-th period, whereas FIG. 18B illustrates a detection operation Tepm14 in the 1D-th period. FIG. 18C illustrates a detection operation Temm14 in the 1D-th period, whereas FIG. 18D illustrates a detection operation Temp14 in the 1D-th period. The sign selection operation in the Y direction in the 1D-th period is selection similar to the sign selection operation in the Y direction in the 1A-th period. In the detection operation Tepp14 and the detection operation Tepm14, the detection electrodes Rx included in the detection electrode block BKNB corresponding to the elements "1" on the first row of the square matrix Hv are selected as the third selection targets, whereas in the detection operation Temp14 and the detection operation Temm14, the detection electrodes Rx included in the detection electrode block BKNB corresponding to the elements "−1" on the first row of the square matrix Hv are selected as the fourth selection targets.

The sign selection driving in the X direction in the 1D-th period selects, as the first selection targets of the square matrix Hh, the detection electrodes Rx of the detection electrode blocks R×B(l) and R×B(l+3) in accordance with the elements "1" on the fourth column of the square matrix Hh as illustrated in FIG. 18A and FIG. 18D, and selects, as the second selection targets of the square matrix Hh, the detection electrodes Rx of the detection electrode blocks R×B(l+1) and R×B(l+2) in accordance with the elements "−1" on the fourth column of the square matrix Hh in FIG. 18B and FIG. 18C.

Consequently, a detection signal $Shpp_{14}$ is output in the detection operation Tepp14, a detection signal $Shpm_{14}$ is output in the detection operation Tepm14, a detection signal $Shmm_{14}$ is output in the detection operation Temm14, and a detection signal $Shmp_{14}$ is output in the detection operation Temp14. The detection operation Tepp14 and the detection operation Temm14 correspond to the first period Prx1 illustrated in FIG. 12, and the detection signal $Shpp_{14}$ and the detection signal $Shmm_{14}$ show positive signal values. The detection operation Tepm14 and the detection operation Temp14 correspond to the second period Prx2 illustrated in FIG. 12, and the detection signal $Shpm_{14}$ and the detection signal $Shmp_{14}$ show negative signal values. Consequently, these detection signals are added together to calculate a detection signal $Sc_{14}$. The detection signal $Shmp_{14}$ and the detection signal $Shmm_{14}$ are zero because no detection electrodes Rx are selected as the fourth selection targets in the negative sign selection operation in the Y direction.

Figure 19A:
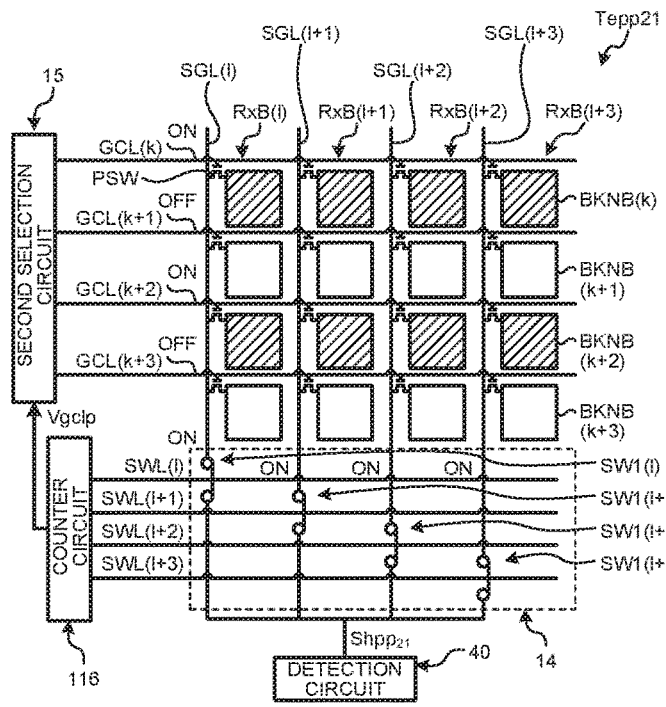
FIGS. 19A to 19D are illustrative diagrams for illustrating an example of coupling patterns of detection electrodes as selection targets in a detection operation in a 2A-th period.
Figure 19B:
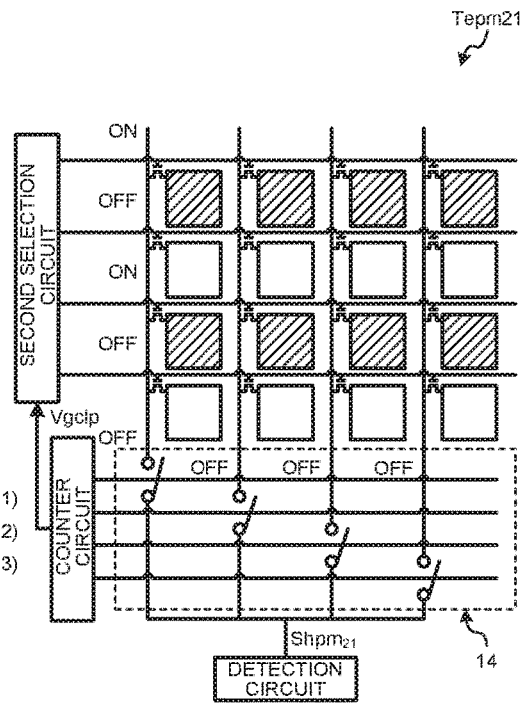
Figure 19C:
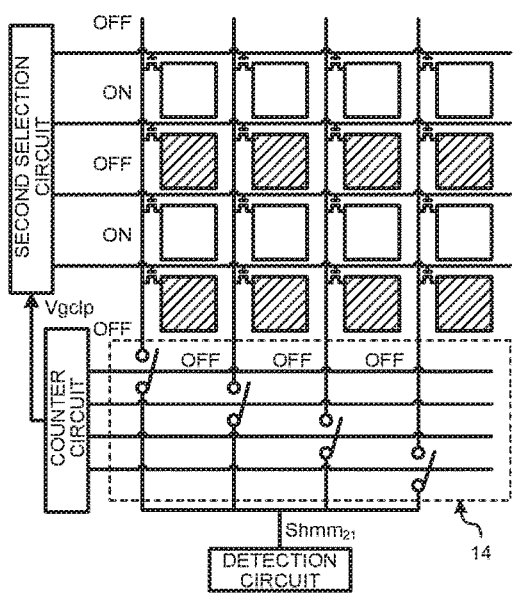
Figure 19D:
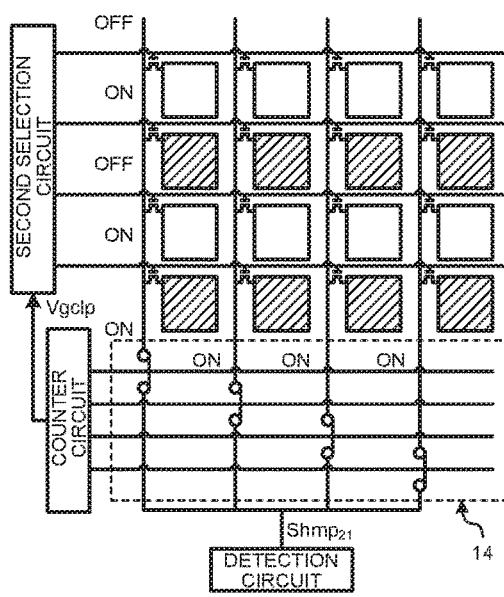

FIG. 19A illustrates a detection operation Tepp21 in the 2A-th period, whereas FIG. 19B illustrates a detection operation Tepm21 in the 2A-th period. FIG. 19C illustrates a detection operation Temm21 in the 2A-th period, whereas FIG. 19D illustrates a detection operation Temp21 in the 2A-th period. The sign selection operation in the Y direction in the 2A-th period selects, as the third selection targets, the detection electrodes Rx included in the detection electrode blocks BKNB(k) and BKNB(k+2) corresponding to the elements "1" on the second row of the square matrix Hv as illustrated in FIG. 19A and FIG. 19B, and selects, as the fourth selection targets, the detection electrodes Rx included in the detection electrode blocks BKNB(k+1) and BKNB(k+3) corresponding to the elements "−1" on the second row of the square matrix Hv as illustrated in FIG. 19C and FIG. 19D. In other words, the coupling pattern indicated by the detection electrodes Rx selected as the third selection targets in the detection operation Tepp21 and the detection operation Tepm21 is an inverted pattern of the coupling pattern indicated by the detection electrodes Rx selected as the fourth selection targets in the detection operation Temp21 and the detection operation Temm21.

The sign selection operation in the X direction in the 2A-th period, as in FIG. 15A to FIG. 15D, selects the detection electrodes Rx included in the detection electrode block R×B corresponding to the elements "1" on the first column of the square matrix Hh as the first selection targets in the detection operation Tepp21 and the detection operation Temp21, and selects the detection electrodes Rx included in the detection electrode block R×B corresponding to the elements "−1" on the first column of the square matrix Hh as the second selection targets in the detection operation Tepm21 and the detection operation Temm21.

Consequently, a detection signal $Shpp_{21}$ is output in the detection operation Tepp21, a detection signal $Shpm_{21}$ is output in the detection operation Tepm21, a detection signal $Shmm_{21}$ is output in the detection operation Temm21, and a detection signal $Shmp_{21}$ is output in the detection operation Temp21. The detection operation Tepp21 and the detection operation Temm21 correspond to the first period Prx1 illustrated in FIG. 12, and the detection signal $Shpp_{21}$ and the detection signal $Shmm_{21}$ show positive signal values. The detection operation Tepm21 and the detection operation Temp21 correspond to the second period Prx2 illustrated in FIG. 12, and the detection signal $Shpm_{21}$ and the detection signal $Shmp_{21}$ show negative signal values. Consequently, these detection signals are added together to calculate a detection signal $Sc_{21}$. The detection signal $Shpm_{21}$ and the detection signal $Shmm_{21}$ are zero because no detection electrodes Rx are selected as the second selection targets in the negative sign selection operation in the X direction.

Subsequently, as illustrated in FIG. 14A, detection operations in a 2B-th period, a 2C-th period, and a 2D-th period are performed. In a manner similar to the sign selection driving in the Y direction in the 2A-th period, the sign selection driving in the Y direction in the 2B-th period, the 2C-th period, and the 2D-th period selects the detection electrodes Rx included in the detection electrode block BKNB corresponding to the elements "1" on the second row of the square matrix Hv as the third selection targets in the detection operation Tepp and the detection operation Tepm, and selects the detection electrodes Rx included in the detection electrode block BKNB corresponding to the elements "−1" on the second row of the square matrix Hv as the fourth selection targets in the detection operation Temp and the detection operation Temm.

The sign selection operation in the X direction in the 2B-th period, the 2C-th period, and the 2D-th period is similar to the sign selection operation in the X direction in the 1B-th period, the 1C-th period, and the 1D-th period, respectively. In the detection operation Tepp and the detection operation Temp, the detection electrodes Rx included in the detection electrode block R×B corresponding to the elements "1" of the respective columns of the square matrix Hh are selected as the first selection targets, whereas in the detection operation Tepm and the detection operation Temm, the detection electrodes Rx included in the detection electrode block R×B corresponding to the elements "−1" of the respective columns of the square matrix Hh are selected as the second selection targets.

The detection operation Tepp and the detection operation Temm in the 2B-th period, the 2C-th period, and the 2D-th period correspond to the first period Prx1 illustrated in FIG. 12, and detection signals Shpp ($Shpp_{22}$, $Shpp_{23}$, $Shpp_{24}$) and detection signals Shmm ($Shmm_{22}$, $Shmm_{23}$, $Shmm_{24}$) show positive signal values. The detection operation Tepm and the detection operation Temp in the 2B-th period, the 2C-th period, and the 2D-th period correspond to the second period Prx2 illustrated in FIG. 12, and detection signals Shpm ($Shpm_{22}$, $Shpm_{23}$, $Shpm_{24}$) and detection signals Shmp ($Shmp_{22}$, $Shmp_{23}$, $Shmp_{24}$) show negative signal values. Consequently, these detection signals are added together to calculate detection signals Sc ($Sc_{22}$, $Sc_{23}$, $Sc_{24}$).

Figure 20A:
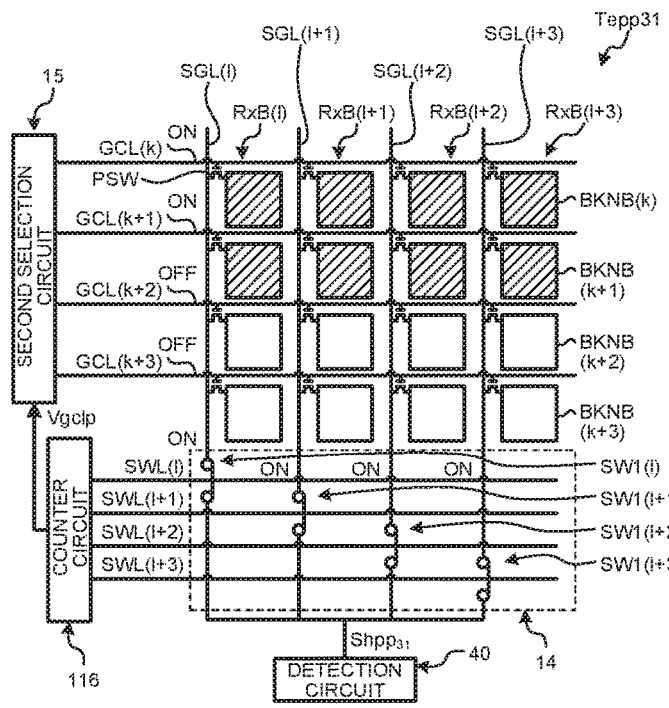
FIGS. 20A to 20D are illustrative diagrams for illustrating an example of coupling patterns of detection electrodes as selection targets in a detection operation in a 3A-th period.
Figure 20B:
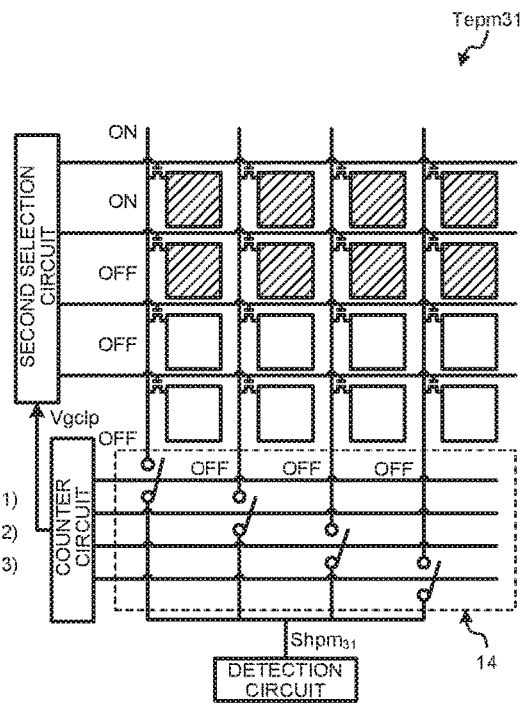
Figure 20C:
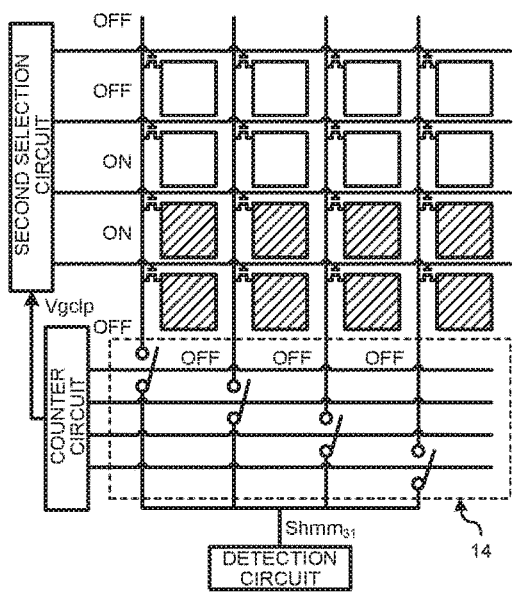
Figure 20D:
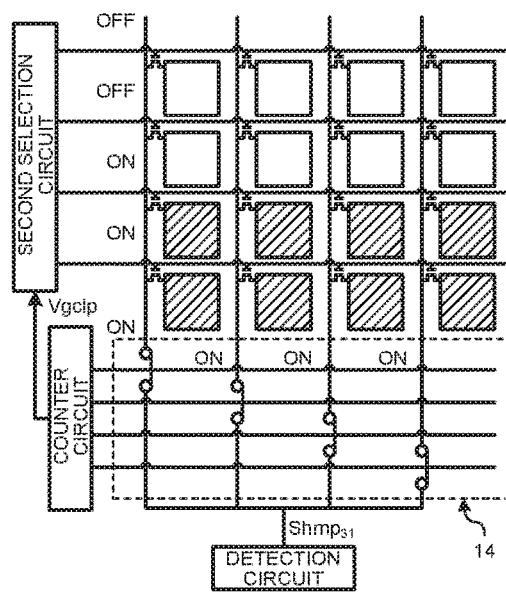

FIG. 20A illustrates a detection operation Tepp31 in the 3A-th period, whereas FIG. 20B illustrates a detection operation Tepm31 in the 3A-th period. FIG. 20C illustrates a detection operation Temm31 in the 3A-th period, whereas FIG. 20D illustrates a detection operation Temp31 in the 3A-th period. The sign selection operation in the Y direction in the 3A-th period selects, as the third selection targets, the detection electrodes Rx included in the detection electrode blocks BKNB(k) and BKNB(k+1) corresponding to the elements "1" on the third row of the square matrix Hv as illustrated in FIG. 20A and FIG. 20B, and selects, as the fourth selection targets, the detection electrodes Rx included in the detection electrode blocks BKNB(k+2) and BKNB(k+3) corresponding to the elements "−1" on the third row of the square matrix Hv as illustrated in FIG. 20C and FIG. 20D. In other words, the coupling pattern indicated by the detection electrodes Rx selected as the third selection targets in the detection operation Tepp31 and the detection operation Tepm31 is an inverted pattern of the coupling pattern indicated by the detection electrodes Rx selected as the fourth selection targets in the detection operation Temp31 and the detection operation Temm31.

The sign selection operation in the X direction in the 3A-th period, as in FIG. 15A to FIG. 15D, selects the detection electrodes Rx included in the detection electrode block R×B corresponding to the elements "1" on the first column of the square matrix Hh as the first selection targets in the detection operation Tepp31 and the detection operation Temp31, and selects the detection electrodes Rx included in the detection electrode block R×B corresponding to the elements "−1" on the first column of the square matrix Hh as the second selection targets in the detection operation Tepm31 and the detection operation Temm31.

Consequently, a detection signal $Shpp_{31}$ is output in the detection operation Tepp31, a detection signal $Shpm_{31}$ is output in the detection operation Tepm31, a detection signal $Shmm_{31}$ is output in the detection operation Temm31, and a detection signal $Shmp_{31}$ is output in the detection operation Temp31. The detection operation Tepp31 and the detection operation Temm31 correspond to the first period Prx1 illustrated in FIG. 12, and the detection signal $Shpp_{31}$ and the detection signal $Shmm_{31}$ show positive signal values. The detection operation Tepm31 and the detection operation Temp31 correspond to the second period Prx2 illustrated in FIG. 12, and the detection signal $Shpm_{31}$ and the detection signal $Shmp_{31}$ show negative signal values. Consequently, these detection signals are added together to calculate a detection signal $Sc_{31}$. The detection signal $Shpm_{31}$ and the detection signal $Shmm_{31}$ are zero because no detection electrodes Rx are selected as the second selection targets in the negative sign selection operation in the X direction.

Subsequently, as illustrated in FIG. 14B, detection operations in a 3B-th period, a 3C-th period, and a 3D-th period are performed. In a manner similar to the sign selection driving in the Y direction in the 3A-th period, the sign selection driving in the Y direction in the 3B-th period, the 3C-th period, and the 3D-th period selects the detection electrodes Rx included in the detection electrode block BKNB corresponding to the elements "1" on the third row of the square matrix Hv as the third selection targets in the detection operation Tepp and the detection operation Tepm, and selects the detection electrodes Rx included in the detection electrode block BKNB corresponding to the elements "−1" on the third row of the square matrix Hv as the fourth selection targets in the detection operation Temp and the detection operation Temm.

The sign selection driving in the X direction in the 3B-th period, the 3C-th period, and the 3D-th period is similar to the sign selection driving in the X direction in the 1B-th period, the 1C-th period, and the 1D-th period, respectively. In the detection operation Tepp and the detection operation Temp, the detection electrodes Rx included in the detection electrode block R×B corresponding to the elements "1" of the respective columns of the square matrix Hh are selected as the first selection targets, whereas in the detection operation Tepm and the detection operation Temm, the detection electrodes Rx included in the detection electrode block R×B corresponding to the elements "−1" of the respective columns of the square matrix Hh are selected as the second selection targets.

The detection operation Tepp and the detection operation Temm in the 3B-th period, the 3C-th period, and the 3D-th period correspond to the first period Prx1 illustrated in FIG. 12, and detection signals Shpp ($Shpp_{32}$, $Shpp_{33}$, $Shpp_{34}$) and detection signals Shmm ($Shmm_{32}$, $Shmm_{33}$, $Shmm_{34}$) show positive signal values. The detection operation Tepm and the detection operation Temp in the 3B-th period, the 3C-th period, and the 3D-th period correspond to the second period Prx2 illustrated in FIG. 12, and detection signals Shpm ($Shpm_{32}$, $Shpm_{33}$, $Shpm_{34}$) and detection signals Shmp ($Shmp_{32}$, $Shmp_{33}$, $Shmp_{34}$) show negative signal values. Consequently, these detection signals are added together to calculate detection signals Sc ($Sc_{32}$, $Sc_{33}$, $Sc_{34}$).

Figure 21A:
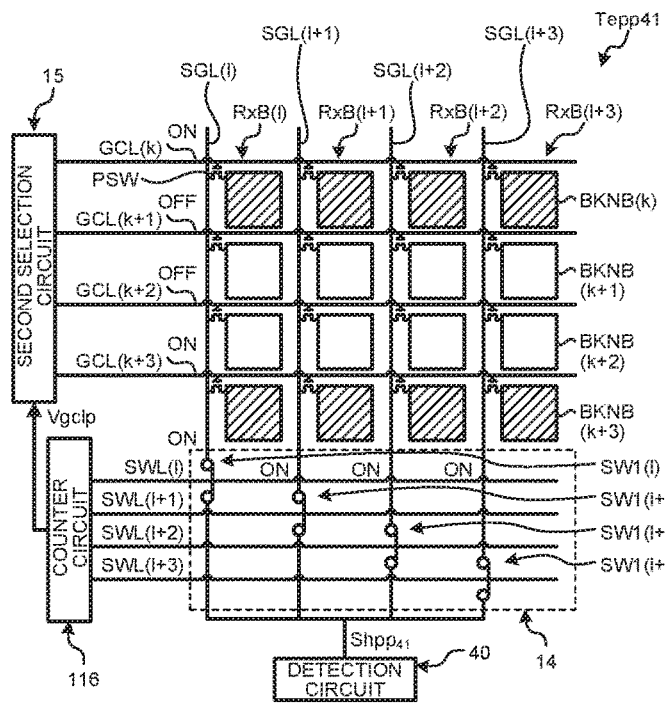
FIGS. 21A to 21D are illustrative diagrams for illustrating an example of coupling patterns of detection electrodes as selection targets in a detection operation in a 4A-th period.
Figure 21B:
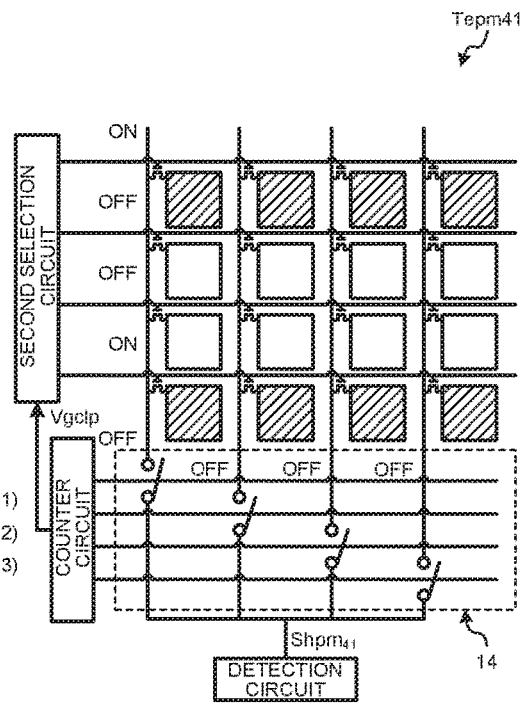
Figure 21C:
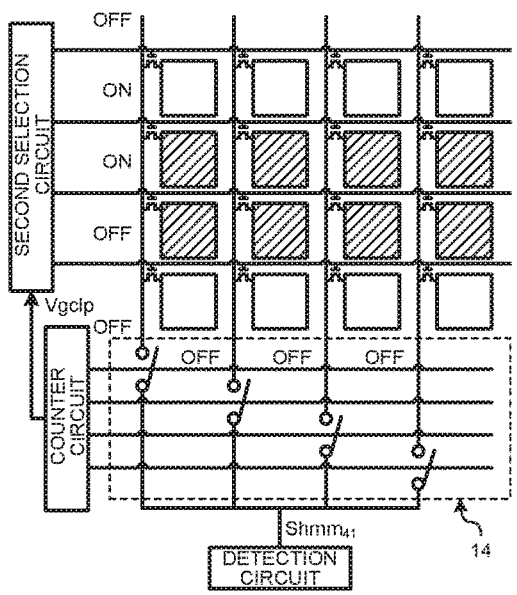
Figure 21D:
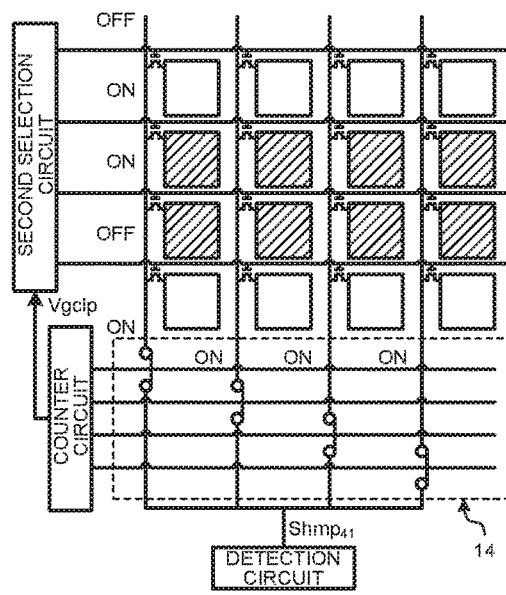

FIG. 21A illustrates a detection operation Tepp41 in the 4A-th period, whereas FIG. 21B illustrates a detection operation Tepm41 in the 4A-th period. FIG. 21C illustrates a detection operation Temm41 in the 4A-th period, whereas FIG. 21D illustrates a detection operation Temp41 in the 4A-th period. The sign selection operation in the Y direction in the 4A-th period selects, as the third selection targets, the detection electrodes Rx included in the detection electrode blocks BKNB(k) and BKNB(k+3) corresponding to the elements "1" on the fourth row of the square matrix Hv as illustrated in FIG. 21A and FIG. 21B, and selects, as the fourth selection targets, the detection electrodes Rx included in the detection electrode blocks BKNB(k+1) and BKNB(k+2) corresponding to the elements "−1" on the fourth row of the square matrix Hv as illustrated in FIG. 21C and FIG. 21D. In other words, the coupling pattern indicated by the detection electrodes Rx selected as the third selection targets in the detection operation Tepp41 and the detection operation Tepm41 is an inverted pattern of the coupling pattern indicated by the detection electrodes Rx selected as the fourth selection targets in the detection operation Temp41 and the detection operation Temm41.

The sign selection operation in the X direction in the 4A-th period, as in FIG. 15A to FIG. 15D, selects the detection electrodes Rx included in the detection electrode block R×B corresponding to the elements "1" on the first column of the square matrix Hh as the first selection targets in the detection operation Tepp41 and the detection operation Temp41, and selects the detection electrodes Rx included in the detection electrode block R×B corresponding to the elements "−1" on the first column of the square matrix Hh as the second selection targets in the detection operation Tepm41 and the detection operation Temm41.

Consequently, a detection signal $Shpp_{41}$ is output in the detection operation Tepp41, a detection signal $Shpm_{41}$ is output in the detection operation Tepm41, a detection signal $Shmm_{41}$ is output in the detection operation Temm41, and a detection signal $Shmp_{41}$ is output in the detection operation Temp41. The detection operation Tepp41 and the detection operation Temm41 correspond to the first period Prx1 illustrated in FIG. 12, and the detection signal $Shpp_{41}$ and the detection signal $Shmm_{41}$ show positive signal values. The detection operation Tepm41 and the detection operation Temp41 correspond to the second period Prx2 illustrated in FIG. 12, and the detection signal $Shpm_{41}$ and the detection signal $Shmp_{41}$ show negative signal values. Consequently, these detection signals are added together to calculate a detection signal $Sc_{41}$. The detection signal $Shpm_{41}$ and the detection signal $Shmm_{41}$ are zero because no detection electrodes Rx are selected as the second selection targets in the negative sign selection operation in the X direction.

Subsequently, as illustrated in FIG. 14B, detection operations in a 4B-th period, a 4C-th period, and a 4D-th period are performed. In a manner similar to the sign selection driving in the Y direction in the 4A-th period, the sign selection driving in the Y direction in the 4B-th period, the 4C-th period, and the 4D-th period selects the detection electrodes Rx included in the detection electrode block BKNB corresponding to the elements "1" on the fourth row of the square matrix Hv as the third selection targets in the detection operation Tepp and the detection operation Tepm, and selects the detection electrodes Rx included in the detection electrode block BKNB corresponding to the elements "−1" on the fourth row of the square matrix Hv as the fourth selection targets in the detection operation Temp and the detection operation Temm.

The sign selection driving in the X direction in the 4B-th period, the 4C-th period, and the 4D-th period is similar to the sign selection driving in the X direction in the 1B-th period, the 1C-th period, and the 1D-th period, respectively.

In the detection operation Tepp and the detection operation Temp, the detection electrodes Rx included in the detection electrode block R×B corresponding to the elements "1" of the respective columns of the square matrix Hh are selected as the first selection targets, whereas in the detection operation Tepm and the detection operation Temm, the detection electrodes Rx included in the detection electrode block R×B corresponding to the elements "−1" of the respective columns of the square matrix Hh are selected as the second selection targets.

The detection operation Tepp and the detection operation Temm in the 4B-th period, the 4C-th period, and the 4D-th period correspond to the first period Prx1 illustrated in FIG. 12, and detection signals Shpp ($Shpp_{42}$, $Shpp_{43}$, $Shpp_{44}$) and detection signals Shmm ($Shmm_{42}$, $Shmm_{43}$, $Shmm_{44}$) show positive signal values. The detection operation Tepm and the detection operation Temp in the 4B-th period, the 4C-th period, and the 4D-th period correspond to the second period Prx2 illustrated in FIG. 12, and detection signals Shpm ($Shpm_{42}$, $Shpm_{43}$, $Shpm_{44}$) and detection signals Shmp ($Shmp_{42}$, $Shmp_{43}$, $Shmp_{44}$) show negative signal values. Consequently, these detection signals are added together to calculate detection signals Sc ($Sc_{42}$, $Sc_{43}$, $Sc_{44}$).

As described in the foregoing, the signal computing circuit 44 (refer to FIG. 1) calculates the data of the 16 detection signals Sc by the above-described detection operations. The data of the detection signals Sc is stored in the storage circuit 48. The signal computing circuit 44 (refer to FIG. 1) receives the data of the detection signals Sc from the storage circuit 48 and performs decoding processing based on Expression (7).

Sidr are decoded detection signals, and dr(Si)X is a matrix corresponding to the detection electrodes Rx illustrated in FIG. 15A to FIG. 21D. Hv is a square matrix described in Expression (5) and is a transformation matrix in the Y direction. Hh is a square matrix described in Expression (2) and is a transformation matrix in the X direction. The signal computing circuit 44 (refer to FIG. 1) performs decoding processing to acquire the detection signals of the respective detection electrodes included in the detection electrode block BKNB(k) or the detection electrode block R×B(l). The coordinates extraction circuit 45 can calculate the two-dimensional coordinates of the recess or protrusion of a finger or the like being in contact or proximity based on the decoded detection signals Sidr. In the second embodiment as well, the decoding processing is performed based on the detection signal Sc obtained by integrating the detection signals Si of the respective detection electrodes Rx, whereby the signal intensity 16 times as great as that of time division multiplexing can be obtained without increasing the voltage of the signal value of each node.

The specific configuration of the detection apparatus is not limited to the examples with reference to FIG. 1 to FIG. 4 and FIG. 8.

Third Embodiment

Figure 22:
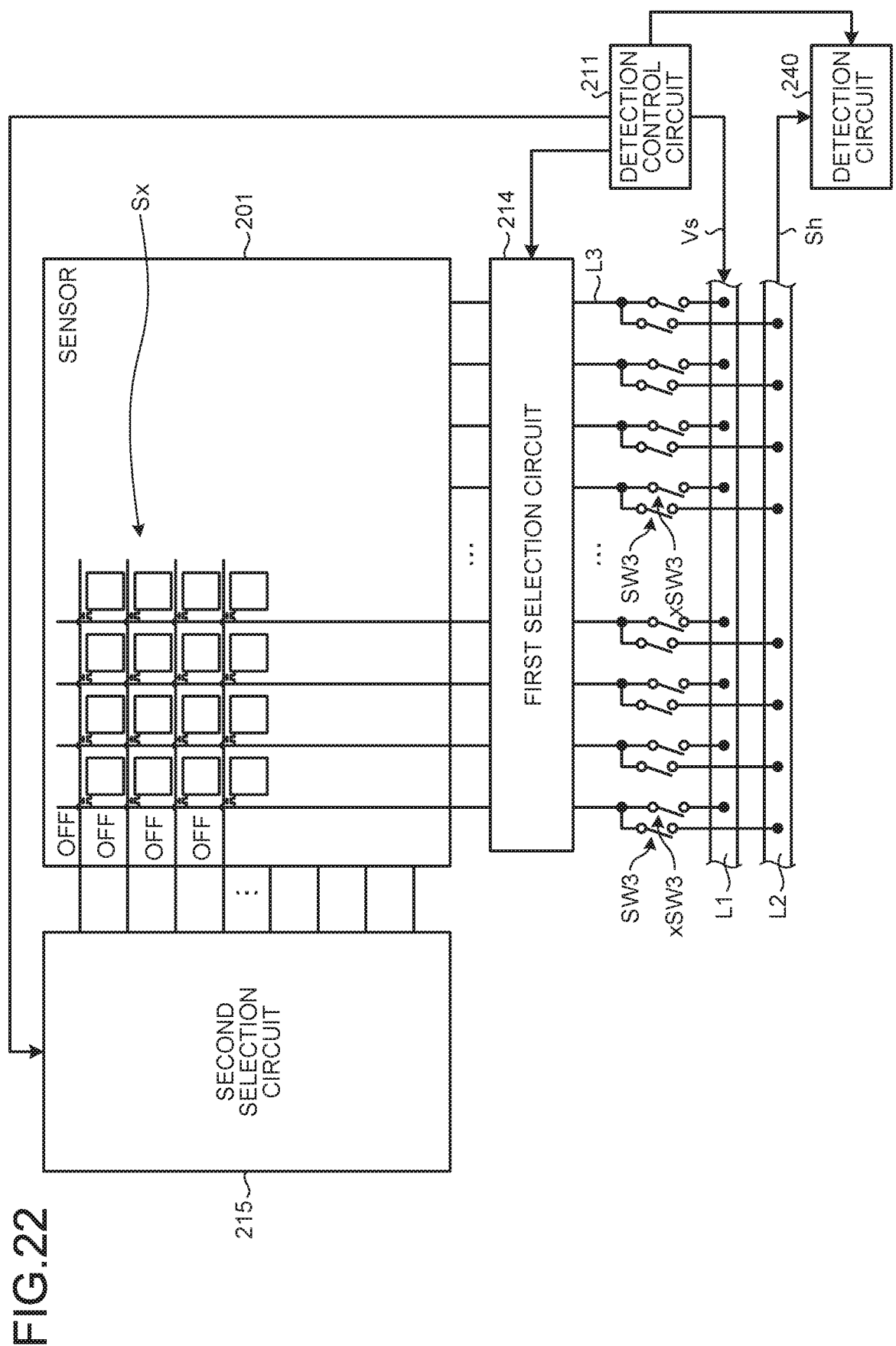
FIG. 22 is a schematic configuration diagram of a detection apparatus according to a third embodiment.

FIG. 22 is a schematic configuration diagram of a detection apparatus according to a third embodiment. In the third embodiment, in this sensor 201 illustrated in FIG. 22, the detection electrode Tx and the finger Fin among the components illustrated in FIG. 3 are removed, and detection electrodes Sx are arranged in a matrix, or row-column configuration, in the same manner as the detection electrodes Rx, and are coupled to the scan lines GCL and the data lines SGL via the switch elements PSW. The sensor 201 detects the recess or protrusion on the surface of a finger Fin or the like by a self-capacitance method. A first selection circuit 214 has functions similar to those of the first selection circuit 14. A second selection circuit 215 has functions similar to those of the second selection circuit 15. A detection control circuit 211 has functions similar to those of the detection control circuit 11.

As illustrated in FIG. 22, the wiring line L3, a plurality of switch elements SW3, a plurality of switch elements xSW3, and a wiring line L2 are provided between the first selection circuit 214 and a detection circuit 240. The detection control circuit 211 supplies the drive signal Vs to the detection electrodes Sx via a wiring line L1 and the switch elements xSW3. That is to say, the drive signal generation circuit 112 included in the detection control circuit 211 is coupled to the detection electrodes Sx provided in the sensor 201 to supply the drive signal Vs to each of the detection electrodes Sx.

Supply of the drive signal Vs and output of the detection signal Sh can be switched by the switch elements SW3 and xSW3, for example. When the switch elements SW3 are off (a non-coupled state), the switch elements xSW3 are on (a coupled state), and the drive signal Vs is supplied to the detection electrodes Sx as selection targets via the wiring line L1, the wiring line L3, the first selection circuit 214, and the data line SGL. When the switch elements SW3 are on (a coupled state), the switch elements xSW3 are off (a non-coupled state), and the detection signals Sh from the detection electrodes Sx as the selection targets are output to the detection circuit 240 via the wiring line L2 and the wiring line L3. That is to say, the detection electrodes Sx in the third embodiment are electrodes serving as both the detection electrodes Rx and the detection electrode Tx (the drive electrode) in the first embodiment.

The switch elements SW3 and xSW3 and the wiring lines L1, L2, and L3 may be included in the first selection circuit 214 or a circuit provided separately from the first selection circuit 214. The detection control circuit 11 may include the functions of the drive signal generation circuit 112. The switch elements SW3 and xSW3 and the wiring lines L1, L2, and L3 are provided on the base member 101, for example. The switch elements SW3 and xSW3 and the wiring lines L1, L2, and L3 may be provided within the IC 21.

Fourth Embodiment

Figure 23:
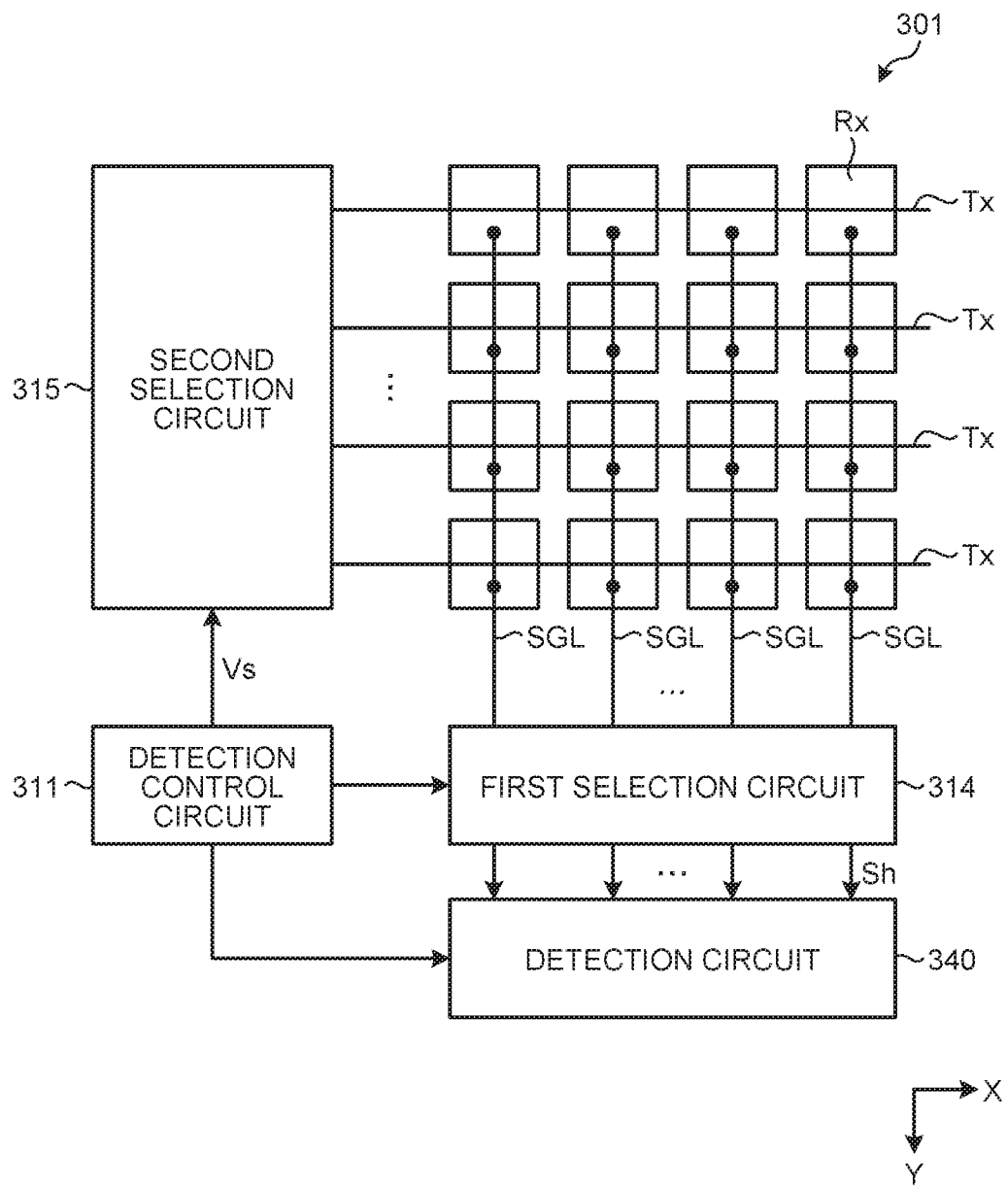
FIG. 23 is a schematic configuration diagram of a detection apparatus according to a fourth embodiment.

FIG. 23 is a schematic configuration diagram of a detection apparatus according to a fourth embodiment. As illustrated in FIG. 23, in the fourth embodiment, drive electrodes Tx facing a plurality of detection electrodes Rx in a non-contact manner are further provided. The drive signal generation circuit 112 of a detection control circuit 311 is coupled to the drive electrodes Tx via a second selection circuit 315 to supply the drive signal Vs to the drive electrodes Tx. A sensor 301 does not have the switch elements PSW coupled to the drive electrodes Tx in the detection area DA, and the drive electrodes Tx are arranged in the detection area DA. The drive electrodes Tx and the second selection circuit 315 are coupled to each other in the peripheral area PA. The detection electrodes Rx are coupled to the data lines SGL not through the switch elements PSW in the detection area DA. The drive signal generation circuit 112 may be provided in the second selection circuit 315. That is to say, the second selection circuit 315 may have the function of generating the drive signal Vs as the drive signal generation circuit 112 has.

The second selection circuit 315 supplies the drive signal Vs to the drive electrodes Tx as the third selection targets among the drive electrodes Tx. With this operation, the second selection circuit 315 performs the sign selection driving in the Y direction described above. Alternatively, the second selection circuit 315 may successively supply the drive signal Vs for each group including a certain number of drive electrodes Tx to perform time division multiplexing.

When the drive signal Vs is supplied to the drive electrodes Tx, the proximity of the recess or protrusion of the object to be detected such as a finger Fin to the detection electrodes Rx has an influence on mutual capacitance occurring between the detection electrodes Rx and the drive electrodes Tx. The configuration illustrated in FIG. 23 performs detection based on the presence or absence of a change in the mutual capacitance appearing in the detection signal Sh and the degree of the change. The drive electrodes Tx are provided such that the longitudinal direction thereof is along the X direction to be able to simultaneously drive the detection electrodes Rx arranged in the X direction. The drive electrodes Tx are arranged in accordance with the arrangement of the detection electrodes Rx in the Y direction. However, the configuration of the drive electrodes Tx illustrated in FIG. 23 is an example, and this is not limited thereto; the shape and arrangement of the drive electrodes Tx can be changed as appropriate.

The data lines SGL coupling a first selection circuit 314 to the detection electrodes Rx are coupled to the detection electrodes Rx. A selection operation of the detection electrodes Rx arranged in the Y direction is performed by a selection operation of the drive electrodes Tx to which the drive signal Vs is supplied. With regard to other points, the functions of the first selection circuit 314 and a detection circuit 340 are similar to those of the first selection circuit 14 and the detection circuit 40.

Fifth Embodiment

Figure 24:
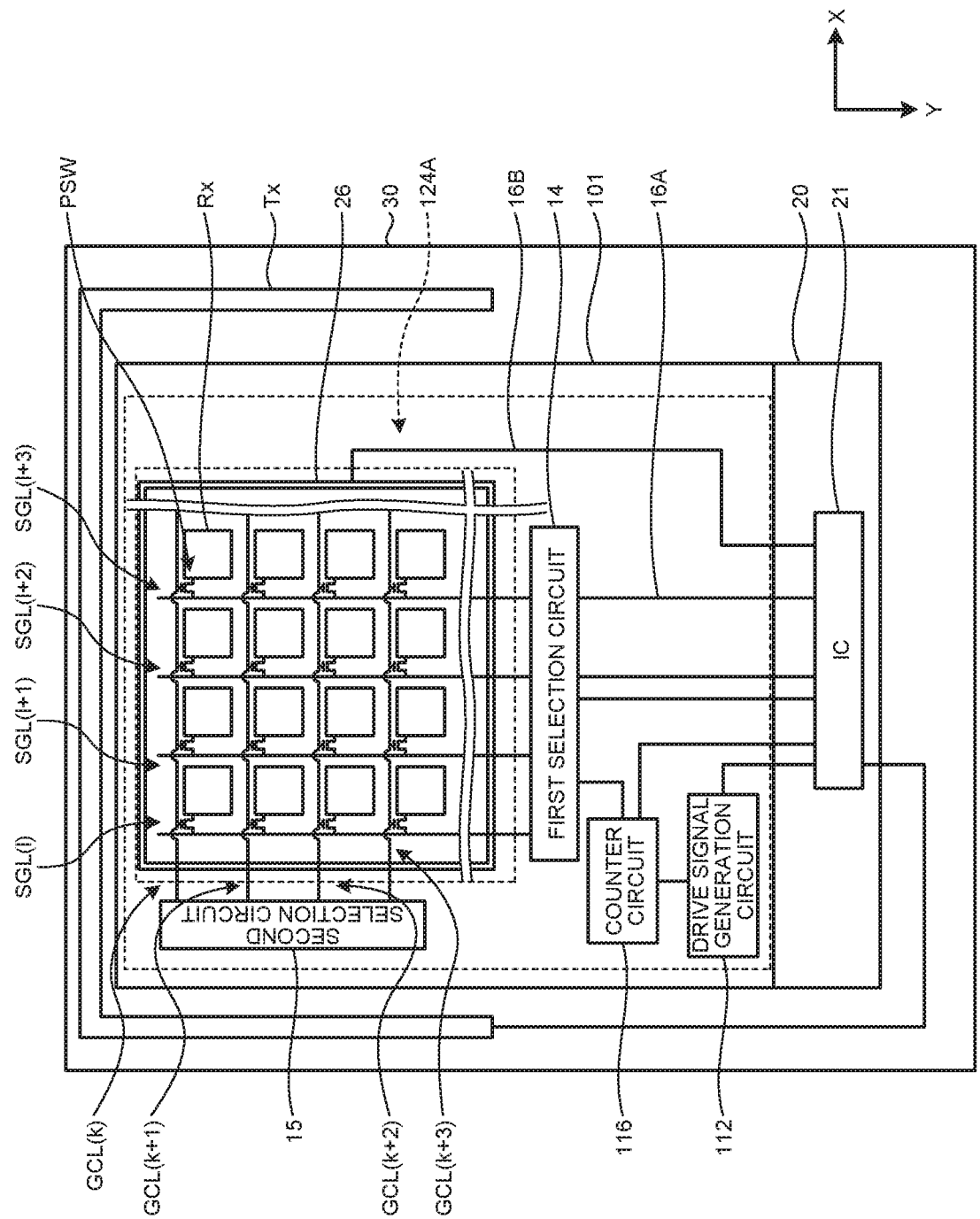
FIG. 24 is a plan view of a detection apparatus according to a fifth embodiment.

In the first embodiment, the shield layer 24 is arranged between the layer in which the detection electrodes Rx are formed and the layer in which the switch elements PSW are formed as illustrated in FIG. 7. However, the arrangement is not limited thereto. FIG. 24 is a plan view of a detection apparatus 500 according to a fifth embodiment. As illustrated in FIG. 24, this shield layer 124A is arranged so as to overlap circuits formed on the base member 101 such as the first selection circuit 14 and the second selection circuit 15 in a plan view. The shield layer 124A is arranged so as to surround the detection area DA. In the fifth embodiment, the shield layer 124A is arranged so as to surround the four sides of the rectangular detection area DA. However, the arrangement is not limited thereto. The shield layer 124A is only required to be arranged so as to at least overlap the circuits arranged on the base member 101 and may be arranged along two sides of the detection area DA in which the first selection circuit 14 and the second selection circuit 15 are arranged, for example.

Figure 25:
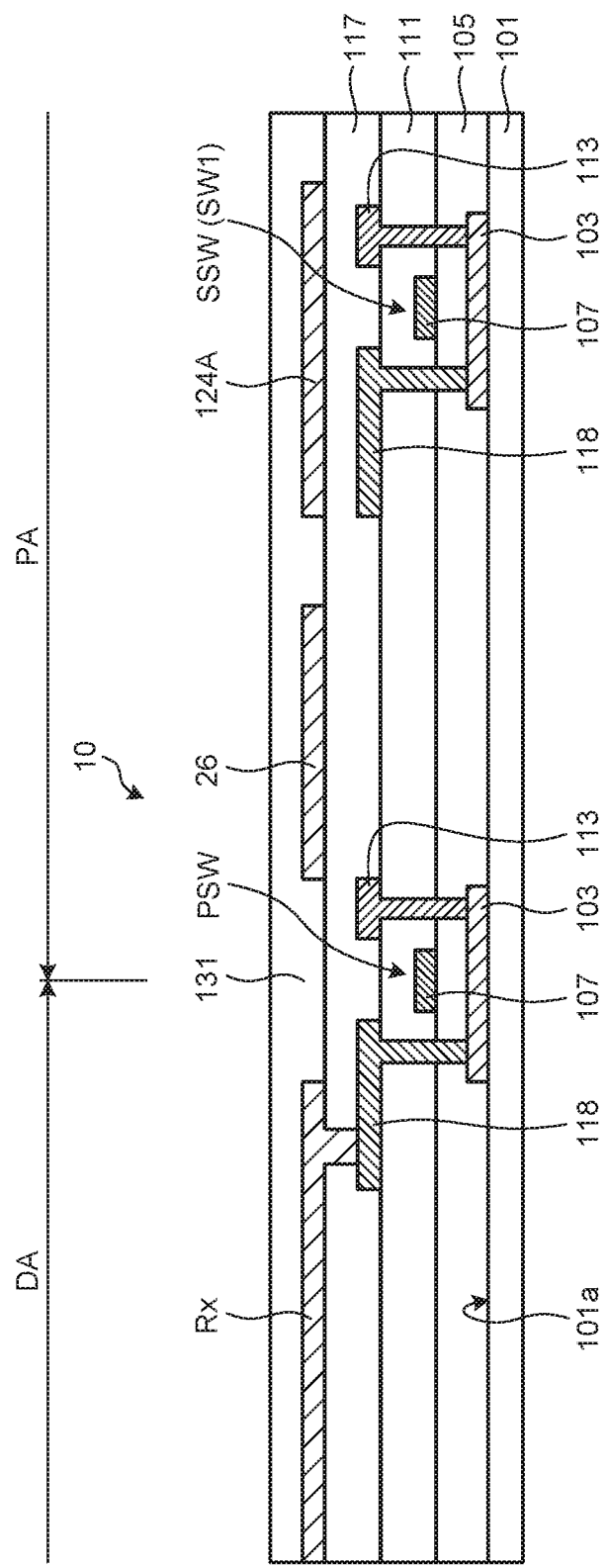
FIG. 25 is a sectional view of the detection apparatus according to the fifth embodiment.

FIG. 25 is a sectional view of the detection apparatus 500 according to the fifth embodiment. As illustrated in FIG. 25, the detection apparatus 500 is configured so as to form the shield layer 124A using the same electrode layer as the detection electrode Rx to cover a switch element SSW included in the circuits on the base member 101 without providing the shield layer 24. The shield layer 124A is formed of a transparent conductor such as ITO. The switch element SSW is the switch element SW1 included in the first selection circuit 14, for example. Although the fifth embodiment exemplifies a case in which the shield layer 24 is not provided, the configuration is not limited thereto; both the shield layer 124A and the shield layer 24 may be provided.

Although the preferred embodiments of the present disclosure have been described, the present disclosure is not limited to such embodiments. The details disclosed in the embodiments are only by way of example, and various modifications can be made without departing from the gist of the present disclosure. Appropriate modifications made without departing from the gist of the present disclosure also naturally belong to the technical scope of the present disclosure.

What is claimed is:

1. A detection apparatus comprising:
a plurality of detection electrodes;
a drive signal generation circuit configured to generate a drive signal;
a detection circuit configured to be coupled to the detection electrodes to detect a detection signal based on the drive signal;
a reset switch to reset the detection circuit;
a selection circuit including a first switch, the selection circuit being disposed between the detection circuit and the detection electrodes; and
a reference voltage supply line to supply a reference voltage, the selection circuit being disposed between the reference voltage supply line and the detection electrodes,
wherein,
after the selection circuit couples the detection circuit and the detection electrodes, the drive signal changes, and then,
after the detection circuit is reset by the reset switch, the selection circuit couples the reference voltage supply line and the detection electrodes.

2. The detection apparatus according to claim 1,
wherein the detection apparatus has a plurality of coupling patterns as combinations of the detection electrode as a first selection target and the detection electrode as a second selection target among the detection electrodes, and
wherein the selection circuit performs coupling in a first period in which the selection circuit couples a detection electrode as the first selection target among the detection electrodes to the detection circuit, via the first switch, and coupling in a second period in which the selection circuit couples a detection electrode as the second selection target, which is not included in the first selection target, to the detection circuit, via the first switch, alternately a plurality of times for each of the coupling patterns.

3. The detection apparatus according to claim 1,
wherein the selection circuit
uncouples the detection electrode as a second selection target from the detection circuit in a first period in which the selection circuit couples a detection electrode as a first selection target among the detection electrodes to the detection circuit, via the first switch, and
uncouples the detection electrode as a first selection target from the detection circuit in a second period in which the selection circuit couples a detection electrode as a second selection target, which is not included in the first selection target, to the detection circuit, via the first switch.

4. The detection apparatus according to claim 1,
wherein the detection electrodes are arranged in a first direction and a second direction crossing the first direction.

5. The detection apparatus according to claim 1, further comprising a conductor for transmission that is arranged at a position adjacent to the detection electrodes,
wherein the drive signal generation circuit supplies the drive signal to the conductor for transmission.

6. The detection apparatus according to claim 5,
wherein the detection electrodes are provided to one face of an insulating base member, and
wherein a height of the conductor for transmission from the one face is greater than a height of the detection electrodes from the one face.

7. The detection apparatus according to claim 1,
wherein the drive signal generation circuit is configured to be coupled to the detection electrodes to supply the drive signal to the detection electrodes.

8. The detection apparatus according to claim 1, further comprising:
a plurality of switching elements provided in the respective detection electrodes; and
a plurality of data lines and a plurality of scan lines coupled to the switching elements,
wherein the selection circuit couples a data line of the data lines coupled to the detection electrode as a first selection target among the detection electrodes to the detection circuit, via the first switch, to the detection circuit, and
wherein a standard potential is supplied to a data line of the data lines coupled to the detection electrode as a second selection target, which is not included in the first selection target, to the detection circuit, via the first switch.

9. The detection apparatus according to claim 8, further comprising a second selection circuit configured to supply a gate selection signal to a scan line as a third selection target among the scan lines.

10. The detection apparatus according to claim 1, further comprising a drive electrode facing the detection electrodes in a noncontact manner,
wherein the drive signal generation circuit is coupled to the drive electrode to supply the drive signal to the drive electrode.

11. The detection apparatus according to claim 10, further comprising:
a plurality of the drive electrodes; and
a second selection circuit configured to supply the drive signal to a drive electrode as a third selection target among the drive electrodes.

12. The detection apparatus according to claim 1,
wherein the selection circuit determines the detection electrode as a first selection target and the detection electrode as a second selection target based on positive and negative signs of an Hadamard matrix.

13. The detection apparatus according to claim 1,
wherein, after the first switch is turned on, the drive signal is applied to the detection electrodes.

* * * * *